(12) United States Patent
Yerramalli et al.

(10) Patent No.: US 10,469,185 B2
(45) Date of Patent: Nov. 5, 2019

(54) TECHNIQUES FOR SCALING BANDWIDTH OF AN UNLICENSED RADIO FREQUENCY SPECTRUM BAND

(71) Applicant: QUALCOMM Incorporated, San Diego, CA (US)

(72) Inventors: Srinivas Yerramalli, San Diego, CA (US); Tao Luo, San Diego, CA (US); Ravi Teja Sukhavasi, San Diego, CA (US); Makesh Pravin John Wilson, San Diego, CA (US); Kiran Kumar Somasundaram, San Diego, CA (US); Onkar Jayant Dabeer, San Diego, CA (US); Durga Prasad Malladi, San Diego, CA (US); Naga Bhushan, San Diego, CA (US); Yongbin Wei, La Jolla, CA (US); Peter Gaal, San Diego, CA (US); Wanshi Chen, San Diego, CA (US); Hao Xu, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 29 days.

(21) Appl. No.: 15/629,483

(22) Filed: Jun. 21, 2017

(65) Prior Publication Data

US 2017/0288794 A1    Oct. 5, 2017

Related U.S. Application Data

(62) Division of application No. 14/695,998, filed on Apr. 24, 2015.

(Continued)

(51) Int. Cl.
*H04W 4/00* (2018.01)
*H04B 17/309* (2015.01)
(Continued)

(52) U.S. Cl.
CPC .......... *H04B 17/309* (2015.01); *H04W 16/14* (2013.01); *H04W 72/00* (2013.01); *H04W 74/08* (2013.01); *H04W 72/12* (2013.01)

(58) Field of Classification Search
USPC ......................... 370/329, 330, 336; 455/522
See application file for complete search history.

(56) References Cited

U.S. PATENT DOCUMENTS 8,144,793 B2   3/2012 Hassan et al.
9,113,483 B2   8/2015 Zou et al.
(Continued)

FOREIGN PATENT DOCUMENTS

| CN | 1663156 A | 8/2005 |
| CN | 101919175 A | 12/2010 |

(Continued)

OTHER PUBLICATIONS

ISA/EP, International Search Report and Written Opinion of the International Searching Authority, Int'l Application No. PCT/US2015/037006, dated Sep. 16, 2015, European Patent Office, Rijswijk, NL, 8 pgs.

(Continued)

*Primary Examiner* — Phuongchau Ba Nguyen
(74) *Attorney, Agent, or Firm* — Holland & Hart LLP

(57) ABSTRACT

The present disclosure, for example, relates to one or more techniques for scaling the bandwidth of a carrier. Available sub-channels of an unlicensed radio frequency spectrum band may be determined, and the available sub-channels may be included in the carrier. The available sub-channels may be adjacent or non-adjacent sub-channels. The band- (Continued)

width of the carrier may be determined according to which sub-channels are included in the carrier. In this way, the bandwidth of the carrier may be scaled according to the available sub-channels in the unlicensed radio frequency spectrum band.

16 Claims, 39 Drawing Sheets

Related U.S. Application Data

(60) Provisional application No. 62/025,358, filed on Jul. 16, 2014.

(51) Int. Cl.
*H04W 16/14* (2009.01)
*H04W 72/00* (2009.01)
*H04W 74/08* (2009.01)
*H04W 72/12* (2009.01)

(56) References Cited

U.S. PATENT DOCUMENTS

| | | |
|---|---|---|
| 9,788,320 B2 | 10/2017 | Cattoni et al. |
| 2004/0028003 A1 | 2/2004 | Diener et al. |
| 2009/0086802 A1 | 4/2009 | Nabetani |
| 2010/0142421 A1 | 6/2010 | Schlicht et al. |
| 2012/0129560 A1 | 5/2012 | Lunden et al. |
| 2012/0230290 A1 | 9/2012 | Seo et al. |
| 2012/0250532 A1 | 10/2012 | Husted et al. |
| 2013/0142180 A1* | 6/2013 | Gidlund .............. H04W 74/085 370/337 |
| 2013/0242928 A1 | 9/2013 | Goel et al. |
| 2013/0322371 A1 | 12/2013 | Prakash et al. |
| 2014/0378157 A1 | 12/2014 | Wei et al. |
| 2015/0215874 A1 | 7/2015 | Chen et al. |
| 2016/0021661 A1 | 1/2016 | Yerramalli, Sr. et al. |
| 2016/0157264 A1* | 6/2016 | Wang ................ H04W 74/0808 370/329 |
| 2016/0345339 A1 | 11/2016 | Hori |

FOREIGN PATENT DOCUMENTS

| | | |
|---|---|---|
| CN | 102204393 A | 9/2011 |
| CN | 103026774 A | 4/2013 |
| JP | 2009089052 A | 4/2009 |
| JP | 2013175940 A | 9/2013 |
| JP | 2014500685 A | 1/2014 |
| JP | 2014502453 A | 1/2014 |
| JP | 2014509131 A | 4/2014 |
| JP | 2014131285 A | 7/2014 |
| WO | WO-03090037 A2 | 10/2003 |
| WO | WO-2008045279 A2 | 4/2008 |
| WO | WO-2012064502 A1 | 5/2012 |
| WO | WO-2012078565 A1 | 6/2012 |
| WO | WO-2012109369 A2 | 8/2012 |
| WO | WO-2012139278 A1 | 10/2012 |
| WO | WO-2013185835 A1 | 12/2013 |

OTHER PUBLICATIONS

Wang J., et al., "Increased Network Throughput with TX Channel Width Related CCA and Rules," IEEE 802.11-14/0880r0, URL: https://mentor.ieee.org/802.11/dcn/14/11-14-0880-00-00ax-increased-network-throughput-with-tx-channel-width-related-cca-and-rules. ppt , Jul. 15, 2014, 13 pages.

* cited by examiner

TECHNIQUES FOR SCALING BANDWIDTH OF AN UNLICENSED RADIO FREQUENCY SPECTRUM BAND

CROSS REFERENCES

The present application for Patent is a Divisional of U.S. patent application Ser. No. 14/695,998 by Yerramalli et al., entitled "Techniques for Scaling Bandwidth of an Unlicensed Radio Frequency Spectrum Band," Apr. 24, 2015 and claims priority to U.S. Provisional Patent Application No. 62/025,358 by Yerramalli et al., entitled "Techniques For Scaling Bandwidth of an Unlicensed Radio Frequency Spectrum Band," filed Jul. 16, 2014, assigned to the assignee hereof, which is hereby incorporated by reference in its entirety.

FIELD OF THE DISCLOSURE

The present disclosure relates to wireless communication systems, and more particularly to wireless communications using, at least in part, an unlicensed radio frequency spectrum band.

DESCRIPTION OF RELATED ART

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station).

Some modes of communication may enable communications with a UE over different radio frequency spectrum bands (e.g., a licensed radio frequency spectrum band and/or an unlicensed radio frequency spectrum band) of a cellular network. With increasing data traffic in cellular networks, the offloading of at least some data traffic to an unlicensed radio frequency spectrum band may provide a cellular operator with opportunities for enhanced data transmission capacity. Prior to gaining access to, and communicating over, the unlicensed radio frequency spectrum band, a transmitting apparatus may, in some examples, implement a Listen Before Talk (LBT) protocol to gain access to the unlicensed radio frequency spectrum band. An LBT protocol may include performing a clear channel assessment (CCA) procedure to determine whether a sub-channel of the unlicensed radio frequency spectrum band is available. When it is determined that a sub-channel of the unlicensed radio frequency spectrum band is available, the transmitting apparatus may communicate over the available sub-channel of the unlicensed radio frequency spectrum band.

SUMMARY

The present disclosure, for example, relates to one or more techniques for scaling the bandwidth of a carrier. Available sub-channels of an unlicensed radio frequency spectrum band may be determined, and the available sub-channels may be included in the carrier. The available sub-channels may be adjacent or non-adjacent sub-channels. The bandwidth of the carrier may be determined according to which sub-channels are included in the carrier. In this way, the bandwidth of the carrier may be scaled according to the available sub-channels in the unlicensed radio frequency spectrum band.

In an example, a method for wireless communication is described. The method may include identifying a plurality of sub-channels in an unlicensed radio frequency spectrum band; and communicating over a carrier using the unlicensed radio frequency spectrum band, the carrier comprising at least a first subset of the plurality of sub-channels, and the first subset comprising at least two sub-channels of the plurality of sub-channels.

In some examples, the method may include performing a first Clear Channel Assessment (CCA) on the plurality of sub-channels based at least in part on an optimistic CCA threshold; and determining a plurality of potential sub-channels based at least in part on the first CCA, the plurality of potential sub-channels comprising at least a second subset of the plurality of sub-channels. In some examples, the method may include performing a second CCA on the plurality of potential sub-channels based at least in part on a redistributed CCA threshold; and determining a plurality of clear sub-channels based at least in part on the second CCA, wherein the carrier comprises the plurality of clear sub-channels. In some examples of the method, the optimistic CCA threshold is based at least in part on a power constraint for a transmission over the plurality of sub-channels. In some examples of the method, the redistributed CCA threshold is based at least in part on a power constraint for a transmission over the second subset of the plurality sub-channels. In some examples of the method, the second CCA comprises CCA countdown slots for the plurality of potential sub-channels, and wherein the communication over the plurality of clear sub-channels is delayed until the CCA countdown slots are exceeded. In some examples of the method, the second CCA is a single joint CCA measuring the sum of energy across the plurality of potential sub-channels.

In some examples of the method, resources of the first subset of the plurality of sub-channels are addressed as one logical group. In some examples of the method, the first subset of the plurality of sub-channels comprises a first sub-channel and at least one second sub-channel, the first sub-channel being non-adjacent to the at least one second sub-channel. In some examples of the method, the resources comprise resource blocks (RBs). In some examples of the method, the RBs are assigned using at least one enhanced physical downlink control channel (ePDCCH), the at least one ePDCCH assigning RBs across the first subset of the plurality of sub-channels. In some examples of the method, the RBs are contiguous across the first subset of the plurality of sub-channels. In some examples of the method, the first subset of the plurality of sub-channels comprises a first sub-channel and at least one second sub-channel, the first sub-channel being non-adjacent to the at least one second sub-channel.

In some examples, the method may include determining a physical uplink control channel (PUCCH), the PUCCH comprising a channel quality indicator (CQI) for the first subset of the plurality of sub-channels. In some examples, the method may include determining at least one ePDCCH, the at least one ePDCCH addressing the first subset of the plurality of sub-channels. In some examples of the method, the at least one ePDCCH comprises at least two transport blocks (TBs). In some examples of the method, each TB of the at least two TBs spans the first subset of the plurality of sub-channels. In some examples of the method, the size of each TB of the at least two TBs is based at least in part on a number of sub-channels in the first subset of the plurality of sub-channels. In some examples of the method, a payload size of the at least one ePDCCH is based at least in part on the bandwidth of the carrier. In some examples of the method, a modulation and coding scheme (MCS) is the same for each sub-channel of the first subset of the plurality of sub-channels. In some examples of the method, an acknowledgement/negative-acknowledgement (ACK/NACK) for the ePDCCH comprises two bits. In some examples of the method, a number of bits in the ePDCCH for RB allocation is based at least in part on the bandwidth of the carrier and a RB group (RBG) size. In some examples of the method, the RBG size is determined based at least in part on a CCA.

In some examples, the method may include determining a plurality of ePDCCHs, the plurality of ePDCCHs addressing the first subset of the plurality of sub-channels. In some examples of the method, each of the ePDCCHs in the plurality of ePDCCHs comprises a PDCCH identification (ID) addressing a segment of RBs. In some examples of the method, a first segment of RBs are addressed by a first PDCCH ID and a second segment of RBs are addressed by a second PDCCH ID. In some examples of the method, each ePDCCH of the plurality of ePDCCHs comprises downlink control information (DCI), and the DCI comprises the PDCCH ID.

In some examples of the method, a maximum number of ePDCCHs in the plurality of ePDCCHs is based at least in part on a bandwidth of the carrier. In some examples of the method, the maximum number of ePDCCHs in the plurality of ePDCCHs is based at least in part on the bandwidth of the carrier divided by a bandwidth of a sub-channel. In some examples of the method, the maximum number of ePDCCHs in the plurality of ePDCCHs is signaled by a radio resource control (RRC) signal. In some examples of the method, the number of ePDCCHs in the plurality of ePDCCHs is adjusted based at least in part on an ePDCCH load and a cell load. In some examples of the method, a maximum number of ePDCCHs in the plurality of ePDCCHs is adjusted using at least one of Medium Access Control (MAC) signaling, an enhanced system information block (eSIB), or a combination thereof. In some examples of the method, the size of the group of RBs is adjusted based at least in part on an ePDCCH load and a cell load.

In some examples of the method, each ePDCCH of the plurality of ePDCCHs comprises data corresponding to a hybrid automatic repeat request (HARQ) process. In some examples of the method, the size of the DCI is based at least in part on the bandwidth of the carrier and a RBG size. In some examples of the method, the RBG size is based at least in part on a CCA. In some examples of the method, each ePDCCH of the plurality of ePDCCHs comprises a grant ID and a carrier indicator field (CIF). In some examples of the method, the plurality of ePDCCHs are located in a search space of a CIF. In some examples of the method, the search space is based at least in part on a grant ID and the CIF. In some examples of the method, the plurality of ePDCCHs are scrambled by multiple cell radio network temporary identifiers (C-RNTIs).

In some examples of the method, uplink ACKs are based at least in part on a number ePDCCH grants and a number of TBs in each ePDCCH in the plurality of ePDCCHs. In some examples of the method, the uplink ACKs are multiplexed based at least in part on a grant ID and a CIF. In some examples of the method, the uplink ACKs are multiplexed based at least in part on a TB ID, a grant ID and a CIF.

In some examples, the method may include determining a carrier map, the carrier map identifying the carrier and the first subset of the plurality of sub-channels; and communicating the carrier map to a user equipment (UE). In some examples of the method, the carrier map is communicated to the UE by a RRC signal. In some examples of the method, the carrier map identifies at least one additional subset of the plurality of sub-channels. In some examples of the method, the carrier map comprises at least one UE mask, the at least one UE mask identifying at least one sub-channel of the plurality of sub-channels for the UE to monitor for downlink (DL) data.

In some examples, the method may include determining a CCA result; and communicating the CCA result to the UE. In some examples of the method, the CCA result is communicated to the UE by broadcasting the CCA result over a carrier using a licensed radio frequency spectrum band. In some examples of the method, the CCA result is communicated to the UE by broadcasting the CCA result over the carrier using the unlicensed radio frequency spectrum band. In some examples of the method, the CCA result is communicated to the UE in DCI comprising a modified radio network temporary identifier (RNTI). In some examples of the method, the CCA result is communicated to the UE with a channel usage beacon signal (CUBS). In some examples of the method, the CCA result identifies at least one sub-channel of the plurality of sub-channels available for communication.

In some examples, the method may include determining at least one available sub-channel of the plurality of sub-channels based at least in part on the at least one UE mask and the CCA result. In some examples of the method, the at least one available sub-channel is determined by combining the at least one UE mask and the CCA result. In some examples of the method, the at least one sub-channel of the plurality of sub-channels identified by the UE mask is dynamically varied. In some examples of the method, the dynamic variation of the UE mask is based at least in part on medium access control (MAC) signaling. In some examples of the method, the dynamic variation of the UE mask is based at least in part on system frame number (SFN) signaling.

In some examples, the method may include communicating a Clear channel assessment Exempt Transmission (CET) over the carrier. In some examples of the method, the CET is repeated on each sub-channel of the first subset of the plurality of sub-channels. In some examples of the method, the CET spans the bandwidth of the carrier. In some examples of the method, the CET is repeated at the same time on each sub-channel of the first subset of the plurality of sub-channels. In some examples of the method, the CET is repeated at different times on each sub-channel of the first subset of the plurality of sub-channels.

In some examples, the method may include communicating over at least one additional carrier using the unlicensed radio frequency spectrum band, the at least one additional carrier comprising at least a second subset of the plurality of sub-channels, and wherein a transmission power for each sub-channel of the first subset of the plurality of sub-channels and the second subset of the plurality of sub-channels is determined based at least in part on a power constraint for the unlicensed radio frequency spectrum band. In some examples of the method, the transmission power for each sub-channel is based at least in part on a number of sub-channels in the first subset of the plurality of sub-channels and a number of sub-channels in the second subset of the plurality of sub-channels.

In some examples of the method, a first sub-channel of the first subset of the plurality of sub-channels is allocated a first transmission power, and at least one second sub-channel of the first subset of the plurality of sub-channels is allocated a second transmission power, the first transmission power being different from the second transmission power. In some examples of the method, the first transmission power and the second transmission power are pre-defined values. In some examples of the method, a CET comprises the pre-defined values. In some examples of the method, the first transmission power and the second transmission power are based at least in part on a desired coverage area for the first sub-channel and the at least one second sub-channel. In some examples of the method, the first transmission power and the second transmission power are based at least in part on a desired capacity for the first sub-channel and the at least one second sub-channel. In some examples of the method, the first transmission power and the second transmission power are based at least in part on a number of sub-channels in the first subset of the plurality of sub-channels.

In some examples, the method may include transmitting a first reference signal on the first sub-channel; and transmitting a second reference signal on the at least one second sub-channel, wherein a transmission power for the first reference signal is the same as a transmission power for the second reference signal. In some examples of the method, the first reference signal and the second reference signal comprise extended Common Reference Signals (eCRS's). In some examples of the method, the first reference signal and the second reference signal comprise Channel State Information Reference Signals (CSI-RS's). In some examples of the method, the transmission powers for the first reference signal and the second reference signal are fixed values.

In some examples, the method may include generating a sequence. In some examples of the method, a number of RBs are used in the sequence generation, the number of RBs being based at least in part on the bandwidth of the carrier. In some examples of the method, the sequence is repeated on each sub-channel of the first subset of the plurality of sub-channels. In some examples of the method, the sequence is generated for the plurality of sub-channels, and the method may include puncturing the sequence based at least in part on the sub-channels in the first subset of the plurality of sub-channels. In some examples of the method, the sub-channels in the first subset of the plurality of sub-channels are determined at least in part by a CCA result. In some examples of the method, the sequence comprises at least one of a demodulation reference signal (DM-RS), an extended common reference signal (eCRS), a channel usage beacon signal (CUBS), or a channel state information reference signal (CSI-RS).

In some examples, the method may include selecting a subset of a plurality of filters corresponding to the first subset of the plurality of sub-channels. In some examples of the method, the selected subset of the plurality of filters spans the bandwidth of the carrier. In some examples of the method, the first subset of the plurality of sub-channels comprises a first sub-channel and at least one second sub-channel, the first sub-channel being non-adjacent to the at least one second sub-channel. In some examples of the method, at least one filter in the selected subset of the plurality of filters spans at least one guard band between two sub-channels.

In another example, an apparatus for wireless communication is described. The apparatus may include a processor, memory in electronic communication with the processor, and instructions stored in the memory. The instructions may be executable by the processor to identify a plurality of sub-channels in an unlicensed radio frequency spectrum band; and communicate over a carrier using the unlicensed radio frequency spectrum band, the carrier comprising at least a first subset of the plurality of sub-channels, and the first subset comprising at least two sub-channels of the plurality of sub-channels. In some examples of the apparatus, the instructions may also be executable by the processor to implement one or more aspects of the examples of the method for wireless communication described above.

In yet another example, an apparatus for wireless communication is described. The apparatus may include means for identifying a plurality of sub-channels in an unlicensed radio frequency spectrum band; and means for communicating over a carrier using the unlicensed radio frequency spectrum band, the carrier comprising at least a first subset of the plurality of sub-channels, and the first subset comprising at least two sub-channels of the plurality of sub-channels. In some examples, the apparatus may further include means for implementing one or more aspects of the examples of the method for wireless communication described above.

In yet another example, a non-transitory computer-readable medium storing computer-executable code for wireless communication is described. The code may be executable by a processor to identify a plurality of sub-channels in an unlicensed radio frequency spectrum band; and communicate over a carrier using the unlicensed radio frequency spectrum band, the carrier comprising at least a first subset of the plurality of sub-channels, and the first subset comprising at least two sub-channels of the plurality of sub-channels. In some examples of the non-transitory computer-readable medium, the code may also be executable by the processor to implement one or more aspects of the examples of the method for wireless communication described above.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
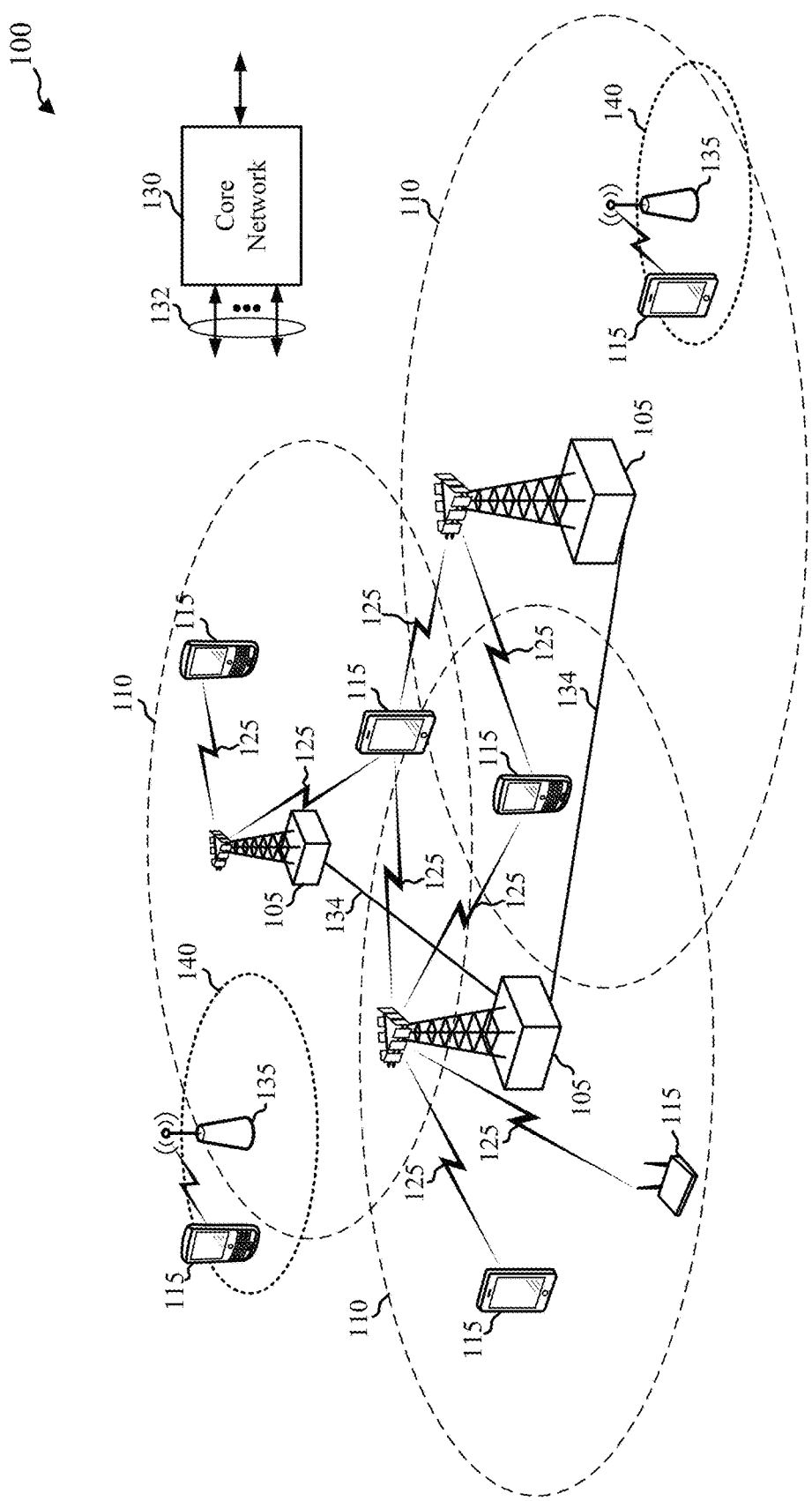
FIG. 1 shows a block diagram of a wireless communication system, in accordance with various aspects of the present disclosure.

Techniques are described for scaling a bandwidth used for communications over an unlicensed radio frequency spectrum band. In some examples, apparatuses may contend for access to the unlicensed radio frequency spectrum band because the unlicensed radio frequency spectrum band is available for public use, such as Wi-Fi use. In some examples, the unlicensed radio frequency spectrum band may be used for cellular communications (e.g., Long Term Evolution (LTE) communications and/or LTE-Advanced (LTE-A) communications).

With increasing data traffic in cellular networks that use a licensed radio frequency spectrum band, offloading of at least some data traffic to an unlicensed radio frequency spectrum band may provide a cellular operator (e.g., an operator of a public land mobile network (PLMN) and/or a coordinated set of base stations defining a cellular network, such as an LTE/LTE-A network) with opportunities for enhanced data transmission capacity. Prior to gaining access to, and communicating over, the unlicensed radio frequency spectrum band, a transmitting apparatus may, in some examples, perform a listen-before-talk (LBT) procedure to gain access to the unlicensed radio frequency spectrum band. Such an LBT procedure may include performing a clear channel assessment (CCA) procedure (or extended CCA procedure (eCCA)) to determine whether a sub-channel of the unlicensed radio frequency spectrum band is available. When it is determined that a sub-channel is available, the transmitting apparatus may communicate over a carrier that includes the available sub-channel. In some examples, it may be determined that multiple sub-channels of the unlicensed radio frequency spectrum band are available. When multiple sub-channels are available, the transmitting apparatus may communicate over a carrier that includes multiple available sub-channels of the unlicensed radio frequency spectrum band.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). LTE and LTE-A are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 shows a block diagram of a wireless communication system 100, in accordance with various aspects of the present disclosure. The wireless communication system 100 may include a plurality of base stations 105, a number of user equipments (UEs) 115, and a core network 130. Some of the base stations 105 may communicate with the UEs 115 under the control of a base station controller (not shown), which may be part of the core network 130 or certain ones of the base stations 105 in various examples. Some of the base stations 105 may communicate control information and/or user data with the core network 130 through backhaul 132. In some examples, some of the base stations 105 may communicate, either directly or indirectly, with each other over backhaul links 134, which may be wired or wireless communication links. The wireless communication system 100 may support operation on multiple carriers (waveform signals of different frequencies). Multi-carrier transmitters can transmit modulated signals simultaneously on the multiple carriers. For example, each communication link 125 may be a multi-carrier signal modulated according to various radio technologies. Each modulated signal may be sent on a different carrier and may carry control information (e.g., reference signals, control channels, etc.), overhead information, data, etc.

The base stations 105 may wirelessly communicate with the UEs 115 via one or more base station antennas. Each of the base stations 105 may provide communication coverage for a respective coverage area 110. In some examples, a base station 105 may be referred to as an access point, a base transceiver station (BTS), a radio base station, a radio transceiver, a basic service set (BSS), an extended service set (ESS), a NodeB, an evolved NodeB (eNB), a Home NodeB, a Home eNodeB, a wireless local area network (WLAN) access point, a Wi-Fi node or some other suitable terminology. The coverage area 110 for a base station 105 may be divided into sectors making up only a portion of the coverage area. The wireless communication system 100 may include base stations 105 of different types (e.g., macro, micro, and/or pico base stations). The base stations 105 may also utilize different radio technologies, such as cellular and/or WLAN radio access technologies. The base stations 105 may be associated with the same or different access networks or operator deployments (e.g., collectively referred to herein as "operators"). The coverage areas of different base stations 105, including the coverage areas of the same or different types of base stations 105, utilizing the same or different radio technologies, and/or belonging to the same or different access networks, may overlap.

In some examples, the wireless communication system 100 may include an LTE/LTE-A communication system (or network), which LTE/LTE-A communication system may support one or more modes of operation or deployment in a licensed radio frequency spectrum band (e.g., a radio frequency spectrum band for which apparatuses do not contend for access because the radio frequency spectrum band is licensed to users for uses, such as for LTE/LTE-A communications) and/or an unlicensed radio frequency spectrum band (e.g., a shared radio frequency spectrum band for which apparatuses may need to contend for access because the radio frequency spectrum band is available for public use, such as Wi-Fi use, or because the radio frequency spectrum band is available for use by two or more operators on a contention basis). In other examples, the wireless communication system 100 may support wireless communication using one or more access technologies different from LTE/LTE-A. In LTE/LTE-A communication systems, the term evolved NodeB or eNB may be, for example, used to describe ones or groups of the base stations 105.

The wireless communication system 100 may be or include a Heterogeneous LTE/LTE-A network in which different types of base stations 105 provide coverage for various geographical regions. For example, each base station 105 may provide communication coverage for a macro cell, a pico cell, a femto cell, and/or other type of cell. Small cells such as pico cells, femto cells, and/or other types of cells may include low power nodes or LPNs. A macro cell, for example, covers a relatively large geographic area (e.g., several kilometers in radius) and may allow unrestricted access by UEs with service subscriptions with the network provider. A pico cell would, for example, cover a relatively smaller geographic area and may allow unrestricted access by UEs with service subscriptions with the network provider. A femto cell would also, for example, cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the base stations 105 via a backhaul 132 (e.g., S1 application protocol, etc.). The base stations 105 may also communicate with one another, e.g., directly or indirectly via backhaul links 134 (e.g., X2 application protocol, etc.) and/or via backhaul 132 (e.g., through core network 130). The wireless communication system 100 may support synchronous or asynchronous operation. For synchronous operation, the eNBs may have similar frame and/or gating timing, and transmissions from different eNBs may be approximately aligned in time. For asynchronous operation, the eNBs may have different frame and/or gating timing, and transmissions from different eNBs may not be aligned in time.

The UEs 115 may be dispersed throughout the wireless communication system 100. A UE 115 may also be referred to by those skilled in the art as a mobile device, a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, etc. A UE 115 may be able to communicate with macro eNBs, pico eNBs, femto eNBs, relays, and the like. A UE 115 may also be able to communicate over different types of access networks, such as cellular or other a wireless wide area networks (WWAN), or WLAN. In some modes of communication with a UE 115, communication may be conducted over a plurality of communication links 125 (i.e., carriers), with each communication links 125 using a carrier between the UE 115 and one of a number of cells (e.g., serving cells, which cells may in some cases be operated by the same or different base stations 105).

Each carrier may be provided over the licensed radio frequency spectrum band or the unlicensed radio frequency spectrum band. A set of carriers used in a mode of communication may all be received (e.g., at a UE 115) over the licensed radio frequency spectrum band, all be received (e.g., at a UE 115) over the unlicensed radio frequency spectrum band, or be received (e.g., at a UE 115) over a combination of the licensed radio frequency spectrum band and the unlicensed radio frequency spectrum band.

Carriers provided over the unlicensed radio frequency spectrum band may include one or more sub-channels of the unlicensed radio frequency spectrum band. Each sub-channel may be associated with a specified bandwidth (e.g., 20 MHz) of the unlicensed radio frequency spectrum band. A carrier may scale bandwidth by adjusting the number of sub-channels of the unlicensed radio frequency spectrum band included in the carrier. The sub-channels included in the carrier may be adjacent sub-channels of the unlicensed radio frequency spectrum band, non-adjacent sub-channels of the unlicensed radio frequency spectrum band, or a combination of adjacent and non-adjacent sub-channels of the unlicensed radio frequency spectrum band.

The communication links 125 shown in wireless communication system 100 may include uplink (UL) communications (e.g., transmissions from a UE 115 to a base station 105) and/or downlink (DL) communications (e.g., transmissions from a base station 105 to a UE 115). The UL communications or transmissions may also be called reverse link communications or transmissions, while the DL communications or transmissions may also be called forward link communications or transmissions. The downlink communications and/or uplink communications may be made using the licensed radio frequency spectrum band, the unlicensed radio frequency spectrum band, or both.

In some examples of the wireless communication system 100, LTE/LTE-A may be deployed under different scenarios using the unlicensed radio frequency spectrum band. The deployment scenarios may include a supplemental downlink mode in which LTE/LTE-A downlink communications in the licensed radio frequency spectrum band may be offloaded to the unlicensed radio frequency spectrum band, a carrier aggregation (CA) mode in which both LTE/LTE-A downlink and uplink communications may be offloaded from the licensed radio frequency spectrum band to the unlicensed radio frequency spectrum band, and/or a standalone mode in which LTE/LTE-A downlink and uplink communications between a base station 105 and a UE 115 may take place in the unlicensed radio frequency spectrum band. Base stations 105 as well as UEs 115 may in some examples support one or more of these or similar modes of operation. OFDMA waveforms may be used in the communication links 125 for LTE/LTE-A downlink communications in the licensed radio frequency spectrum band and/or the unlicensed radio frequency spectrum band, while OFDMA, SC-FDMA and/or resource block interleaved FDMA waveforms may be used in the communication links 125 for LTE/LTE-A uplink communications in the licensed radio frequency spectrum band and/or the unlicensed radio frequency spectrum band.

Figure 2:
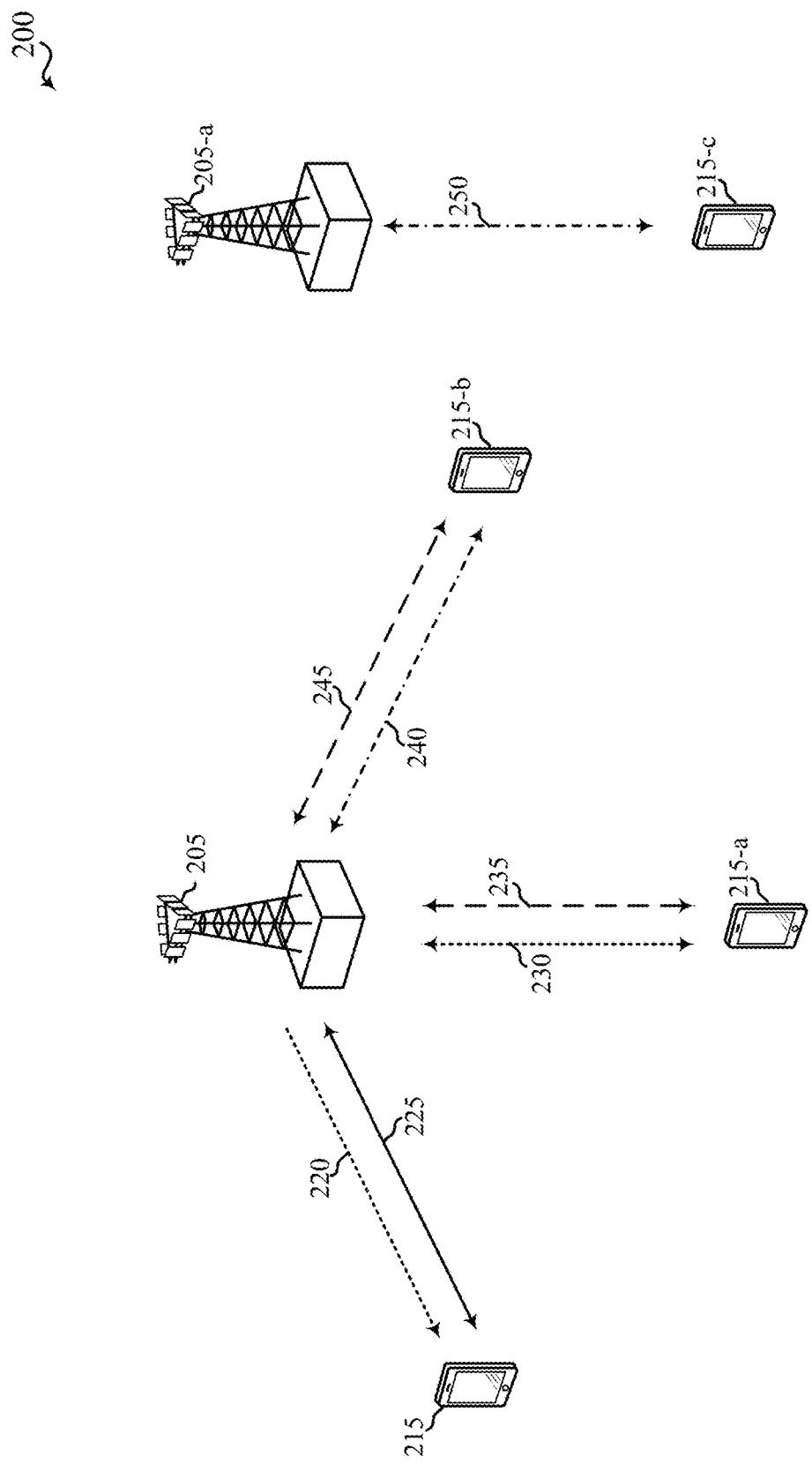
FIG. 2 shows a wireless communication system in which LTE/LTE-A is deployed under different scenarios using an unlicensed radio frequency spectrum band, in accordance with various aspects of the present disclosure.

FIG. 2 shows a wireless communication system 200 in which LTE/LTE-A is deployed under different scenarios using an unlicensed radio frequency spectrum band, in accordance with various aspects of the present disclosure. More specifically, FIG. 2 illustrates examples of a supplemental downlink mode, a carrier aggregation (CA) mode, and a standalone mode in which LTE/LTE-A is deployed using an unlicensed radio frequency spectrum band. The wireless communication system 200 may be an example of portions of the wireless communication system 100 described with reference to FIG. 1. Moreover, a first base station 205 and a second base station 205-a may be examples of aspects of one or more of the base stations 105 described with reference to FIG. 1, while a first UE 215, a second UE 215-a, a third UE 215-b, and a fourth UE 215-c may be examples of aspects of one or more of the UEs 115 described with reference to FIG. 1.

In the example of a supplemental downlink mode in the wireless communication system 200, the first base station 205 may transmit OFDMA waveforms to the first UE 215 using a downlink 220. The downlink 220 may be associated with one or more sub-channels of an unlicensed radio frequency spectrum band, and each sub-channel may be associated with a specified bandwidth (e.g., 20 MHz) of the unlicensed radio frequency spectrum band. The first base station 205 may transmit OFDMA waveforms to the first UE 215 using a first bidirectional link 225 and may receive SC-FDMA waveforms from the first UE 215 using the first bidirectional link 225. The first bidirectional link 225 may be associated with one or frequencies of a licensed radio frequency spectrum band. The downlink 220 in the unlicensed radio frequency spectrum band and the first bidirectional link 225 in the licensed radio frequency spectrum band may operate concurrently. The downlink 220 may provide a downlink capacity offload for the first base station 205. In some examples, the downlink 220 may be used for unicast services (e.g., addressed to one UE) or for multicast services (e.g., addressed to several UEs). This scenario may occur with any service provider (e.g., a mobile network operator (MNO)) that uses a licensed radio frequency spectrum and needs to relieve some of the traffic and/or signaling congestion.

In one example of a carrier aggregation (CA) mode in the wireless communication system 200, the first base station 205 may transmit OFDMA waveforms to the second UE 215-a using a second bidirectional link 230 and may receive OFDMA waveforms, SC-FDMA waveforms, and/or resource block interleaved FDMA waveforms from the second UE 215-a using the second bidirectional link 230. The second bidirectional link 230 may be associated with one or more sub-channels of an unlicensed radio frequency spectrum band, and each sub-channel may be associated with a specified bandwidth (e.g., 20 MHz) of the unlicensed radio frequency spectrum band. The first base station 205 may also transmit OFDMA waveforms to the second UE 215-a using a third bidirectional link 235 and may receive SC-FDMA waveforms from the second UE 215-a using the third bidirectional link 235. The third bidirectional link 235 may be associated with one or more frequencies of a licensed radio frequency spectrum band. The second bidirectional link 230 may provide a downlink and uplink capacity offload for the first base station 205. Like the supplemental downlink described above, this scenario may occur with any service provider (e.g., MNO) that uses a licensed radio frequency spectrum and needs to relieve some of the traffic and/or signaling congestion.

In another example of a carrier aggregation (CA) mode in the wireless communication system 200, the first base station 205 may transmit OFDMA waveforms to the third UE 215-b using a fourth bidirectional link 240 and may receive OFDMA waveforms, SC-FDMA waveforms, and/or resource block interleaved waveforms from the third UE 215-b using the fourth bidirectional link 240. The fourth bidirectional link 240 may be associated with one or more sub-channels of an unlicensed radio frequency spectrum band, and each sub-channel may be associated with a specified bandwidth (e.g., 20 MHz) of the unlicensed radio frequency spectrum band. The first base station 205 may also transmit OFDMA waveforms to the third UE 215-b using a fifth bidirectional link 245 and may receive SC-FDMA waveforms from the third UE 215-b using the fifth bidirectional link 245. The fifth bidirectional link 245 may be associated with one or more frequencies of a licensed radio frequency spectrum band. The fourth bidirectional link 240 may provide a downlink and uplink capacity offload for the first base station 205. This example and those provided above are presented for illustrative purposes and there may be other similar modes of operation or deployment scenarios that combine LTE/LTE-A in licensed radio frequency spectrum bands and unlicensed radio frequency spectrum bands for capacity offload.

As described above, one type of service provider that may benefit from the capacity offload offered by using LTE/LTE-A in shared access radio frequency spectrum is a traditional MNO having access rights to an LTE/LTE-A licensed radio frequency spectrum band. For these service providers, an operational example may include a bootstrapped mode (e.g., supplemental downlink, carrier aggregation) that uses the LTE/LTE-A primary component carrier (PCC) on the licensed radio frequency spectrum band and at least one secondary component carrier (SCC) on the unlicensed radio frequency spectrum band.

In the carrier aggregation (CA) mode, data and control may, for example, be communicated in the licensed radio frequency spectrum (e.g., via first bidirectional link 225, third bidirectional link 235, and fifth bidirectional link 245) while data may, for example, be communicated in the unlicensed radio frequency spectrum band (e.g., via second bidirectional link 230 and fourth bidirectional link 240). The carrier aggregation mechanisms supported when using unlicensed radio frequency spectrum may fall under a hybrid frequency division duplex-time division duplex (FDD-TDD) carrier aggregation or a TDD-TDD carrier aggregation with different symmetry across carriers.

In one example of a standalone mode in the wireless communication system 200, the second base station 205-a may transmit OFDMA waveforms to the fourth UE 215-c using a bidirectional link 250 and may receive OFDMA waveforms, SC-FDMA waveforms, and/or resource block interleaved FDMA waveforms from the fourth UE 215-c using the bidirectional link 250. The bidirectional link 250 may be associated with one or more sub-channels of an unlicensed radio frequency spectrum band, and each sub-channel may be associated with a specified bandwidth (e.g., 20 MHz) of the unlicensed radio frequency spectrum band. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a licensed radio frequency spectrum band.

In some examples, a transmitting apparatus such as one of the base stations 105, 205, and/or 205-a described with reference to FIGS. 1 and/or 2, and/or one of the UEs 115, 215, 215-a, 215-b, and/or 215-c described with reference to FIGS. 1 and/or 2, may use a contention-based protocol to gain access to a sub-channel of an unlicensed radio frequency spectrum band (e.g., to a physical channel of the unlicensed radio frequency spectrum band). The contention-based protocol may be a LBT protocol based on the LBT protocol specified in European Telecommunications Standards Institute (ETSI) (EN 301 893). The LBT protocol may indicate when a transmitting apparatus needs to perform a contention procedure, such as a clear channel assessment (CCA) procedure. The outcome of the CCA procedure may indicate to the transmitting device whether a sub-channel of an unlicensed radio frequency spectrum band is available or in use. When a CCA procedure indicates that the sub-channel is available (e.g., "clear" for use), the transmitting apparatus may reserve and/or use the sub-channel of the unlicensed radio frequency spectrum band. When the CCA procedure indicates that the sub-channel is not available (e.g., that the channel is in use or reserved by another apparatus), the transmitting apparatus may be prevented from using the sub-channel.

In some examples, the CCA procedure may indicate that multiple sub-channels are available. When multiple sub-channels are available, the transmitting apparatus may reserve and/or use the multiple sub-channels of the unlicensed radio frequency spectrum band. The multiple sub-channels may be adjacent or non-adjacent sub-channels of the unlicensed radio frequency spectrum band. The multiple sub-channels may be included in a carrier, and the bandwidth of the carrier may be determined by the sub-channels included in the carrier. In this way, the bandwidth of the carrier may be scaled according to the available sub-channels in the unlicensed radio frequency spectrum band.

As described herein, a carrier with scalable bandwidth may provide several benefits when compared to a CA mode. The scalable bandwidth carrier may have increased capacity due to a reduction in guard bands between sub-channels. The scalable bandwidth carrier may lower control overhead of a PCC DL and UL. Resources used by the scalable bandwidth carrier may be jointly scheduled across the available sub-channels. The scalable bandwidth carrier may have increased resistance to interference by spreading data across a larger number of sub-channels of the unlicensed radio frequency spectrum. Additional benefits are also described herein.

The unlicensed radio frequency spectrum band may include the 5 GHz restricted/limited access network (RLAN) bands as defined by ETSI. The 5 GHz RLAN bands may include two sub-bands. One sub-band may include frequencies from 5150 to 5350 MHz, and the second sub-band may include frequencies from 5470 to 5725 MHz. Each sub-band may include multiple sub-channels. A sub-channel may be the minimum amount of spectrum used by a single transmitting apparatus. A transmitting apparatus may operate (transmit/receive) in one or more adjacent or non-adjacent sub-channels simultaneously. For example, an 802.11n transmitting apparatus may operate in a 40 MHz mode, which may be considered to be operating in two adjacent 20 MHz sub-channels simultaneously. The transmitting apparatus may include a smart antenna system that combines multiple transmit/receive chains with a signal processing function to increase throughput, optimize radiation, and/or optimize reception capabilities. Examples of smart antenna systems include spatial multiplexing, beamforming, cyclic delay diversity, and multiple-input multiple-output (MIMO). The radio frequency (RF) output power of the transmitting apparatus may be the mean effective isotropic radiated power (EIRP) during a transmission burst. Power density may be the mean EIRP density during a transmission burst.

A nominal sub-channel bandwidth may be the widest band of frequencies, inclusive of guard bands, assigned to a single sub-channel. The nominal sub-channel bandwidth may be, for example, 5 MHz or more. An occupied sub-channel bandwidth may be the bandwidth containing 99% of the power of a transmitted signal. The occupied sub-channel bandwidth may be, for example, between 80% and 100% of the nominal sub-channel bandwidth. If a transmitting apparatus uses a smart antennas system, then each transmit chain of the smart antenna system may have a nominal sub-channel bandwidth and an occupied sub-channel bandwidth as described above. During an established communication, a transmitting apparatus may operate temporarily in a mode where its occupied sub-channel bandwidth is reduced to, for example, 40% of its nominal sub-channel bandwidth. In some examples, the transmitting apparatus may have a minimum occupied sub-channel bandwidth of 4 MHz. Total occupied bandwidth may be a total of the nominal sub-channel bandwidths in case of simultaneous transmissions in adjacent or non-adjacent sub-channels. The total occupied bandwidth may change with time and/or payload. A channel plan may indicate the center frequency of a sub-channel and the declared nominal bandwidth for the center frequency. The center frequency of a sub-channel may be declared by a manufacturer as part of the channel plan.

Figure 3A:
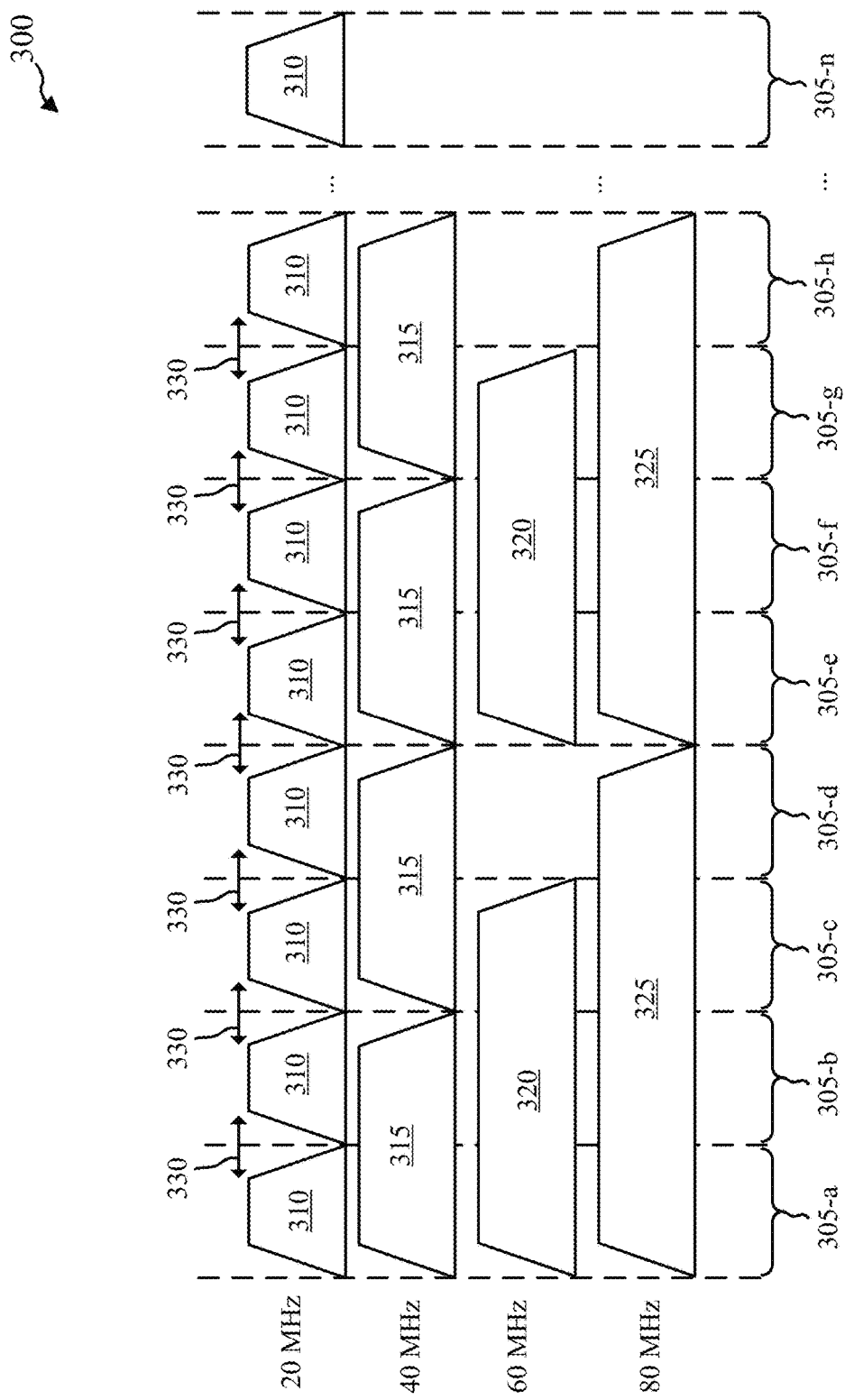
FIG. 3A illustrates examples of sub-channels of an unlicensed frequency spectrum band, in accordance with various aspects of the present disclosure.

FIG. 3A illustrates examples of sub-channels of an unlicensed radio frequency spectrum band 300, in accordance with various aspects of the present disclosure. The unlicensed radio frequency spectrum band 300 may include sub-channels 305-$a$ through 305-$n$, where n is greater than or equal to two. Each sub-channel of the sub-channels 305-$a$ through 305-$n$ may include a range of frequencies (i.e., a bandwidth) of the unlicensed radio frequency spectrum band 300. Each sub-channel of the sub-channels 305-$a$ through 305-$n$ may have a specified nominal bandwidth (e.g., 20 MHz).

A transmitting apparatus may use a carrier to communicate over the unlicensed radio frequency spectrum band 300. The carrier may include one or more of the sub-channels 305-$a$ through 305-$n$. The total occupied bandwidth of the carrier may be determined according to which sub-channels of the sub-channels 305-$a$ through 305-$n$ are included in the carrier. If one non-adjacent sub-channel (e.g., sub-channel 305-$a$) is included in the carrier, the carrier may include a one sub-channel bandwidth 310. The one sub-channel bandwidth 310 may have a nominal bandwidth of, for example, 20 MHz. If two adjacent sub-channels (e.g., sub-channel 305-$a$ and sub-channel 305-$b$) are included in the carrier, the carrier may include a two sub-channel bandwidth 315. The two sub-channel bandwidth 315 may have a nominal bandwidth of, for example, 40 MHz. If three adjacent sub-channels (e.g., sub-channel 305-$b$, sub-channel 305-$c$, and sub-channel 305-$d$) are included in the carrier, the carrier may include a three sub-channel bandwidth 320. The three sub-channel bandwidth 320 may have a nominal bandwidth of, for example, 60 MHz. If four adjacent sub-channels (e.g., sub-channel 305-$a$, sub-channel 305-$b$, sub-channel 305-$c$, and sub-channel 305-$d$) are included in the carrier, the carrier may include a four sub-channel bandwidth 325. The four sub-channel bandwidth 325 may have a nominal bandwidth of, for example, 80 MHz. While not shown in FIG. 3, the carrier may include sub-channel bandwidths corresponding to five, six, seven, and so on, up to n, sub-channels 305 of the unlicensed radio frequency spectrum band 300.

The carrier may include any combination of adjacent and non-adjacent sub-channels 305 of the unlicensed radio frequency spectrum band 300. Therefore, the carrier may include one or more of the one sub-channel bandwidth 310, the two sub-channel bandwidth 315, the three sub-channel bandwidth 320, the four sub-channel bandwidth 325, larger sub-channel bandwidths (not shown), and/or combinations thereof. For example, if the carrier includes sub-channel 305-$a$, sub-channel 305-$e$, and sub-channel 305-$f$, then the carrier may include a one sub-channel bandwidth 310 associated with sub-channel 305-a, and a two sub-channel bandwidth 315 associated with sub-channels 305-e and 305-f. As another example, if the carrier includes sub-channel 305-b, sub-channel 305-c, sub-channel 305-d, sub-channel 305-f, and sub-channel 305-h, then the carrier may include a three sub-channel bandwidth 320 corresponding to sub-channels 305-b through 305-d, and two one sub-channel bandwidths 310 corresponding to sub-channel 305-f and sub-channel 305-h, respectively.

The total occupied bandwidth of the carrier may correspond to the number of sub-channels of the sub-channels 305-a through 305-n included in the carrier. For example, if each sub-channel has a bandwidth of 20 MHz, and the carrier includes two sub-channels (adjacent, non-adjacent, or a combination thereof, such as two one sub-channel bandwidths 310 or a single two sub-channel bandwidth 315), then the carrier may have a total occupied bandwidth of 40 MHz. If the carrier includes four sub-channels (adjacent, non-adjacent, or a combination thereof, such as a one sub-channel bandwidth 310 and a three sub-channel bandwidth 320), then the carrier may have a total occupied bandwidth of 80 MHz.

The sub-channel bandwidths that include multiple sub-channels 305 (such as the two sub-channel bandwidth 315, the three sub-channel bandwidth 320, and/or the four sub-channel bandwidth 325) may increase the capacity of the carrier, as compared to a conventional carrier aggregation configuration. In a conventional carrier aggregation configuration, each sub-channel of an unlicensed radio frequency spectrum band may be treated as an independent carrier, and separated by a guard band 330. The guard band 330 may include a range of frequencies between two sub-channels that are not used for communication. The guard band 330 may help prevent interference between two sub-channels. By combining two or more sub-channels 305 of the unlicensed radio frequency spectrum band 300 into a larger sub-channel bandwidth (such as the two sub-channel bandwidth 315, the three sub-channel bandwidth 320, and/or the four sub-channel bandwidth 325), the frequencies in the guard bands 330 between the sub-channels 305 may be available for communication. For example, a two sub-channel bandwidth 315 may have a higher capacity than two one sub-channel bandwidths 310, because the two one sub-channel bandwidths 310 may include at least one additional guard band 330, and thus have fewer usable frequencies.

The sub-channels 305 that are included in the carrier may be determined by a CCA procedure. The sub-channels 305 that are included in the carrier may be determined to be available by the CCA procedure. Adjacent available sub-channels 305 may be combined into larger sub-channel bandwidths (such as the two sub-channel bandwidth 315, the three sub-channel bandwidth 320, and/or the four sub-channel bandwidth 325), and non-adjacent available sub-channels 305 may be used as a one sub-channel bandwidth 310. The carrier may use any combination of adjacent and non-adjacent available sub-channels. In this way, a carrier may scale bandwidth according to the available sub-channels determined by the CCA procedure.

In some examples, when a transmitting apparatus has simultaneous transmissions in adjacent sub-channels, these transmissions may satisfy one power envelope (i.e., spectral mask) corresponding to a signal with a nominal sub-channel bandwidth of "N" times the individual nominal sub-channel bandwidths, where "N" is the number of adjacent sub-channels. For example, the nominal sub-channel bandwidth of a three sub-channel bandwidth 320 may correspond to three times the nominal sub-channel bandwidth of a one sub-channel bandwidth 310. When the transmitting apparatus has simultaneous transmissions in non-adjacent sub-channels, these transmissions may satisfy separate power envelopes (i.e., spectral masks), each corresponding to a signal with a nominal sub-channel bandwidth of the individual sub-channel. For example, three 20 MHz transmissions on three adjacent sub-channels may be equivalent to a single 60 MHz transmission, and may satisfy a power spectral mask of a 60 MHz sub-channel. While two 20 MHz transmissions on non-adjacent sub-channels may satisfy a power spectral mask of each individual 20 MHz sub-channel.

In some examples, when a transmitting apparatus transmits simultaneously on multiple (adjacent or non-adjacent) initial sub-channels of the unlicensed radio frequency spectrum, the transmitting apparatus may add additional sub-channels if an additional CCA procedure does not detect any signals on those sub-channels. If the additional CCA procedure is performed at a different time than the CCA procedure that cleared the initial sub-channels, then the additional sub-channels may clear the CCA procedure when leakage (e.g., in-band interference) among sub-channels falls below a threshold. Therefore, in some examples, the CCA procedure may be performed without (or before) self-interference cancellation of signals from other sub-channels.

Figure 3B:
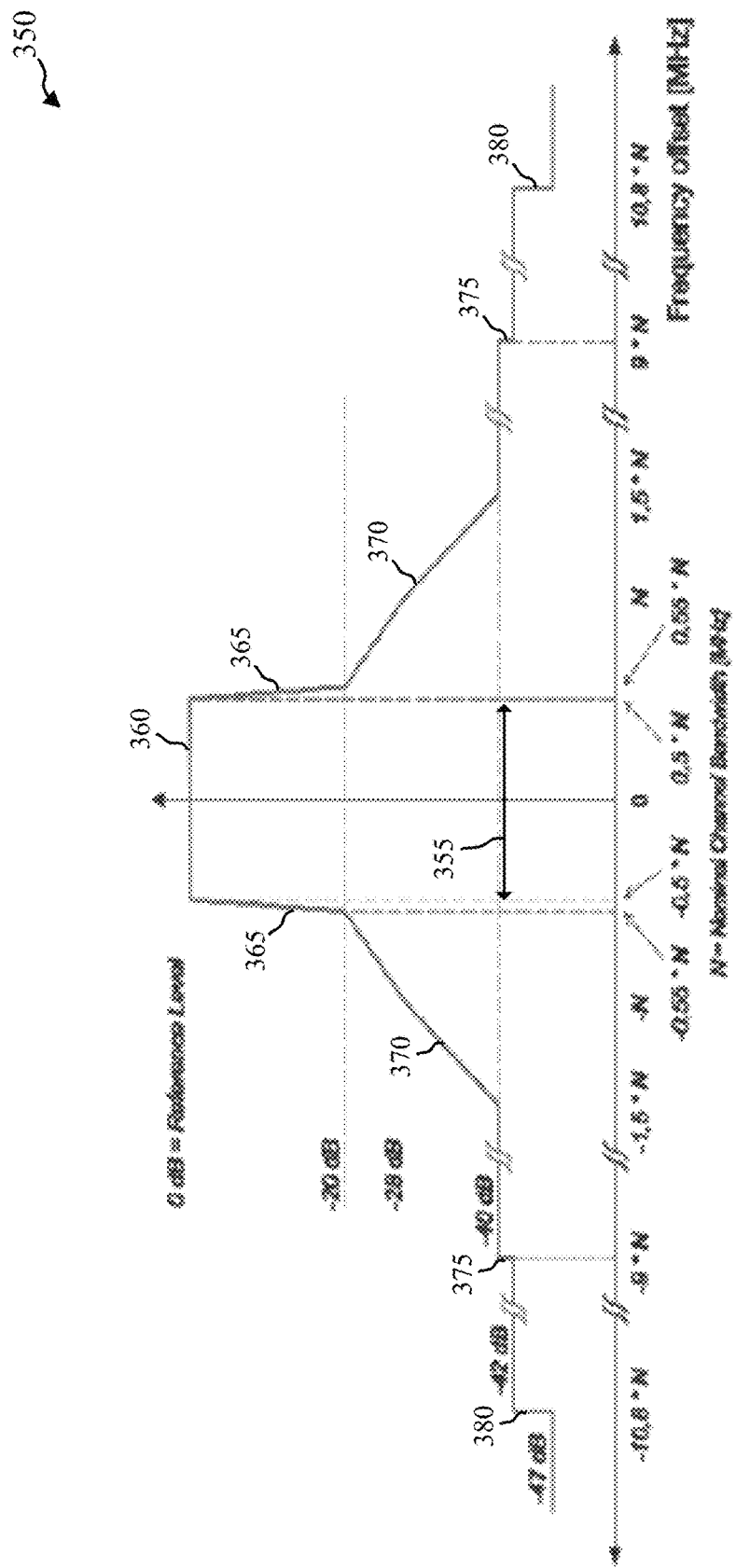
FIG. 3B shows an example of power spectrum mask for a nominal sub-channel bandwidth, in accordance with various aspects of the present disclosure.

FIG. 3B shows an example of a power spectrum mask 350 for a nominal sub-channel bandwidth, in accordance with various aspects of the present disclosure. Simultaneous transmissions in adjacent sub-channels may be considered as one signal with a nominal sub-channel bandwidth 355 of "N" times an individual nominal sub-channel bandwidth, where "N" is the number of adjacent sub-channels used simultaneously. The nominal sub-channel bandwidth 355 may have a reference power level 360 of 0 dB. The power level of the power spectrum mask 350 may drop to −20 dB at first transition bands 365. The first transition bands 365 may be, for example, at frequencies corresponding to approximately +/−0.55*N. The power level of the power spectrum mask 350 may gradually decrease to −40 dB at second transition bands 370. The second transition bands 370 may be, for example, at frequencies corresponding to frequencies approximately between −0.55*N and −1.5*N, and frequencies approximately between 0.55*N and 1.5*N. The power level of the power spectrum mask 350 may remain at approximately −40 dB through a range of frequencies up to approximately +/−9*N, where the power level may drop to −42 dB at third transition bands 375. The power level of the power spectrum mask 350 may remain at approximately −42 dB through another range of frequencies up to approximately +/−10.8*N, where the power level may drop to −47 dB at fourth transition bands 380.

For simultaneous transmissions in multiple non-adjacent sub-channels, the overall transmit spectral power mask may be constructed as follows. First, a mask as shown in FIG. 3B may be applied to each of the sub-channels. Then, for each frequency point, the highest value from the spectral masks applied to the sub-channels may be taken as the overall spectral mask requirement at that frequency.

Transmission power may be limited by power constraints. The power constraints may be determined by standardization organizations and/or governmental regulations (e.g., ETSI regulations and/or FCC regulations). The power constraints may apply to a system as a whole and in any possible configuration, including smart antenna systems. In case of multiple (adjacent or non-adjacent) sub-channels within a sub-band of an unlicensed radio frequency spectrum band, the total RF output power may not exceed a total power constraint (TPC) for the sub-band. For example, the 5150 MHz to 5350 MHz sub-band of the 5 GHz RLAN unlicensed radio frequency spectrum band may have a TPC of 23 dBm.

Licensed radio frequency spectrum bands and unlicensed radio frequency spectrum bands may be subject to different regulations and protocols. In licensed radio frequency spectrum bands, transmission power limits may be defined per carrier. While in unlicensed radio frequency spectrum bands, transmission power limits may be defined per sub-band, and the transmission power may be shared among all of the transmissions in a given sub-band. Each sub-band of an unlicensed radio frequency spectrum band may contain several carriers/sub-channels. Due to the transmission power limits in the unlicensed radio frequency spectrum bands, the coverage area of transmissions may decrease as more sub-channels (i.e., bandwidth) of the unlicensed radio frequency spectrum band are utilized. Table 1 illustrates an example of the relationship between bandwidth, power penalty, range penalty, and coverage area for an unlicensed radio frequency spectrum band.

TABLE 1

| Bandwidth (MHz) | Power Penalty per 20 MHz (dB) | Range Penalty (Coeff = 3.67) | Coverage Area |
|---|---|---|---|
| 20 | 0 (Reference) | D | A |
| 40 | 3 | 0.82D | 0.67A |
| 60 | 4.8 | 0.74D | 0.54A |
| 80 | 6 | 0.68D | 0.46A |
| 100 | 7 | 0.64D | 0.40A |
| 120 | 7.8 | 0.61D | 0.37A |
| 160 | 9 | 0.56D | 0.31A |
| 200 | 10 | 0.53D | 0.28A |

Wi-Fi is an example of a technology utilizing an unlicensed radio frequency spectrum band. Wi-Fi may be a time division multiplexing (TDM) system. Wi-Fi may address a single station (STA) in each channel access opportunity. Wi-Fi may choose transmission bandwidth per STA per packet based on distance and/or path-loss to compensate for the total power constraint of the sub-band of the unlicensed radio frequency spectrum band. The transmission power may be spread across the whole bandwidth of the sub-band for closer STAs. The transmission power may be concentrated in one 20 MHz channel when transmitting to far away STAs. Beacons and a subset of control and management frames may be transmitted on a primary channel with 20 MHz bandwidth. This may allow the beacons and control and management frames to reach all users within the Wi-Fi coverage area. Wi-Fi communications using multi-user MIMO may assume the same bandwidth is used to address all the users in that transmission. Conventional Wi-Fi deployments may not use multiple carriers within the same unlicensed radio frequency spectrum band.

LTE/LTE-A communications system over an unlicensed radio frequency spectrum band may be an OFDMA system. Multiple UEs may be frequency multiplexed within the same subframe (in addition to TDM). The bandwidth for a transmission may be fixed per radio frame. The bandwidth chosen for the transmission may determine the set of UEs that are addressable in the radio frame. Therefore, in LTE/LTE-A communications over an unlicensed radio frequency spectrum band, there may be tradeoffs between coverage area, bandwidth, frame size, and delay, among other considerations.

Figure 4:
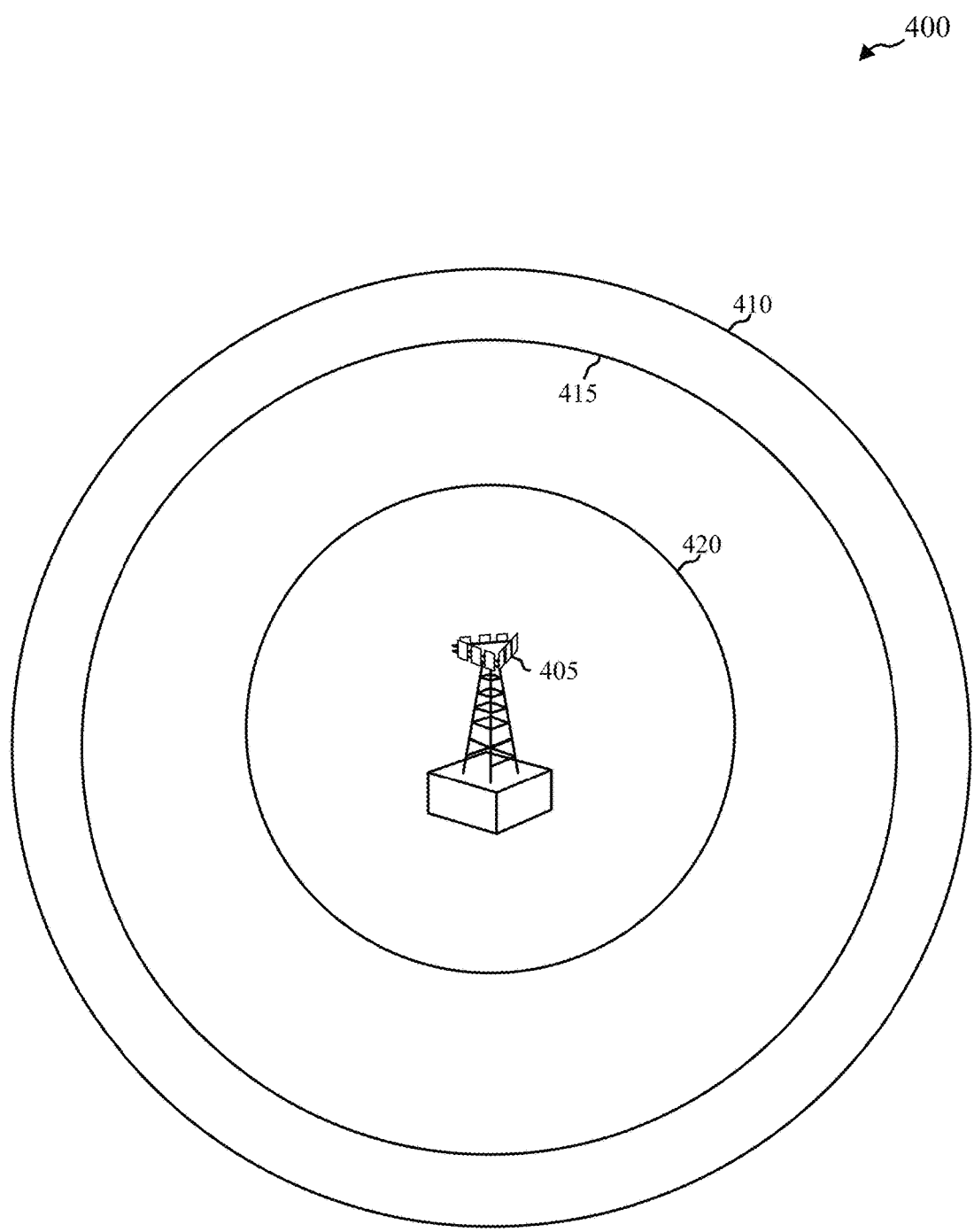
FIG. 4 shows examples of coverage areas for an unlicensed radio frequency spectrum band deployment, in accordance with various aspects of the present disclosure.

FIG. 4 shows examples of coverage areas for an unlicensed radio frequency spectrum band deployment 400, in accordance with various aspects of the present disclosure. A base station 405 may be at approximately the center of the unlicensed radio frequency spectrum band deployment 400. Based at least in part on the number of sub-channels of the unlicensed radio frequency spectrum band used for a transmission, the coverage area of the deployment may vary. For example, a transmission using one sub-channel of the unlicensed radio frequency spectrum band may have a first coverage area 410. The transmission using one sub-channel may have a bandwidth of, for example, 20 MHz. Another example transmission may use two sub-channels of the unlicensed radio frequency spectrum band and may have a second coverage area 415. The transmission using two sub-channels may have a bandwidth of, for example, 40 MHz. A third example transmission may use three sub-channels of the unlicensed radio frequency spectrum band and have a third coverage area 420. The transmission using three sub-channels may a bandwidth of, for example, 80 MHz.

As shown in FIG. 4, as the bandwidth of a transmission increases, the coverage area may decrease. This relationship may be due to the transmission power limits of the unlicensed radio frequency spectrum band. As more bandwidth of the unlicensed radio frequency spectrum band is used, the transmission power within each of the used sub-channels may be decreased in order to keep the total transmission power within the transmission power limit.

A scalable bandwidth transmission may use a frame structure similar to an LTE frame structure. The scalable bandwidth frame may be similar in time to a 20 MHz LTE frame. The scalable bandwidth frame may have 14 OFDM symbols with normal cyclic prefixes (CPs), and a duration of 1 ms. The number of resource blocks (RBs) in a scalable bandwidth frame may be increased to span the whole bandwidth if the physical carrier bandwidth is increased. For example, a scalable bandwidth transmission with a bandwidth of 40 MHz may include 210 to 215 RBs. This may represent a 5% capacity increase over a transmission using two individual 20 MHz sub-channels in a CA configuration. As another example, a scalable bandwidth transmission using 60 MHz of bandwidth may include 320 RBs. This may represent a 6.66% capacity increase over a transmission using three individual 20 MHz sub-channels in a CA configuration. As a third example, a scalable bandwidth transmission using 80 MHz of bandwidth may include 430 to 435 RBs. This may represent a 7.5% capacity increase over a transmission using four individual 20 MHz sub-channels in a CA configuration. Additional increases in capacity may be possible with larger bandwidth transmissions.

The physical increase in carrier bandwidth of a scalable bandwidth transmission may lead to the use of a large fast Fourier transform (FFT) size. For example, a scalable bandwidth transmission with a physical bandwidth of 40 MHz may use a 3072 point FFT; a scalable bandwidth transmission with a physical bandwidth of 60 MHz may use a 4096 point FFT; and a scalable bandwidth transmission with a physical bandwidth of 80 MHz may use a 6144 point FFT. The logical increase in carrier bandwidth of a scalable bandwidth transmission may lead to the use of several FFTs. For example, a scalable bandwidth transmission using multiple non-adjacent sub-channels, each with a bandwidth of 20 MHz, may use multiple 20 MHz FFTs corresponding to each of the non-adjacent sub-channels.

A scalable bandwidth transmission may use a CCA procedure to determine which sub-channels of an unlicensed radio frequency spectrum band may be used for the transmission. A carrier of the scalable bandwidth transmission may be composed of several sub-channels. Each sub-channel may have a bandwidth of, for example, 20 MHz. In some examples, an independent CCA procedure may be performed over each sub-channel of the unlicensed radio frequency spectrum band or sub-band to determine which sub-channels may be used for the scalable bandwidth transmission. The sub-channels used for the scalable bandwidth transmission may be a function of the energy detected for each sub-channel (i.e., interference conditions), traffic load, among other considerations, by the CCA procedure. The independent CCA procedure performed over each sub-channel may result in different bandwidth transmissions for every radio frame.

For frame-based equipment (FBE), the CCA procedures across all the sub-channels of the unlicensed frequency spectrum band or sub-band may be synchronized with each other. In other words, a CCA procedure is performed on each sub-channel at the same time. The scalable bandwidth transmission may begin at the conclusion of the CCA procedures, and may include all sub-channels that clear the CCA procedures. The synchronous CCA procedures may prevent sub-channels of an eNB (and of eNBs across deployments) from blocking each other.

The CCA procedure for a scalable bandwidth transmission may consider the transmission power limits for an unlicensed radio frequency spectrum band or sub-band. In some examples, a CCA threshold for each sub-channel of an unlicensed radio frequency spectrum band or sub-band may be adjusted based on the TPC of the sub-band and the number of sub-channels that may clear the CCA procedure. For example, a sub-band of the unlicensed radio frequency spectrum band may have a TPC of 23 dBm, and the sub-band may include four sub-channels, each with a bandwidth of 20 MHz. The CCA threshold (T) used by the CCA procedure to determine whether a sub-channel is clear may be calculated as T=−60+TPC−P, where P is a redistributed transmission power (in dBm) determined by the number of sub-channels available for communication. The CCA procedure may compare a measured power of a sub-channel to the CCA threshold T to determine whether the sub-channel is available for communication.

For example, if one sub-channel with a bandwidth of 20 MHz clears a CCA procedure, then a transmission on that sub-channel may use up to the full TPC of 23 dBm. Therefore, P may equal 23 dBm, and T may equal −60. This may be referred to as a pessimistic CCA threshold, because the CCA threshold is based on one sub-channel being used for transmission.

If two sub-channels with a total bandwidth of 40 MHz clear a CCA procedure, then transmissions on each of those sub-channels may use up to 20 dBm of transmission power. Therefore, P would equal 20 dBm, and T would equal −57. The transmission power of 20 dBm on each sub-channel may keep the total transmission power across the 40 MHz bandwidth of the two sub-channels under the TPC of 23 dBm.

If three sub-channels with a total bandwidth of 60 MHz clear a CCA procedure, then transmissions on each of those sub-channels may use up to 18.23 dBm of transmission power. Therefore, P would equal 18.23 dBm, and T would equal −55.23. The transmission power of 18.23 dBm on each sub-channel may keep the total transmission power across the 60 MHz bandwidth of the three sub-channels under the TPC of 23 dBm.

If four sub-channels with a total bandwidth of 80 MHz clear a CCA procedure, then transmissions on each of those sub-channels may use up to 17 dBm of transmission power. Therefore, P would equal 17 dBm, and T would equal −54. The transmission power of 17 dBm on each sub-channel may keep the total transmission power across the 80 MHz bandwidth of the four sub-channels under the TPC of 23 dBm. The CCA threshold of −54 may be referred to as an optimistic threshold, because the CCA threshold is based on all four sub-channels of the sub-band being used for transmission.

In some examples, a first CCA procedure may be performed on sub-channels of an unlicensed radio frequency spectrum band or sub-band using an optimistic CCA threshold. The optimistic CCA threshold may be based on an expectation that all the sub-channels of the unlicensed radio frequency spectrum band or sub-band will be used for transmission. Using the optimistic CCA threshold, a number of sub-channels may clear the first CCA procedure. Based on the number of sub-channels that clear the first CCA procedure using the optimistic CCA threshold, a subsequent CCA threshold may be determined. The subsequent CCA threshold may be based on a redistributed transmission power that corresponds to the number of sub-channels that cleared the first CCA procedure. A subsequent CCA procedure may then be performed on the sub-channels of the unlicensed radio frequency spectrum band or sub-band using the subsequent CCA threshold. In some examples, the subsequent CCA threshold may be lower than the optimistic CCA threshold, which may cause different sub-channels to clear the subsequent CCA procedure. In some examples, the subsequent CCA threshold may be lower than the optimistic CCA threshold due to an increased transmission power caused by redistributing the transmission power across fewer sub-channels.

For example, a first CCA procedure may be performed on four sub-channels of a sub-band of an unlicensed radio frequency spectrum band. The first CCA procedure may measure the power on each sub-channel as [−53, −58, −56, −95], where each value corresponds to the measured power of a respective sub-channel. Using an optimistic CCA threshold of −54, the last three sub-channels may clear the first CCA procedure. A second CCA threshold may then be determined based on a redistributed transmission power for three sub-channels (e.g., 18.23 dBm). The second CCA threshold may be, for example, −55.23. A second CCA procedure may then be performed on the four sub-channels of the sub-band using the second CCA threshold. The last three sub-channels may also clear the second CCA procedure, and may be used for transmission at the redistributed transmission power. The multiple CCA thresholds and redistributed transmission power may optimize the transmission power and bandwidth for a scalable bandwidth transmission.

As another example, a first CCA procedure may measure the power on four sub-channels of a sub-band as [−53, −55, −56, −95], where each value corresponds to the measured power of a respective sub-channel. Using an optimistic CCA threshold of −54, the last three sub-channels may clear the first CCA procedure. A second CCA threshold may then be determined based on a redistributed transmission power for three sub-channels (e.g., 18.23 dBm). The second CCA threshold may be, for example, −55.23. A second CCA procedure may then be performed on the four sub-channels of the sub-band using the second CCA threshold. The last two sub-channels may clear the second CCA procedure. A third CCA threshold may then be determined based on a redistributed transmission power for two sub-channels (e.g., 20 dBm). The third CCA threshold may be, for example, −57. A third CCA procedure may then be performed on the four sub-channels of the sub-band using the third CCA threshold. The fourth sub-channel may clear the third CCA procedure, and may be used for transmission at the redistributed transmission power. The multiple CCA thresholds and redistributed transmission power may optimize the transmission power and bandwidth for a scalable bandwidth transmission.

For load-based equipment (LBE), the power measurement results for all CCA slots may be used to determine the available sub-channels. For LBE, an extended CCA countdown for each sub-channel may not be synchronized. Therefore, there may be tradeoff between the CCA countdown duration and the number of sub-channels that are able to clear the CCA procedure. In some examples, the number of slots for the CCA countdown for all sub-channels may be set to a maximum number. The maximum number may be determined according to statistics of the CCA procedure. A scalable bandwidth transmission may then use all the sub-channels that clear the CCA procedure once the maximum number of slots for all sub-channels are exceeded. For example, a transmitting apparatus may complete a CCA procedure for a first sub-channel two slots before the CCA procedure for a second sub-channel is completed. The transmitting apparatus may then wait two slots before transmitting on the first sub-channel, so that the transmission on the first and second sub-channels may be performed at the same time. If the two sub-channels are adjacent, then subsequent CCA procedures may use fewer slots for those sub-channels.

If all sub-channels remain unavailable after the maximum number of slots are exceeded, then the CCA procedure may restart at the next radio frame boundary. The CCA counter may be reset at the next radio frame. In some examples, the CCA procedure may be performed on sub-channels which are known not to have RF leakage from other active sub-channel s.

In some examples, a joint CCA procedure may be performed over all sub-channels of an unlicensed radio frequency spectrum band or sub-band. In some examples, a scalable bandwidth transmission may be performed if the detected energy summed across all sub-channels is less than a joint CCA threshold. If the detected energy summed across all sub-channels is greater than the joint CCA threshold, then no scalable bandwidth transmission may be performed. The joint CCA threshold may be calculated as −73 dBm/MHz+ 23−$P_T$, where $P_T$ is the EIRP (in dBm) of a transmitter of the transmitting apparatus. For example, a transmitter at 23 dBm for a 20 MHz transmission may have a joint CCA threshold of −60 dBm. While a transmitter at 23 dBm for a 40 MHz transmission may have a joint CCA threshold of −57 dBm. Instead of summing the detected energy across all sub-channels, in some examples, a scalable bandwidth transmission may be performed if the joint CCA procedure is successful on every sub-channel of an unlicensed radio frequency spectrum band or sub-band. The joint CCA procedure may result in the scalable bandwidth transmission having a fixed bandwidth corresponding to the sub-channels on which the joint CCA procedure is performed.

The joint CCA procedure may allow a single FFT to be used for the full band of all sub-channels of the unlicensed radio frequency spectrum band or sub-band. The joint CCA procedure may also allow for simpler RF and filtering for satisfying the spectral mask of all the sub-channels. The joint CCA procedure may also allow guard bands between the sub-channels to be utilized. Additionally, the joint CCA procedure may allow a carrier using the sub-channels to have a fixed power and numerology for physical downlink shared channels (PDSCHs) and enhanced physical downlink control channels (ePDCCHs). This may lead to simplified processing and more consistent channel quality indicator (CQI) measurements, among other benefits. However, strong interference on one sub-channel may result in the joint CCA procedure producing sub-optimal sub-channel utilization.

Transmissions in an unlicensed radio frequency spectrum band using Wi-Fi technology may utilize different CCA techniques. For example, carrier sense multiple access (CSMA) may be used on a primary channel, while CCA may be used for a point coordination function (PCF) interfame space (PIFS) duration on a secondary channel before expiration of a primary backoff counter. If one of the secondary channels is not idle, a UE may restart the contention process on the primary channel. The Wi-Fi CCA procedure may cover all allowed bandwidth combinations to determine if a channel is idle. Wi-Fi may use a dynamic bandwidth transmission, however the transmission bandwidth may be a function of CCA results and each transmission may be contiguous in frequency. In addition, the Wi-Fi primary and secondary channels may use different CCA thresholds.

In contrast, for LTE transmissions in an unlicensed radio frequency spectrum band, all sub-channels of a carrier may be equivalent, including in supplemental downlink (SDL) and CA modes. The sub-channels may not be classified into primary and secondary channels. While LTE SDL and CA modes in an unlicensed radio frequency spectrum band may include a primary channel, it is located in the licensed radio frequency spectrum band. For the LTE CA mode in an unlicensed radio frequency spectrum band, a carrier in the unlicensed radio frequency spectrum band may be designated as a PCC. In addition, CCA thresholds may be a function of the transmission power allocated to each sub-channel.

Techniques using fixed/contiguous bandwidth transmissions may not use a transmission medium as efficiently as a scalable bandwidth transmission. A fixed bandwidth transmission may not occur when all sub-channels are not available. A transmission using contiguous but variable bandwidth may significantly under-utilize available bandwidth if inner sub-channels are unavailable. For example, a Wi-Fi channelization may use a primary20 channel, a secondary20 channel, a secondary40 channel, and a secondary80 channel. If one 20 MHz sub-channel in the secondary80 channel is not available, then the whole secondary80 channel may not be used.

Bandwidth utilization may be increased by utilizing transmissions with scalable bandwidth and including non-contiguous sub-channels. A carrier for a scalable bandwidth transmission may be composed of several adjacent or non-adjacent sub-channels. Each sub-channel may have a bandwidth of, for example, 20 MHz. Independent CCA procedures may be performed for each sub-channel to allow for transmissions using a variable amount of bandwidth. The sub-channels used for the scalable bandwidth transmission may be determined based at least in part on the energy detected on each sub-channel. In some examples, the sub-channels used for the scalable bandwidth transmission may also be determined based at least in part the load, channel state information (CSI), neighbor list, and/or other considerations. In some examples, the resources of the carrier used for the scalable bandwidth transmission may be jointly controlled. For example, the resources across all the sub-channels of the carrier may logically grouped and addressed.

A carrier aggregation (CA) mode may use four carriers in an unlicensed radio frequency spectrum band. For example, the CA mode may use an anchor carrier with a bandwidth of 20 MHz in a licensed radio frequency spectrum band and 200 MHz of bandwidth in an unlicensed radio frequency spectrum band. The 200 MHz of bandwidth may include 80 MHz in a UNII-1 sub-band, 80 MHz in a UNII-2A sub-band, 20 MHz in a UNIT-2B sub-band, and 20 MHz in a UNII-3 sub-band. This CA configuration may allow an eNB to use full power in some 20 MHz sub-bands to increase coverage and may also provide increased capacity on the 80 MHz sub-bands. For example, 60 users may be associated with the eNB. The 60 users may include 20 users using the licensed spectrum, 20 users using the two 80 MHz unlicensed bandwidths (10 users in UNII-1 and 10 users in UNII-2A), and 20 users using the two 20 MHz unlicensed bandwidths (10 users in UNII-2B and 10 users in UNII-3). A carrier with scalable bandwidth may allow for more efficient use of the unlicensed radio frequency spectrum band.

In some examples, a CA mode may schedule downlinks across multiple carriers using one or more ePDCCHs. In some examples, the CA mode ePDCCHs may assume that all channels are always clear. Each ePDCCH payload may be 65 to 72 bits, with a 5 bit carrier indicator field (CIF). Macro almost blank subframes (ABS's) may cause the ePDCCH to be sent at aggregation level 2. Macro non-ABS's may cause the ePDCCH to be sent at aggregation level 4. The ePDCCH may have 80 control channel elements (CCEs) available for scheduling, of which 8 may be used for a common search space. The number of ePDCCHs that may be scheduled in a UE specific search space may vary. For example, ABS's may schedule 36 ePDCCHs, of which 30 may be DL and 6 may be UL. Non-ABS's may schedule 18 ePDCCHs, of which 15 may be DL and 3 may be UL. For non-ABS's, the CA mode may use up to 11 carriers (1 in an unlicensed radio frequency spectrum band, and up to 10 in the licensed radio frequency spectrum band), and up to 15 DL grants may be given. The control capacity of the CA mode for non-ABS's may be limited. For ABS, each carrier may be given 3 grants on average (e.g., 36/11 DL+1 UL carriers). The control capacity of the CA mode for ABS's may be greater than for non-ABS's, but the capacity is not unlimited. For TDD carriers in the unlicensed radio frequency spectrum band, both DL and UL grants may share control capacity in the DL subframes. Therefore, the control capacity may also be limited in the TDD mode.

In some examples, the CA mode may schedule downlinks across multiple carriers using a combination of PDCCHs and ePDCCHs. An ePDDCH may include 15-20 RBs, which may substantially increase the control channel capacity. However, a significant amount of capacity may be lost to users using the licensed radio frequency spectrum band and not the unlicensed radio frequency spectrum band. Therefore other solutions may be preferred. For example, the ePDCCH may be used for self-scheduling on the unlicensed radio frequency spectrum band. Self-scheduling may be scalable, both in a SDL mode and a CA mode. Self-scheduling also may not have control capacity limitations. Scheduling may be further improved by reducing the number of grants a UE needs to decode when being served at a higher bandwidth, and reducing the latency for data in a hybrid automatic repeat request (HARQ) process buffer when the result of a CCA procedure is not clear. In addition, adjusting the control channel capacity to respond to demand may further improve cross carrier scheduling.

In some examples, the CA may use CQI feedback. The uplink feedback may depend on a coherence time. For example, a transmitting apparatus traveling at 3 km/h and transmitting at 5.5 GHz may experience a 15 Hz Doppler shift, which may result in a 66 ms coherence time. In some examples, at least one channel state information (CSI) report for every sub-channel and for every UE may be produced every 20 ms.

For wideband reporting, one CQI report per subframe may be produced for UEs using a licensed radio frequency spectrum band and not an unlicensed radio frequency spectrum band (e.g., 20 UEs/20 subframes). For UEs using 20 MHz of bandwidth of the unlicensed radio frequency spectrum band (e.g., LTE-U), two wideband CQI reports may be produced per subframe (e.g., 20 UEs*2/20 subframes). For UEs using 80 MHz of bandwidth of the unlicensed radio frequency spectrum band (e.g., LTE in an unlicensed radio frequency spectrum band), five wideband CQI reports may be produced per subframe (e.g., 20 UEs*5/20 subframes). On average, eight wideband CQI reports per subframe may be produced, and may use two RBs of a physical uplink control channel (PUCCH) format (e.g., PUCCH format 2a/2b/3).

For UE selected sub-band reporting (e.g., 4 sub-bands in 20 MHz), five CQI reports per subframe may be produced for UEs using a licensed radio frequency spectrum band and not an unlicensed radio frequency spectrum band (e.g., 20 UEs*5 reports per UE/20 subframes). For UEs using 20 MHz of bandwidth of the unlicensed radio frequency spectrum band (e.g., LTE in an unlicensed radio frequency spectrum band), 10 UE selected sub-band CQI reports may be produced per subframe (e.g., 20 UEs*10 reports per UE/20 subframes). For UEs using 80 MHz of bandwidth of the unlicensed radio frequency spectrum band (e.g., LTE-U), 25 UE selected sub-band CQI reports may be produced per subframe (e.g., 20 UEs*25 reports per UE/20 subframes). On average, 40 UE selected sub-band CQI reports per subframe may be produced in the UL, and may use 8 RBs of a PUCCH format (e.g., PUCCH format 2a/2b/3).

Additional RBs may be used for acknowledgement (ACK) reporting if the CQI and ACK reporting instances for a UE do not match. In some examples, the PUCCH format may enable CQI reports for multiple carriers and/or multiple sub-channels of a carrier.

Figure 5:
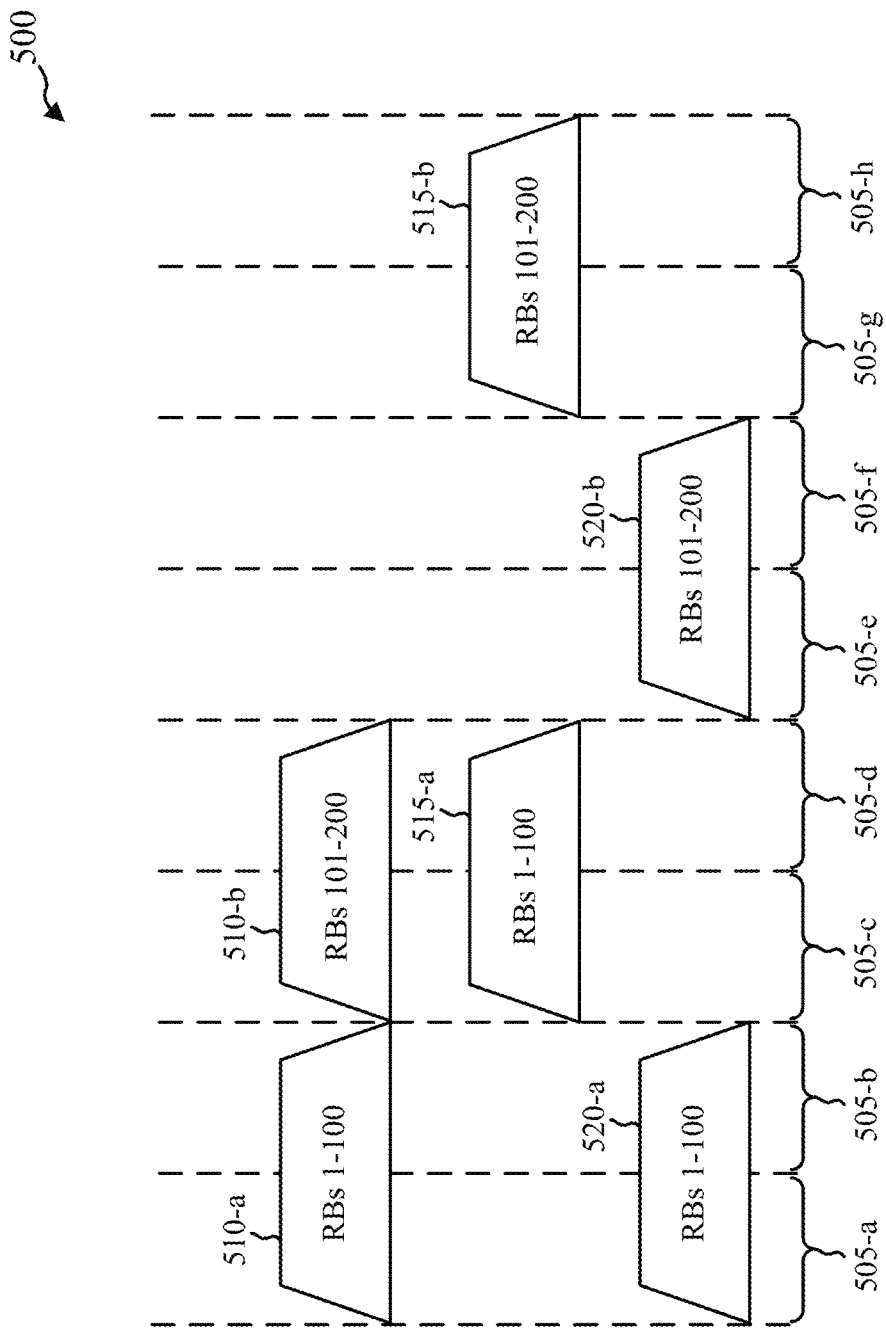
FIG. 5 illustrates examples of RB segments for carriers with scalable bandwidth in an unlicensed radio frequency spectrum band, in accordance with various aspects of the present disclosure.

FIG. 5 illustrates examples of RB segments for carriers with scalable bandwidth in an unlicensed radio frequency spectrum band 500, in accordance with various aspects of the present disclosure. The unlicensed resources of a carrier with scalable bandwidth may be jointly controlled. A carrier may include several sub-channels 505-*a* through 505-*h*. Each sub-channel 505-*a* through 505-*h* may have a bandwidth of, for example, 20 MHz. In some examples, the sub-channels used by the carrier may be specified by a radio resource control (RRC) message as part of a secondary cell (SCell) addition. Each sub-channel 505-*a* through 505-*h* may be used independently for a scalable bandwidth transmission, and the sub-channels 505-*a* through 505-*h* used for the scalable bandwidth transmission may be based on the results of a CCA procedure.

The resources (i.e., RBs) of the carrier may be spread across the sub-channels included in the carrier. An example of a carrier may include sub-channels 505-*a* through 505-*d*. The resources of the carrier may grouped into two segments, a first RB segment 510-*a* spread contiguously across sub-channel 505-*a* and sub-channel 505-*b*, and a second RB segment 510-*b* spread contiguously across sub-channel 505-*c* and sub-channel 505-*d*. In addition, the first RB segment 510-*a* may be contiguous to the second RB segment 510-*b*. The first RB segment 510-*a* may include RBs 1-100, and the second RB segment 510-*b* may include RBs 101-200. The first RB segment 510-*a* and the second RB segment 510-*b* may be logically grouped and jointly controlled across the sub-channels 505-*a* through 505-*d*.

Another example of a carrier may include sub-channel 505-*c*, sub-channel 505-*d*, sub-channel 505-*g*, and sub-channel 505-*h*. The resources of the carrier may grouped into two segments, a first RB segment 515-*a* spread contiguously across sub-channel 505-*c* and sub-channel 505-*d*, and a second RB segment 515-*b* spread contiguously across sub-channel 505-*g* and sub-channel 505-*h*. The first RB segment 515-*a* may include RBs 1-100, and the second RB segment 515-*b* may include RBs 101-200. The two RB segments 515-*a* and 515-*b* may be logically grouped and jointly controlled across the sub-channels 505-*c*, 505-*d*, 505-*g*, and 505-*h*.

A third example of a carrier may include sub-channel 505-*a*, sub-channel 505-*b*, sub-channel 505-*e*, and sub-channel 505-*f*. The resources of the carrier may grouped into two segments, a first RB segment 520-*a* spread contiguously across sub-channel 505-*a* and sub-channel 505-*b*, and a second RB segment 520-*b* spread contiguously across sub-channel 505-*e* and sub-channel 505-*f*. The first RB segment 520-*a* may include RBs 1-100, and the second RB segment 520-*b* may include RBs 101-200. The two RB segments 520-*a* and 520-*b* may be logically grouped and jointly controlled across the sub-channels 505-*a*, 505-*b*, 505-*e*, and 505-*f*.

A carrier may include any combination of the sub-channels 505-*a* through 505-*h* (adjacent, non-adjacent, or a combination thereof), or additional sub-channels (not shown) extending before and/or after sub-channels 505-*a* through 505-*h*. The logical grouping and joint control of the resources included in the carrier may not be dependent upon the location of the sub-channels within the unlicensed radio frequency spectrum band. The resources may be contiguous, non-contiguous, or a combination thereof. The logical grouping and joint control of the RBs may be used in RB assignment using one or more ePDCCHs. The logical grouping and joint control of the RBs may also be used in PDSCH processing. Due to the logical grouping and joint control of the RBs, the ePDCCH/PDCSH processing at a UE may be identical for the three sub-channel configurations shown in FIG. 5.

In some examples, the multiple sub-channels included in a scalable bandwidth carrier may be jointly controlled with one ePDCCH per carrier. The ePDCCH may include two transport blocks (TBs). Each TB may span the multiple sub-channels included in the carrier, and the TB size may increase linearly with the number of sub-channels included in the carrier. Therefore, the ePDCCH payload size may be a function of the total bandwidth of the carrier. In some examples, a modulation and coding scheme (MCS) may be the same for each sub-channel included in the carrier. In some examples, an acknowledgement/negative-acknowledgement (ACK/NACK) for the ePDCCH may be two bits, irrespective of the number of sub-channels included in the carrier. The number of bits of the ePDCCH used for RB allocation may be based on the total bandwidth of the carrier and the RB group (RBG) size. The RBG size may be dynamically determined based on the sub-channels that clear a CCA procedure and a UE mask.

In some examples, the multiple sub-channels included in a scalable bandwidth carrier may be jointly controlled with multiple unicast ePDCCHs per carrier per UE. Each of the multiple ePDCCHs may be indexed with a PDCCH identification (ID). The PDCCH ID may be a field of the downlink control information (DCI). In some examples, each of the multiple ePDCCHs may address the entire bandwidth of the carrier. Alternatively or in addition, each of the multiple ePDCCHs may be pre-configured to address a portion of the bandwidth of the carrier, if the bandwidth is too large. For example, PDCCH IDs 0 to 2 may address RBs 1-500, PDCCH IDs 3-5 may address RBs 501-1000, and so on. A RBG size for a carrier may be set statically or semi-statically. The RBG size may determine the payload size of each of the multiple ePDCCHs.

The number of ePDCCHs per UE per transmission time interval (TTI) may vary from 0 to NumPDCCH. NumPDCCH may be a function of the bandwidth of the carrier and may vary for each radio frame as the sub-channels included in the carrier varies. NumPDCCH may be RRC signaled to each UE. For example, NumPDCCH may take one of the values of the set: $\{1, 2, \ldots, M=(\text{Bandwidth of Carrier})/(\text{Bandwidth of Sub-Channel})\}$. The RBG size and NumPDCCH (and therefore the maximum number of ePDCCHs for a UE) may be changed quickly by using medium access control (MAC) elements to adjust to changing ePDCCH load and cell load demands. Multiple HARQ processes may be maintained per carrier. The number of HARQ processes may equal NumPDCCH. Each of the multiple ePDCCHs may carry data corresponding to the multiple HARQ processes.

Jointly controlling multiple sub-channels of a scalable bandwidth carrier may improve scheduling flexibility in terms of the number of ePDCCHs, the payload size, the number of TBs per carrier, and varying MCS, among other considerations. The size of a DCI may be dynamically determined based on the total bandwidth of the carrier and the RBG size. The number of ePDCCHs for each scalable bandwidth carrier may be dynamically adjusted to account for the changing bandwidths of the carriers. The joint control configuration may be different for ABS and non-ABS subframes, which may provide further flexibility.

Each of the multiple ePDCCHs for joint control may include an additional grant ID in addition to the CIF to aid in managing the ePDCCH scheduling complexity. In some examples, multiple ePDCCHs may be included in the same search space of the CIF. Alternatively or in addition, the search space may be a function of the grant ID and the CIF. In some examples, the multiple ePDCCHs may be scrambled by multiple cell radio network temporary identifiers (C-RNTIs). The multiple C-RNTIs may be exclusive to carriers using the unlicensed radio frequency spectrum band. The exclusive C-RNTIs may reduce false alarms.

In some examples, the number of bits used for an uplink ACK may be a based on the number of ePDCCH grants per carrier and the number of TBs per ePDCCH grant. For example, if one ePDCCH grant is used for the entire bandwidth of the carrier, and there are two TBs in the grant, then the uplink ACK may reuse current reporting. If multiple ePDCCH grants are used, and there are two TBs per grant, then the uplink ACKs may be multiplexed based on the grant ID and the CIF. In some examples, a CA mode may use just the CIF for multiplexing the uplink ACKs. Multiplexing uplink ACKs may be a straight extension to current reporting. If multiple ePDCCH grants are used, and there are more than two TBs per grant, then the uplink ACKs may be multiplexed based on TB IDs, grant IDs, and CIF. In some examples, HARQ bundling may be reused to reduce load.

In some examples, the availability of DL sub-channels may be determined using DL transmission detection. The discovery and subsequent numerology of the available DL bandwidth may be based on the detection of a channel usage beacon signal (CUBS). Strong interferers near the UEs may affect the reliability of the CUBS detection. The reliability may depend upon correctly determining the presence or absence of eNB transmissions in each sub-channel.

In some examples, a carrier map may increase the robustness of DL transmissions in an unlicensed radio frequency spectrum band. An eNB may signal a map of all scalable bandwidth carriers and their occupied sub-channels of the unlicensed radio frequency spectrum band to a UE. The eNB may signal the carrier map in a RRC message. The carrier map message may also include a UE mask. The UE mask may identify a set of sub-channels of each carrier that the UE should monitor for DL data. For example, an eNB may signal two scalable bandwidth carriers to a UE. The first carrier may include sub-channels with a total bandwidth of 60 MHz, where each sub-channel has a bandwidth of 20 MHz. The second carrier may include sub-channels with a total bandwidth of 100 MHz, where each sub-channel has a bandwidth of 20 MHz. Therefore, the carrier map may include a mask for the first carrier that equals [1 1 1 0 0 0 0 0] (i.e., the first carrier includes the first three 20 MHz sub-channels). The carrier map may also include a mask for the second carrier that equals [0 0 0 1 1 1 1 1] (i.e., the second carrier includes the last five 20 MHz sub-channels).

In one example, the eNB may be in communication with four UEs. The eNB may send a first UE mask for the first UE that equals [0 1 0 0 0 0 0 0] (i.e., the first UE should monitor the second 20 MHz sub-channel for DL data). The eNB may send a second UE mask for the second UE that equals [1 1 0 0 0 1 1 1] (i.e., the second UE should monitor five sub-channels with a total bandwidth of 100 MHz for DL data). The eNB may send a third UE mask for the third UE that equals [1 1 1 0 0 0 0 0] (i.e., the third UE should monitor three sub-channels with a total bandwidth of 60 MHz for DL data). The eNB may send a fourth UE mask for the fourth UE that equals [1 1 1 0 1 1 1 1] (i.e., the fourth UE should monitor seven sub-channels with a total bandwidth of 140 MHz for DL data).

The eNB may also broadcast a CCA result to the UEs. The CCA result may be broadcast either on a carrier in a licensed radio frequency spectrum band or on some/all of the carriers in the unlicensed radio frequency spectrum band. Broadcasting on some/all of the carriers in the unlicensed radio frequency spectrum band may allow for cross carrier CUBS confirmation. For example, the CCA result may equal [1 1 0 0 1 0 1 1] (i.e., first, second, fifth, seventh, and eighth sub-channels are clear). In some examples, the CCA result may be included in a DCI with a modified RNTI.

Each UE may then validate the result of CUBS detection and may also determine the available bandwidth that the UE may utilize for a radio frame. A UE may determine the available bandwidth for a radio frame by combining the UE mask the UE received from the UE with the CCA result the UE received from the eNB. The UE may combine the UE mask and the CCA result by performing an AND operation on the UE mask and CCA result. For example, the combination of the first UE mask and the CCA result may be [0 1 0 0 0 0 0 0] AND [1 1 0 0 1 0 1 1]=[0 1 0 0 0 0 0 0] (i.e., the first UE may utilize one 20 MHz sub-channel of the first carrier). For another example, the combination of the fourth UE mask and the CCA result may be [1 1 1 0 1 1 1 1] AND [1 1 0 0 1 0 1 1]=[1 1 0 0 1 0 1 1] (i.e., the fourth UE may utilize two sub-channels of the first carrier with a total bandwidth of 40 MHz, and may also utilize three sub-channels of the second carrier with a total bandwidth of 60 MHz). The combination of the UE mask and the CCA result may provide a confirmation of the CUBS detection.

In some examples, a UE mask may be dynamically varied. The variation in the UE mask may be based on a system frame number (SFN), MAC signaling, or other considerations. Dynamically varying the UE mask may allow for increased variation in the set of sub-channels that the UE monitors for DL data.

Figure 6:
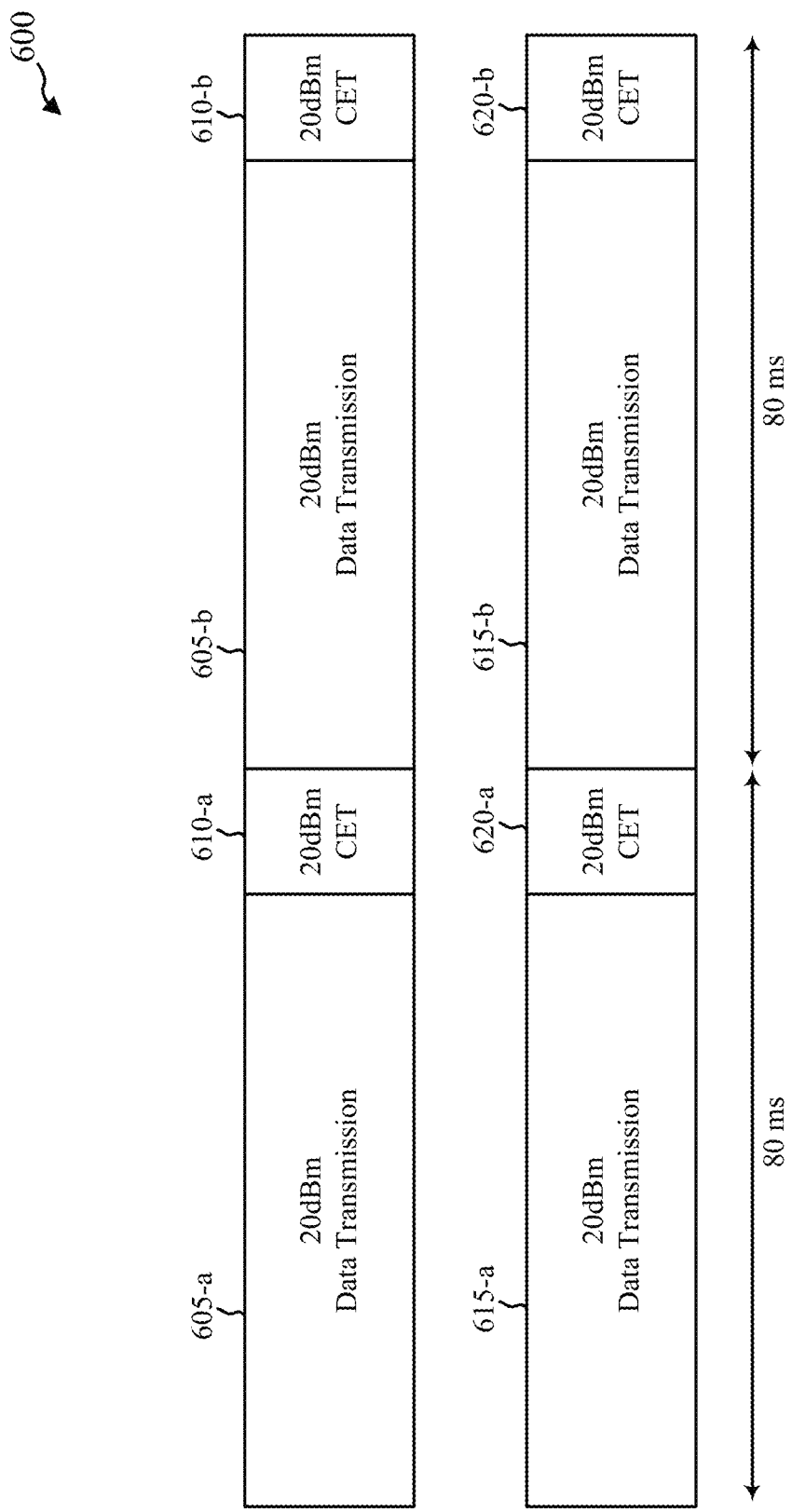
FIG. 6 shows a timing diagram illustrating an example of a CCA exempt transmission (CET) location, in accordance with various aspects of the present disclosure.

FIG. 6 shows a timing diagram 600 illustrating an example of a CCA exempt transmission (CET) location, in accordance with various aspects of the present disclosure. In some examples, a CET may be transmitted on a scalable bandwidth carrier using an unlicensed radio frequency spectrum band. In some examples, the CET location may be the same for all the sub-channels included in the carrier, and the transmit power for the CET may be distributed evenly between the CETs of each available sub-channel. The sub-channels included in the carrier may include sub-channels that have cleared a CCA procedure. As shown in FIG. 6, a first sub-channel may include a first data transmission 605-*a* and a second data transmission 605-*b*. A first CET 610-*a* may be located after the first data transmission 605-*a* of the first sub-channel. A second CET 610-*b* may be located after the second data transmission 605-*b* of the first sub-channel. In some examples, the first data transmission 605-*a* and the first CET 610-*a* of the first sub-channel may have a duration of 80 ms. The second data transmission 605-*b* and the second CET 610-*b* of the first sub-channel may also have a duration of 80 ms.

A second sub-channel may include a first data transmission 615-*a* and a second data transmission 615-*b*. A first CET 620-*a* may be located after the first data transmission 615-*a* of the second sub-channel. A second CET 620-*b* may be located after the second data transmission 615-*b* of the second sub-channel. In some examples, the first data transmission 615-*a* and the first CET 620-*a* of the second sub-channel may have a duration of 80 ms. The second data transmission 615-*b* and the second CET 620-*b* of the second sub-channel may also have a duration of 80 ms. Additional data transmissions and CETs (not shown) may occur prior to or after the data transmissions and CETs shown in FIG. 6.

As shown in FIG. 6, the data transmissions and CETs occur at the same time in each sub-channel. If the sub-band of the unlicensed radio frequency spectrum band containing the sub-channels has a TPC of 23 dBm, then the transmit power for the data transmissions and the CETs may be 20 dBm to keep the total transmit power across the transmitting sub-channels below the TPC. By repeating a CET at the same time for each sub-channel of a carrier, UEs capable of different bandwidths may be supported. No assumptions may be necessary for combining CETs across different sub-channels. Repeating the CET at the same time for each sub-channel of a carrier may also allow for the discovery of partially overlapping neighbor eNBs (e.g., by using the bandwidth and sub-channel ID of an enhanced physical broadcast channel (ePBCH)).

In some examples, CETs may be transmitted at the same time across the entire possible bandwidth of the carrier, including sub-channels that have not cleared a CCA procedure. The CETs spanning the entire possible bandwidth of the carrier may carry a larger payload and thus may have a shorter duration than a CET spanning just the sub-channels included in the carrier.

Figure 7:
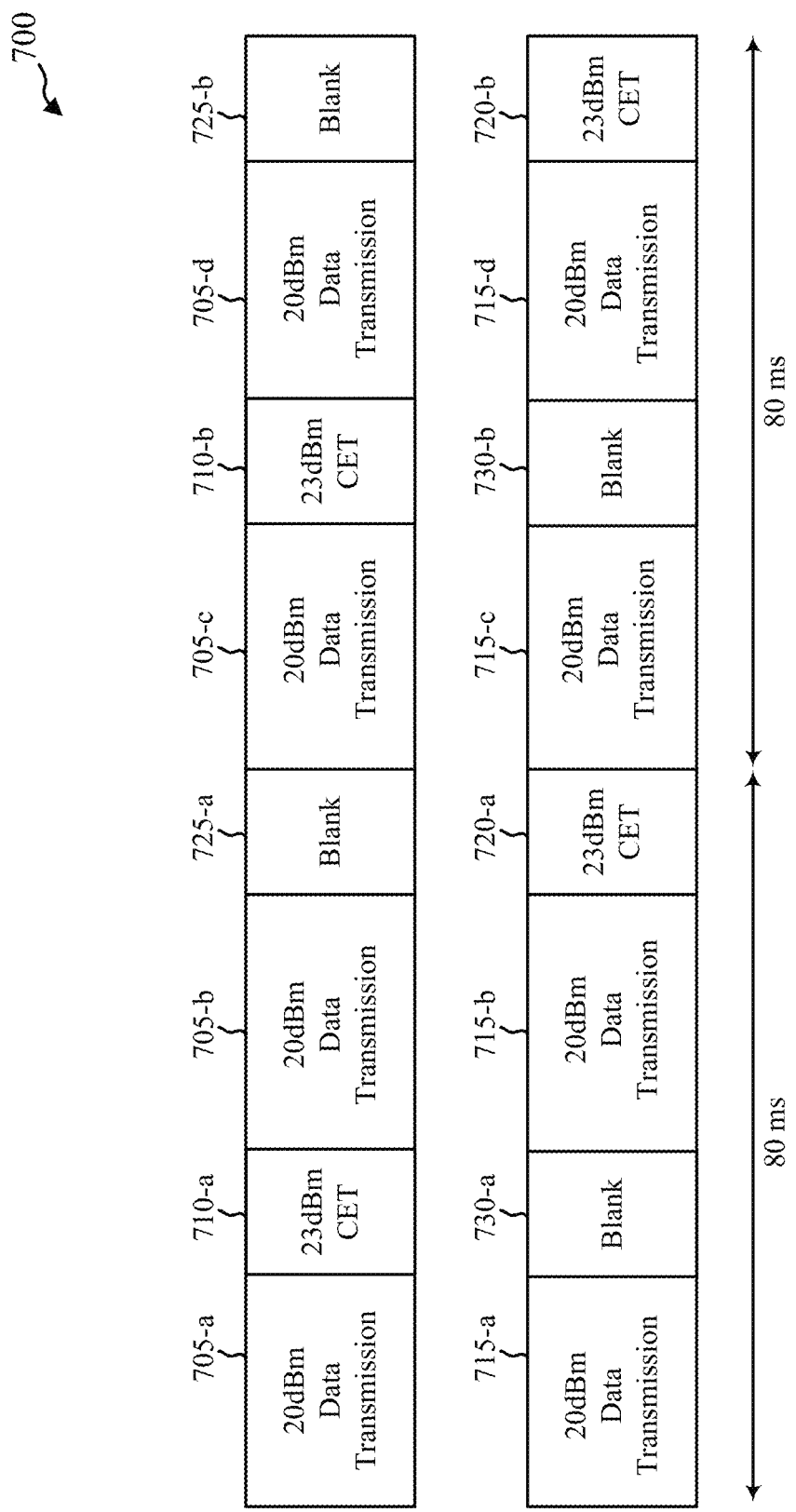
FIG. 7 shows a timing diagram illustrating another example of a CET location, in accordance with various aspects of the present disclosure.

FIG. 7 shows a timing diagram 700 illustrating another example of a CCA exempt transmission (CET) location, in accordance with various aspects of the present disclosure. As shown in FIG. 7, CETs may be staggered in time across the sub-channels included in the carrier. In some examples, a first sub-channel may include a first data transmission 705-*a*, a second data transmission 705-*b*, a third data transmission 705-*c*, and a fourth data transmission 705-*d*. A first CET 710-*a* may be located after the first data transmission 705-*a* of the first sub-channel. A first blank interval 725-*a* may be located after the second data transmission 705-*b* of the first sub-channel. The first blank interval 725-*a* may be a duration of time in which no transmissions occur on the first sub-channel. A second CET 710-*b* may be located after the third data transmission 705-*c* of the first sub-channel. And a second blank interval 725-*b* may be located after the fourth data transmission 705-*d* of the first sub-channel. The second blank interval 725-*b* may be a duration of time in which no transmissions occur on the first sub-channel. In some examples, the first data transmission 705-*a*, the first CET 710-*a*, the second data transmission 705-*b*, and the first blank interval 725-*a* of the first sub-channel may have a duration of 80 ms. The third data transmission 705-*c*, the second CET 710-*b*, the fourth data transmission 705-*d*, and the second blank interval 725-*b* of the first sub-channel may also have a duration of 80 ms.

A second sub-channel may include a first data transmission 715-*a*, a second data transmission 715-*b*, a third data transmission 715-*c*, and a fourth data transmission 715-*d*. A first CET 720-*a* may be located after the first data transmission 715-*a* of the second sub-channel. A first blank interval 730-*a* may be located after the second data transmission 715-*b* of the second sub-channel. The first blank interval 730-*a* may be a duration of time in which no transmissions occur on the second sub-channel. A second CET 720-*b* may be located after the third data transmission 715-*c* of the second sub-channel. And a second blank interval 730-*b* may be located after the fourth data transmission 715-*d* of the second sub-channel. The second blank interval 730-*b* may be a duration of time in which no transmissions occur on the second sub-channel. In some examples, the first data transmission 715-*a*, the first CET 720-*a*, the second data transmission 715-*b*, and the first blank interval 730-*a* of the second sub-channel may have a duration of 80 ms. The third data transmission 715-*c*, the second CET 720-*b*, the fourth data transmission 715-*d*, and the second blank interval 730-*b* of the second sub-channel may also have a duration of 80 ms. Additional data transmissions, CETs, and blank intervals (not shown) may occur prior to or after the data transmissions, CETs, and blank intervals shown in FIG. 7.

As shown in FIG. 7, the locations of the CETs may be staggered across the sub-channels included in the carrier. The locations of the CETs may also align with the blank intervals of the other sub-channels included in the carrier. By staggering the locations of the CETs, and aligning them with blank intervals, the transmission power for the CETs may be increased up to the TPC (e.g., 23 dBm). Therefore, the coverage area for each CET may be equivalent to the coverage area for a transmission using just one sub-channel of an unlicensed frequency spectrum band or sub-band. The CETs may also be transmitted more frequently, which may reduce the delay in cell discovery.

In some examples, the unlicensed radio frequency spectrum band may support multiple scalable bandwidth carriers using different sub-bands of the unlicensed radio frequency spectrum band. For example, an eNB may support three carriers in the unlicensed radio frequency spectrum band. A first carrier may use the UNII-1 sub-band of the unlicensed radio frequency spectrum band. The first carrier may include one sub-channel of the UNII-1 sub-band, and may have a bandwidth of 20 MHz. The first carrier may transmit on the one sub-channel of the UNII-1 at a transmission power up to the transmission power constraint of the UNII-1 sub-band. A second carrier may use the UNII-2 sub-band of the unlicensed radio frequency spectrum band. The second carrier may include two sub-channels of the UNII-2 sub-band, and may have a bandwidth of 40 MHz. The second carrier may redistribute transmission power between the two sub-channels of the UNII-2 sub-band, so that the total transmission power of the two sub-channels is within the transmission power constraint of the UNII-2 sub-band. A third carrier may use the UNII-3 sub-band of the unlicensed radio frequency spectrum band. The third carrier may include four sub-channels of the UNII-3 sub-band, and may have a bandwidth of 80 MHz. The third carrier may redistribute transmission power between the four sub-channels of the UNII-3 sub-band, so that the total transmission power of the four sub-channels is within the transmission power constraint of the UNII-3 sub-band. The first carrier may provide coverage up to the cell edge because the first carrier may transmit at a full transmission power. The third carrier may provide increased capacity to users close to the eNB because the third carrier has a larger bandwidth, but lower transmission power.

In some examples, transmission power may be redistributed among the sub-channels using a fixed, pre-defined power allocation. In some examples, the total transmission power (i.e., the transmission power constraint) may be divided evenly among all the sub-channels and all the carriers in an unlicensed radio frequency spectrum band or sub-band. In other examples, the total transmission power may be divided asymmetrically among the sub-channels using a fixed, pre-defined power allocation. When a sub-channel is used for transmission, the sub-channel may transmit at the fixed and pre-defined transmission power. A CET may include information about how the total transmission power should be allocated across the sub-channels. In some examples, a UE near a cell edge may discover and associate with the sub-channel and/or carrier that has the highest allocated transmission power.

For example, a carrier may include four sub-channels of an unlicensed radio frequency spectrum band or sub-band. The carrier may have a total bandwidth of 80 MHz and a total transmission power of 23 dBm (200 mW) that may be allocated among the four sub-channels. With asymmetric power redistribution, one sub-channel may transmit at 20 dBm (100 mW), and the other three sub-channels may transmit at 15.8 dBm (33 mW). The sub-channel that transmits at 20 dBm may have larger coverage area, while the sub-channels that transmit at 15.8 dBm may provide increased capacity to closer users. Therefore, in some examples, UEs near the edge of a cell may be covered when using asymmetric power redistribution, however the UEs near the edge of the cell may communicate using a lower code rate. In some examples, for a fixed total transmission power, a larger bandwidth may provide more capacity compared to a smaller bandwidth. At a signal-to-noise ratio (SNR), the tradeoff between bandwidth and transmission power may be approximately linear.

In some examples, transmission power may be redistributed based on how many sub-channels are actively being used for transmissions. Therefore, a cell coverage area may change dynamically every radio frame based on the redistributed transmission power. This may be referred to as "cell breathing." An eNB may have the option to deliberately switch between lower and higher bandwidth transmissions (and thus higher and lower transmission powers) in different radio frames to satisfy users at different distances.

In some examples, reference signals may be transmitted at a fixed transmission power, irrespective of the transmission power allocated for other transmissions on the sub-channels. For example, an extended Common Reference Signal (eCRS) may be transmitted on all sub-channels using a fixed transmission power known to both the UE and the eNB. Alternatively or in addition, a Channel State Information Reference Signal (CSI-RS) may be transmitted on all sub-channels using a fixed transmission power known to both the UE and the eNB. An eCRS with a fixed transmission power may ensure adequate coverage for each cell as each UE performs measurements based on the eCRS. The fixed transmission power for the reference signals may also ensures consistency in channel estimation for CQI measurement, and provide a simple solution for inter-frequency measurements by other UEs.

In some examples, a demodulation reference signal (DM-RS) transmission power may be based on a PDSCH power and a desired transmission power. In some examples, transmission power for PDSCH and ePDCCH may be increased based on the set of UEs being addressed in each radio frame. The transmission power for PDSCH and ePDCCH may meet the total transmit power constraint for every subframe and sub-channel.

In some examples, a CQI may include a noise estimation. When each sub-channel has a fixed transmission power allocation (symmetric or asymmetric), the noise estimation may be consistent as the set of active interferers may not change as the bandwidth at the transmitter varies. When the transmission power for each sub-channel is variable based on the sub-channels actively being used for transmission, the set of active interferers seen by each UE may be a function of the transmission bandwidth. In some examples, a UE may report raw CQI, and the eNB may perform CQI filtering based on the transmission bandwidth and the transmission power allocated to each sub-channel.

In some examples, sequence generation may be based in part on the bandwidth of a scalable bandwidth carrier. The sequence generation may be for a DM-RS, an eCRS, a CUBS, and/or a CSI-RS. For a carrier with a fixed bandwidth, the number of RBs used for sequence generation may be directly scaled with the bandwidth. Alternatively, for a carrier with a fixed bandwidth, the sequences may repeat for every sub-channel. For flexible bandwidth carriers, the sequences may repeat for every active sub-channel. Repeating the sequences for every active sub-channel may allow different bandwidth capable UEs to coexist, and may also allow for simple interference cancellation at the receiver. Alternatively, for flexible bandwidth carriers, a sequence may be generated based on the current logical bandwidth of the carrier. Generating the sequence based on the current logical bandwidth of the carrier may cause the sequence in a given sub-channel to vary depending on the transmission bandwidth. Another alternative for flexible bandwidth carriers may be to generate a sequence for the all of the sub-channels of the unlicensed radio frequency spectrum band or sub-band. The sequence may then be punctured based on the sub-channels that clear a CCA procedure and are included in the carrier.

Figure 8:
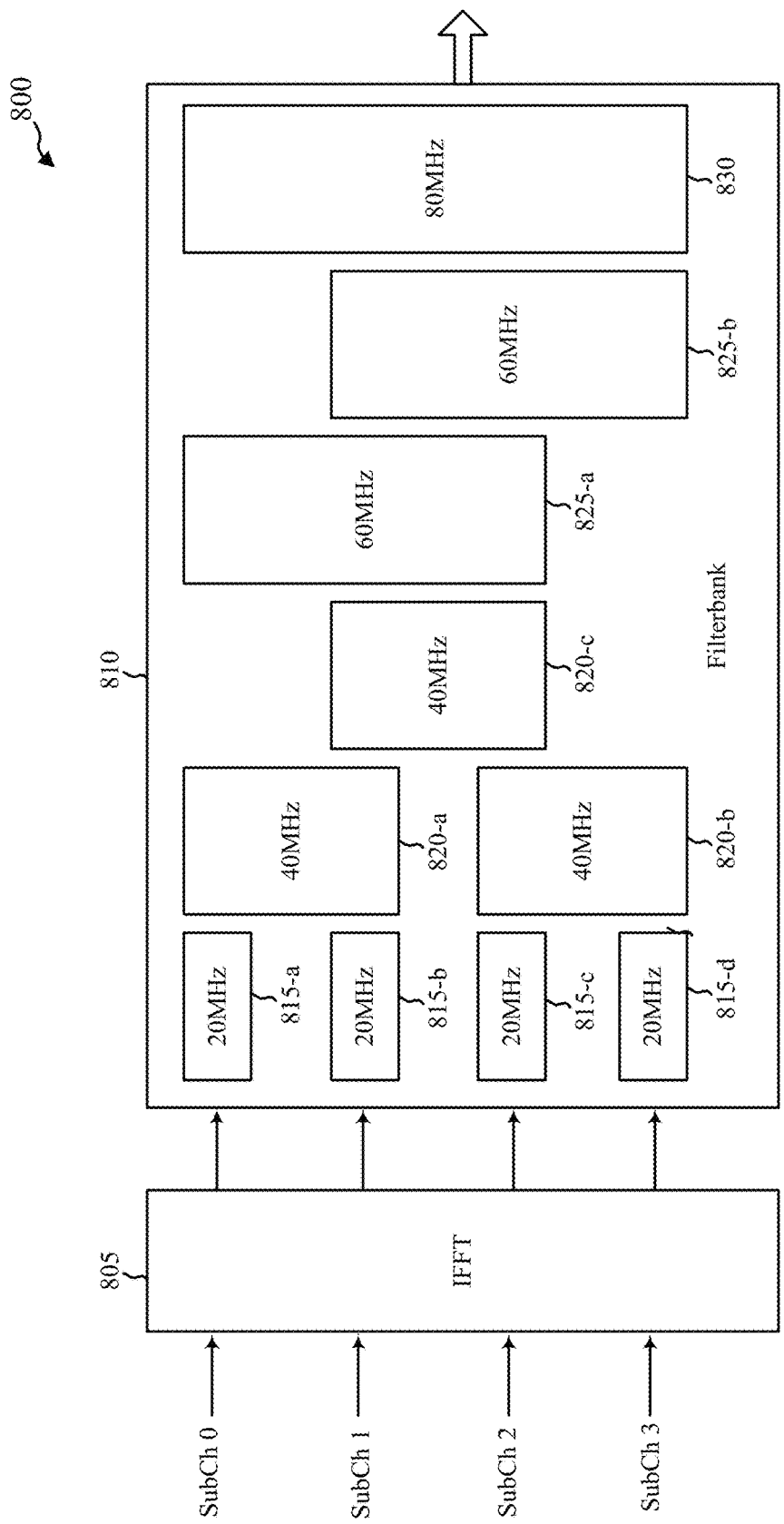
FIG. 8 shows a block diagram of an IFFT and filterbank for use with a scalable bandwidth carrier, in accordance with various aspects of the present disclosure.

FIG. 8 shows a block diagram 800 of an inverse fast Fourier transform (IFFT) 805 and filterbank 810 for use with a scalable bandwidth carrier, in accordance with various aspects of the present disclosure. In some examples, the IFFT 805 may be performed jointly across multiple sub-channels. The joint IFFT 805 may be performed on the full bandwidth of the carrier (i.e., all potential sub-channels that may be included in the carrier). Alternatively, the joint IFFT 805 may be performed on the active sub-channels included in the carrier. If the IFFT 805 is performed on the active sub-channels, then the IFFT may be divided into multiple IFFTs corresponding to the active sub-channels. If two active sub-channels are adjacent, then a single joint IFFT may be performed on the two active sub-channels.

The output of the IFFT 805 may be input to a filterbank 810. The filterbank 810 may include multiple filters corresponding to each of the possible spectral mask combinations. For example, if four sub-channels (SubCh0 through SubCh3) with bandwidths of 20 MHz each are the possible inputs to the filterbank, then the filterbank may include four 20 MHz filters 815-$a$ through 815-$d$, three 40 MHz filters 820-$a$ through 820-$c$, two 60 MHz filters 825-$a$ and 825-$b$, and one 80 MHz filter 830. For example, if the active sub-channels are SubCh0, SubCh1, and SubCh3, then the filterbank 810 may utilize the 40 MHz filter 820-$a$ to filter SubCh0 and SubCh1, and the 20 MHz filter 815-$d$ to filter SubCh3. For another example, if the active sub-channels are SubCh1, SubCh2, and SubCh3, then the filterbank 810 may utilize the 60 MHz filter 825-$b$ to filter all three sub-channels.

By filtering multiple adjacent active sub-channels in a single filter, the guard bands between the sub-channels may be utilized for resources, which may provide a 5-8% increase in resources. In addition, multiple bandwidth capable UEs may be supported by intelligent scheduling of the sub-channels and resources. In some examples, the RF capabilities of the UEs may be different from the processing/demodulation capabilities.

Figure 9:
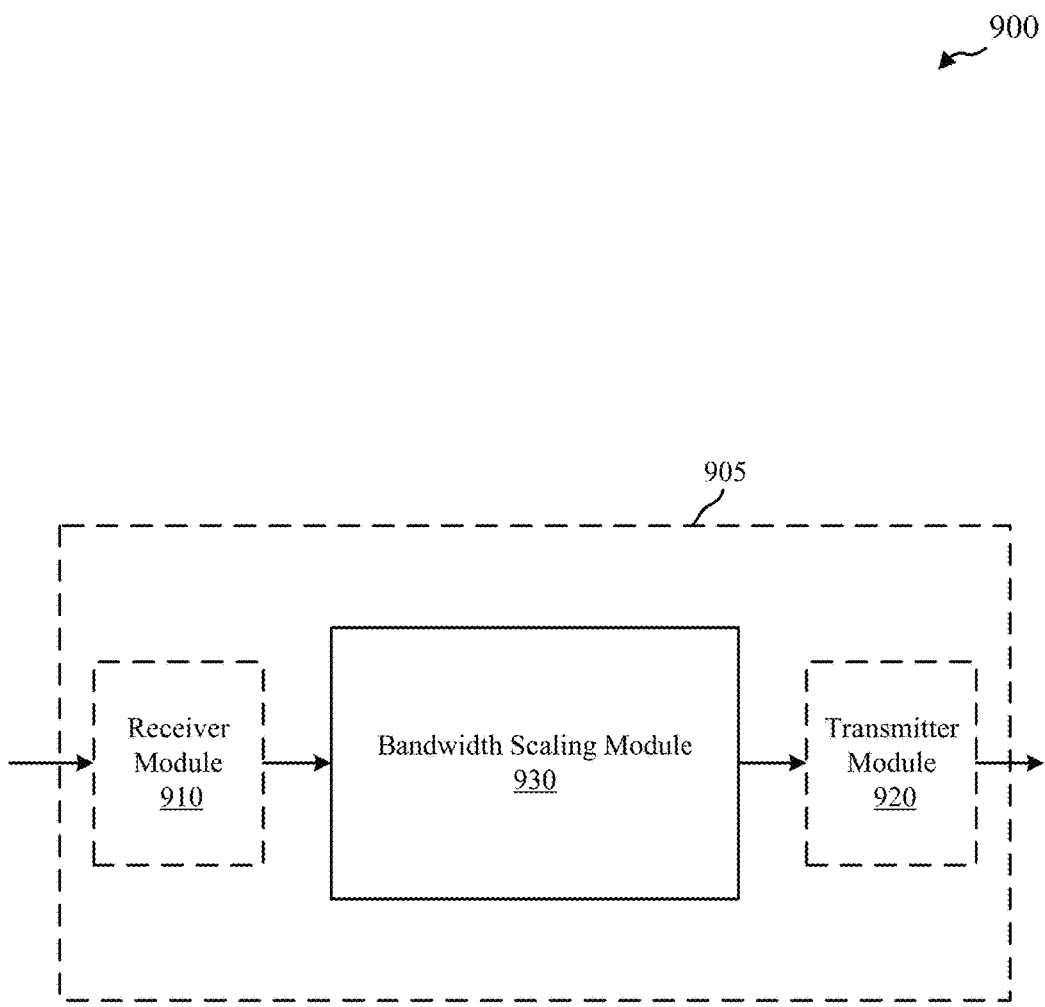
FIG. 9 shows a block diagram of an apparatus for use in wireless communication, in accordance with various aspects of the present disclosure.

FIG. 9 shows a block diagram 900 of an apparatus 905 for use in wireless communication, in accordance with various aspects of the present disclosure. In some examples, the apparatus 905 may be an example of aspects of one or more of the base station 105, base station 205, base station 205-$a$, UE 115, UE 215, UE 215-$a$, UE 215-$b$, and/or UE 215-$c$ described with reference to FIGS. 1 and/or 2. In some examples, the apparatus 905 may be part of or include a UE, a LTE/LTE-A eNB and/or a LTE/LTE-A base station. The apparatus 905 may also be a processor. In some examples, the apparatus 905 may be referred to as a transmitter or a transmitter apparatus. The apparatus 905 may include a receiver module 910, a bandwidth scaling module 930, and/or a transmitter module 920. Each of these components may be in communication with each other.

The components of the apparatus 905 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 910 may include at least one radio frequency (RF) receiver, such as at least one RF receiver operable to receive transmissions over a licensed radio frequency spectrum band (e.g., a radio frequency spectrum band for which apparatuses do not contend for access because the radio frequency spectrum band is licensed to users (e.g., LTE/LTE-A users)) and/or an unlicensed radio frequency spectrum band (e.g., a radio frequency spectrum band for which apparatuses may need to contend for access because the radio frequency spectrum band is available, at least in part, for unlicensed use (e.g., Wi-Fi use and/or LTE/LTE-A use in an unlicensed radio frequency spectrum band)). In some examples, the licensed radio frequency spectrum band and/or the unlicensed radio frequency spectrum band may be used for LTE/LTE-A communications, as described, for example, with reference to FIGS. 1-8. The receiver module 910 may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter module 920 may include at least one RF transmitter, such as at least one RF transmitter operable to transmit over the licensed radio frequency spectrum band and/or the unlicensed radio frequency spectrum band. The transmitter module 920 may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the bandwidth scaling module 930 may be used to identify available sub-channels in an unlicensed radio frequency spectrum band, and include the available sub-channels in a carrier for communication over the unlicensed radio frequency spectrum band. In this way, the bandwidth of the carrier may be scaled according to the available sub-channels in the unlicensed radio frequency spectrum band.

Figure 10:
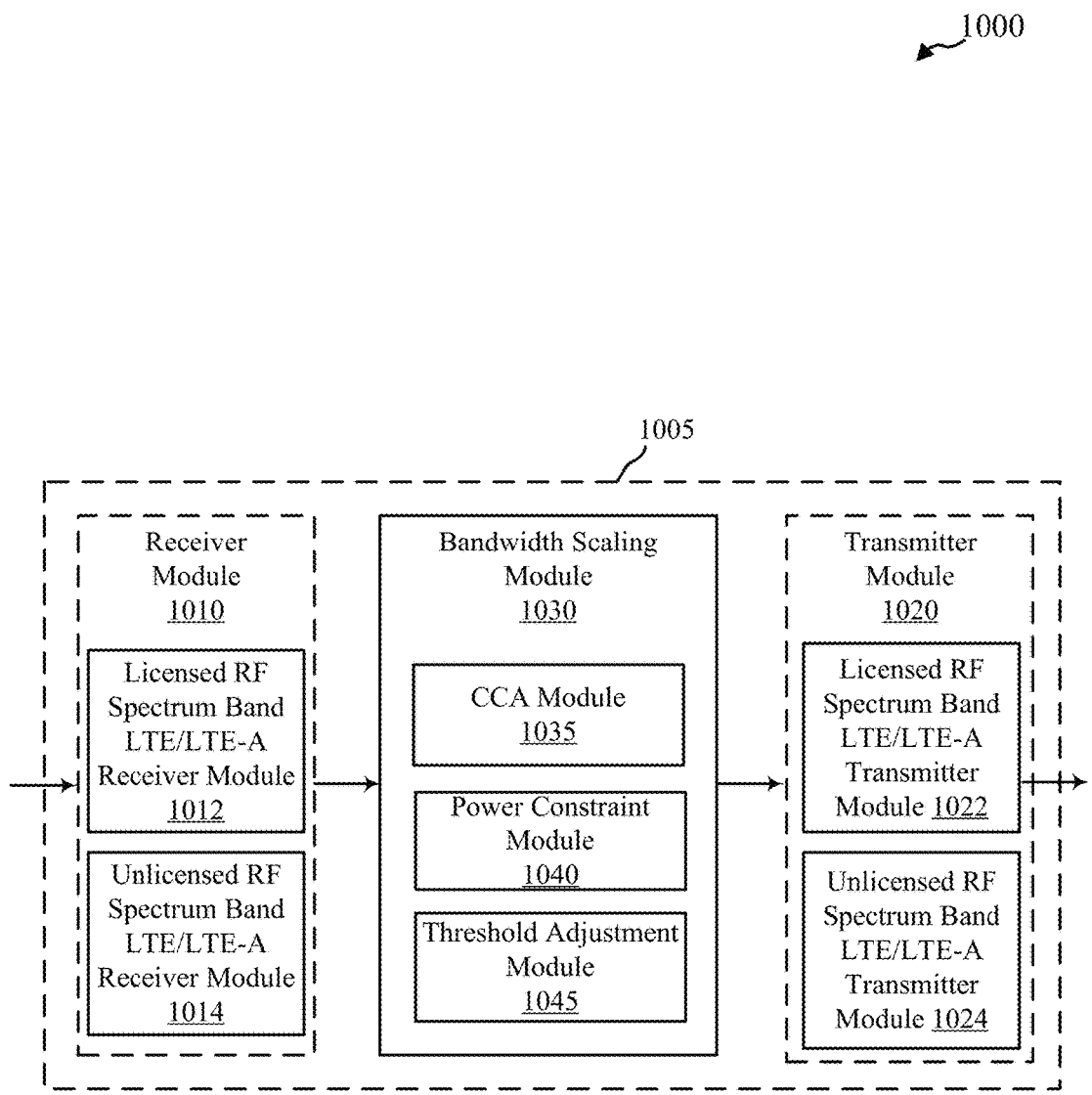
FIG. 10 shows a block diagram of an apparatus for use in wireless communication, in accordance with various aspects of the present disclosure.

FIG. 10 shows a block diagram 1000 of an apparatus 1005 for use in wireless communication, in accordance with various aspects of the present disclosure. In some examples, the apparatus 1005 may be an example of aspects of one or more of the base station 105, base station 205, base station 205-a, UE 115, UE 215, UE 215-a, UE 215-b, and/or UE 215-c described with reference to FIGS. 1 and/or 2, and/or an example of aspects of the apparatus 905 described with reference to FIG. 9. In some examples, the apparatus 1005 may be part of or include a UE, a LTE/LTE-A eNB and/or a LTE/LTE-A base station. The apparatus 1005 may also be a processor. In some examples, the apparatus 1005 may be referred to as a transmitter or transmitter apparatus. The apparatus 1005 may include a receiver module 1010, a bandwidth scaling module 1030, and/or a transmitter module 1020. Each of these components may be in communication with each other.

The components of the apparatus 1005 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1010 may be an example of one or more aspects of the receiver module 910 described with reference to FIG. 9. In some examples, the receiver module 1010 may include at least one RF receiver, such as at least one RF receiver operable to receive transmissions over a licensed radio frequency spectrum band (e.g., a radio frequency spectrum band for which apparatuses do not contend for access because the radio frequency spectrum band is licensed to users (e.g., LTE/LTE-A users)) and/or an unlicensed radio frequency spectrum band (e.g., a radio frequency spectrum band for which apparatuses may need to contend for access because the radio frequency spectrum band is available, at least in part, for unlicensed use (e.g., Wi-Fi use and/or LTE/LTE-A use in an unlicensed radio frequency spectrum band)). In some examples, the licensed radio frequency spectrum band and/or the unlicensed radio frequency spectrum band may be used for LTE/LTE-A communications, as described, for example, with reference to FIGS. 1-8. The receiver module 1010 may in some cases include separate receivers for the licensed radio frequency spectrum band and the unlicensed radio frequency spectrum band. The separate receivers may, in some examples, take the form of a licensed RF spectrum band LTE/LTE-A receiver module 1012 for communicating over the licensed radio frequency spectrum band, and an unlicensed RF spectrum band LTE/LTE-A receiver module 1014 for communicating over the unlicensed radio frequency spectrum band. The receiver module 1010 may also include receiver modules for communicating over other radio frequency spectrum bands and/or for communicating via other radio access technologies (e.g., Wi-Fi). The receiver module 1010, including the licensed RF spectrum band LTE/LTE-A receiver module 1012 and/or the unlicensed RF spectrum band LTE/LTE-A receiver module 1014 may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter module 1020 may be an example of one or more aspects of the transmitter module 920 described with reference to FIG. 9. In some examples, the transmitter module 1020 may include at least one RF transmitter, such as at least one RF transmitter operable to transmit over the licensed radio frequency spectrum band and/or the unlicensed radio frequency spectrum band. The transmitter module 1020 may in some cases include separate transmitters for the licensed radio frequency spectrum band and the unlicensed radio frequency spectrum band. The separate transmitters may, in some examples, take the form of a licensed RF spectrum band LTE/LTE-A transmitter module 1022 for communicating over the licensed radio frequency spectrum band, and an unlicensed RF spectrum band LTE/LTE-A transmitter module 1024 for communicating over the unlicensed radio frequency spectrum band. The transmitter module 1020, including the licensed RF spectrum band LTE/LTE-A transmitter module 1022 and/or the unlicensed RF spectrum band LTE/LTE-A transmitter module 1024 may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the bandwidth scaling module 1030 may be an example of one or more aspects of the bandwidth scaling module 930 described with reference to FIG. 9. The bandwidth scaling module 1030 may include a CCA module 1035, a power constraint module 1040, and/or a threshold adjustment module 1045. The CCA module 1035 may perform a first CCA on sub-channels of the unlicensed radio frequency spectrum band based at least in part on an optimistic CCA threshold. The optimistic CCA threshold may be based on a power constraint from the power constraint module 1040 based on a transmission power limit for transmissions over the sub-channels. Based on which sub-channels clear the first CCA, the CCA module 1035 may determine a plurality of potential sub-channels. The threshold adjustment module 1045 may then generate a redistributed CCA threshold based on the number of potential sub-channels and a power constraint from the power constraint module 1040. The power constraint from the power constraint module 1040 may be based on a transmission power limit for transmissions over the potential sub-channels. The CCA module 1035 may then perform a second CCA on the potential sub-channels based on the redistributed CCA threshold, and determine which sub-channels are clear for communication. The bandwidth scaling module 1030 may then include the clear sub-channels in a carrier for communication over the unlicensed radio frequency spectrum band. In this way, the bandwidth of the carrier may be scaled according to the available sub-channels in the unlicensed radio frequency spectrum band.

In some examples, the second CCA performed by the CCA module 1035 may include CCA countdown slots for the potential sub-channels. Communication over the clear sub-channels may be delayed until the CCA countdown slots are exceeded. In some examples, the second CCA performed by the CCA module 1035 may be a single joint CCA measuring the sum of energy across the plurality of potential sub-channels.

Figure 11:
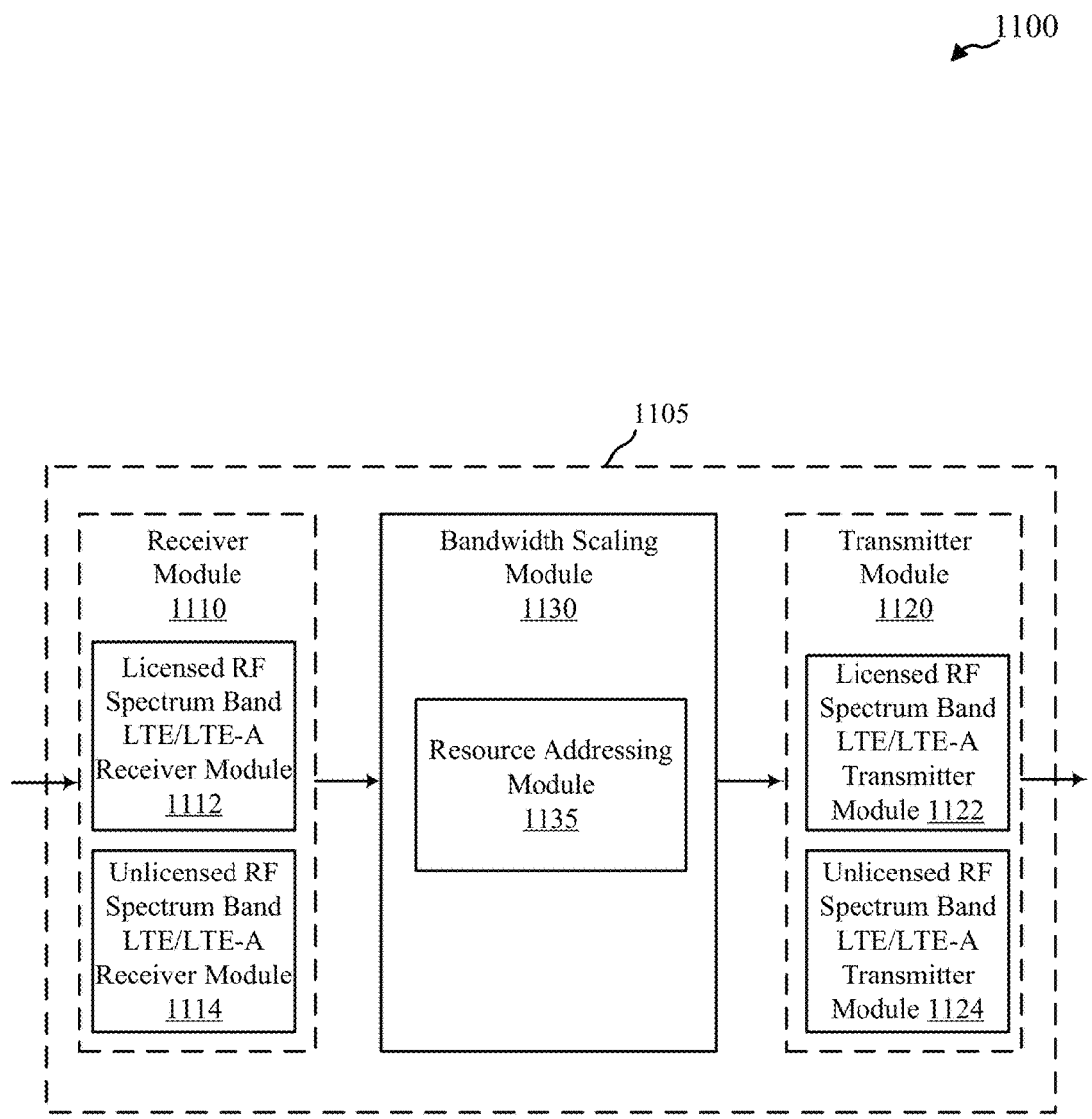
FIG. 11 shows a block diagram of an apparatus for use in wireless communication, in accordance with various aspects of the present disclosure.

FIG. 11 shows a block diagram 1100 of an apparatus 1105 for use in wireless communication, in accordance with various aspects of the present disclosure. In some examples, the apparatus 1105 may be an example of aspects of one or more of the base station 105, base station 205, base station 205-a, UE 115, UE 215, UE 215-a, UE 215-b, and/or UE 215-c described with reference to FIGS. 1 and/or 2, and/or an example of aspects of the apparatus 905 described with reference to FIG. 9. In some examples, the apparatus 1105 may be part of or include a UE, a LTE/LTE-A eNB and/or a LTE/LTE-A base station. The apparatus 1105 may also be a processor. In some examples, the apparatus 1105 may be referred to as a transmitter or transmitter apparatus. The apparatus 1105 may include a receiver module 1110, a bandwidth scaling module 1130, and/or a transmitter module 1120. Each of these components may be in communication with each other.

The components of the apparatus 1105 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1110 may be an example of one or more aspects of the receiver module 910 described with reference to FIG. 9. In some examples, the receiver module 1110 may include at least one RF receiver, such as at least one RF receiver operable to receive transmissions over a licensed radio frequency spectrum band (e.g., a radio frequency spectrum band for which apparatuses do not contend for access because the radio frequency spectrum band is licensed to users (e.g., LTE/LTE-A users)) and/or an unlicensed radio frequency spectrum band (e.g., a radio frequency spectrum band for which apparatuses may need to contend for access because the radio frequency spectrum band is available, at least in part, for unlicensed use (e.g., Wi-Fi use and/or LTE/LTE-A use in an unlicensed radio frequency spectrum band)). In some examples, the licensed radio frequency spectrum band and/or the unlicensed radio frequency spectrum band may be used for LTE/LTE-A communications, as described, for example, with reference to FIG. 1-8. The receiver module 1110 may in some cases include separate receivers for the licensed radio frequency spectrum band and the unlicensed radio frequency spectrum band. The separate receivers may, in some examples, take the form of a licensed RF spectrum band LTE/LTE-A receiver module 1112 for communicating over the licensed radio frequency spectrum band, and an unlicensed RF spectrum band LTE/LTE-A receiver module 1114 for communicating over the unlicensed radio frequency spectrum band. The receiver module 1110 may also include receiver modules for communicating over other radio frequency spectrum bands and/or for communicating via other radio access technologies (e.g., Wi-Fi). The receiver module 1110, including the licensed RF spectrum band LTE/LTE-A receiver module 1112 and/or the unlicensed RF spectrum band LTE/LTE-A receiver module 1114 may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter module 1120 may be an example of one or more aspects of the transmitter module 920 described with reference to FIG. 9. In some examples, the transmitter module 1120 may include at least one RF transmitter, such as at least one RF transmitter operable to transmit over the licensed radio frequency spectrum band and/or the unlicensed radio frequency spectrum band. The transmitter module 1120 may in some cases include separate transmitters for the licensed radio frequency spectrum band and the unlicensed radio frequency spectrum band. The separate transmitters may, in some examples, take the form of a licensed RF spectrum band LTE/LTE-A transmitter module 1122 for communicating over the licensed radio frequency spectrum band, and an unlicensed RF spectrum band LTE/LTE-A transmitter module 1124 for communicating over the unlicensed radio frequency spectrum band. The transmitter module 1120, including the licensed RF spectrum band LTE/LTE-A transmitter module 1122 and/or the unlicensed RF spectrum band LTE/LTE-A transmitter module 1124 may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the bandwidth scaling module 1130 may be an example of one or more aspects of the bandwidth scaling module 930 described with reference to FIG. 9. The bandwidth scaling module 1130 may include a resource addressing module 1135. In some examples, the resource addressing module 1135 may address resources of the available sub-channels as one logical group. The resources addressed by the resource addressing module 1135 may be adjacent or non-adjacent. In some examples, the resources may include RBs. The resource addressing module 1135 may assign the RBs using at least one enhanced physical downlink control channel (ePDCCH). The at least one ePDCCH may assign the RBs across the first subset of the plurality of sub-channels. In some examples, the RBs may be contiguous across adjacent sub-channels.

Figure 12:
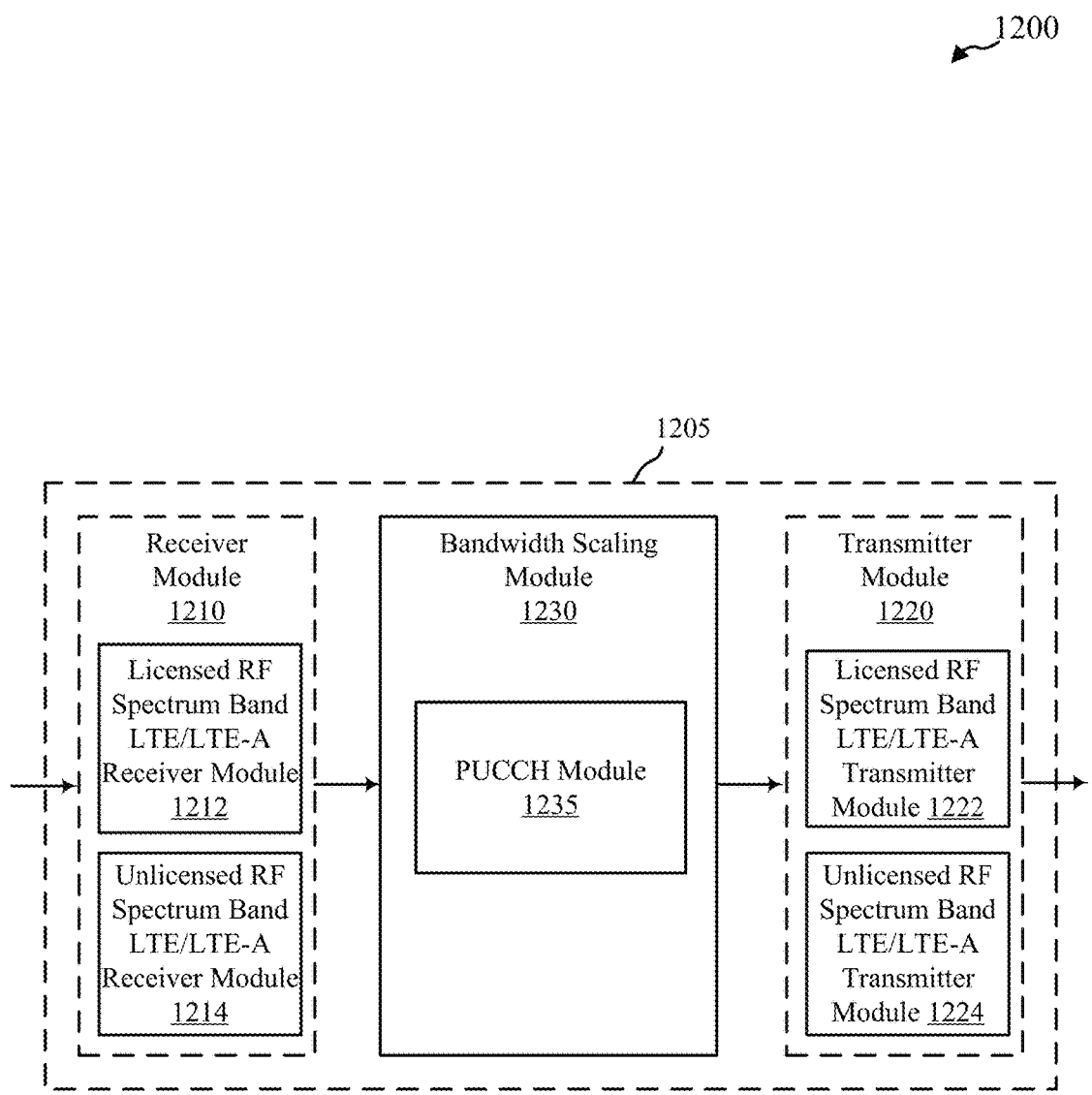
FIG. 12 shows a block diagram of an apparatus for use in wireless communication, in accordance with various aspects of the present disclosure.

FIG. 12 shows a block diagram 1200 of an apparatus 1205 for use in wireless communication, in accordance with various aspects of the present disclosure. In some examples, the apparatus 1205 may be an example of aspects of one or more of the base station 105, base station 205, base station 205-*a*, UE 115, UE 215, UE 215-*a*, UE 215-*b*, and/or UE 215-*c* described with reference to FIGS. 1 and/or 2, and/or an example of aspects of the apparatus 905 described with reference to FIG. 9. In some examples, the apparatus 1205 may be part of or include a UE, a LTE/LTE-A eNB and/or a LTE/LTE-A base station. The apparatus 1205 may also be a processor. In some examples, the apparatus 1205 may be referred to as a transmitter or transmitter apparatus. The apparatus 1205 may include a receiver module 1210, a bandwidth scaling module 1230, and/or a transmitter module 1220. Each of these components may be in communication with each other.

The components of the apparatus 1205 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1210 may be an example of one or more aspects of the receiver module 910 described with reference to FIG. 9. In some examples, the receiver module 1210 may include at least one RF receiver, such as at least one RF receiver operable to receive transmissions over a licensed radio frequency spectrum band (e.g., a radio frequency spectrum band for which apparatuses do not contend for access because the radio frequency spectrum band is licensed to users (e.g., LTE/LTE-A users)) and/or an unlicensed radio frequency spectrum band (e.g., a radio frequency spectrum band for which apparatuses may need to contend for access because the radio frequency spectrum band is available, at least in part, for unlicensed use (e.g., Wi-Fi use and/or LTE/LTE-A use in an unlicensed radio frequency spectrum band)). In some examples, the licensed radio frequency spectrum band and/or the unlicensed radio frequency spectrum band may be used for LTE/LTE-A communications, as described, for example, with reference to FIG. 1-8. The receiver module 1210 may in some cases include separate receivers for the licensed radio frequency spectrum band and the unlicensed radio frequency spectrum band. The separate receivers may, in some examples, take the form of a licensed RF spectrum band LTE/LTE-A receiver module 1212 for communicating over the licensed radio frequency spectrum band, and an unlicensed RF spectrum band LTE/LTE-A receiver module 1214 for communicating over the unlicensed radio frequency spectrum band. The receiver module 1210 may also include receiver modules for communicating over other radio frequency spectrum bands and/or for communicating via other radio access technologies (e.g., Wi-Fi). The receiver module 1210, including the licensed RF spectrum band LTE/LTE-A receiver module 1212 and/or the unlicensed RF spectrum band LTE/LTE-A receiver module 1214 may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter module 1220 may be an example of one or more aspects of the transmitter module 920 described with reference to FIG. 9. In some examples, the transmitter module 1220 may include at least one RF transmitter, such as at least one RF transmitter operable to transmit over the licensed radio frequency spectrum band and/or the unlicensed radio frequency spectrum band. The transmitter module 1220 may in some cases include separate transmitters for the licensed radio frequency spectrum band and the unlicensed radio frequency spectrum band. The separate transmitters may, in some examples, take the form of a licensed RF spectrum band LTE/LTE-A transmitter module 1222 for communicating over the licensed radio frequency spectrum band, and an unlicensed RF spectrum band LTE/LTE-A transmitter module 1224 for communicating over the unlicensed radio frequency spectrum band. The transmitter module 1220, including the licensed RF spectrum band LTE/LTE-A transmitter module 1222 and/or the unlicensed RF spectrum band LTE/LTE-A transmitter module 1224 may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the bandwidth scaling module 1230 may be an example of one or more aspects of the bandwidth scaling module 930 described with reference to FIG. 9. The bandwidth scaling module 1230 may include a PUCCH module 1235. The PUCCH module 1235 may determine a physical uplink control channel (PUCCH). The PUCCH may include a channel quality indicator (CQI) for the available sub-channels identified by the bandwidth scaling module 1230.

Figure 13:
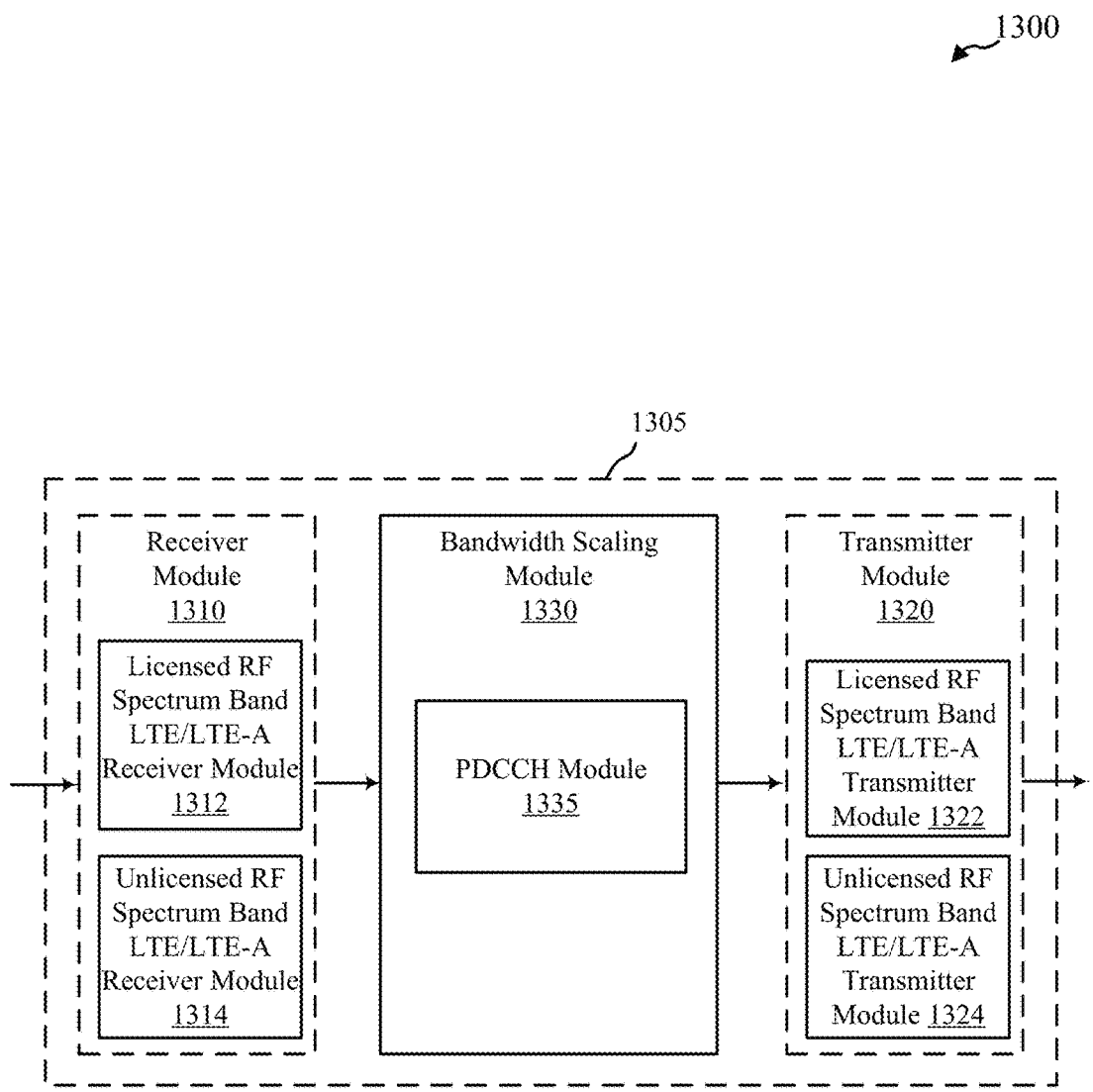
FIG. 13 shows a block diagram of an apparatus for use in wireless communication, in accordance with various aspects of the present disclosure.

FIG. 13 shows a block diagram 1300 of an apparatus 1305 for use in wireless communication, in accordance with various aspects of the present disclosure. In some examples, the apparatus 1305 may be an example of aspects of one or more of the base station 105, base station 205, base station 205-*a*, UE 115, UE 215, UE 215-*a*, UE 215-*b*, and/or UE 215-c described with reference to FIGS. 1 and/or 2, and/or an example of aspects of the apparatus 905 described with reference to FIG. 9. In some examples, the apparatus 1305 may be part of or include a UE, a LTE/LTE-A eNB and/or a LTE/LTE-A base station. The apparatus 1305 may also be a processor. In some examples, the apparatus 1305 may be referred to as a transmitter or transmitter apparatus. The apparatus 1305 may include a receiver module 1310, a bandwidth scaling module 1330, and/or a transmitter module 1320. Each of these components may be in communication with each other.

The components of the apparatus 1305 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1310 may be an example of one or more aspects of the receiver module 910 described with reference to FIG. 9. In some examples, the receiver module 1310 may include at least one RF receiver, such as at least one RF receiver operable to receive transmissions over a licensed radio frequency spectrum band (e.g., a radio frequency spectrum band for which apparatuses do not contend for access because the radio frequency spectrum band is licensed to users (e.g., LTE/LTE-A users)) and/or an unlicensed radio frequency spectrum band (e.g., a radio frequency spectrum band for which apparatuses may need to contend for access because the radio frequency spectrum band is available, at least in part, for unlicensed use (e.g., Wi-Fi use and/or LTE/LTE-A use in an unlicensed radio frequency spectrum band)). In some examples, the licensed radio frequency spectrum band and/or the unlicensed radio frequency spectrum band may be used for LTE/LTE-A communications, as described, for example, with reference to FIG. 1-8. The receiver module 1310 may in some cases include separate receivers for the licensed radio frequency spectrum band and the unlicensed radio frequency spectrum band. The separate receivers may, in some examples, take the form of a licensed RF spectrum band LTE/LTE-A receiver module 1312 for communicating over the licensed radio frequency spectrum band, and an unlicensed RF spectrum band LTE/LTE-A receiver module 1314 for communicating over the unlicensed radio frequency spectrum band. The receiver module 1310 may also include receiver modules for communicating over other radio frequency spectrum bands and/or for communicating via other radio access technologies (e.g., Wi-Fi). The receiver module 1310, including the licensed RF spectrum band LTE/LTE-A receiver module 1312 and/or the unlicensed RF spectrum band LTE/LTE-A receiver module 1314 may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter module 1320 may be an example of one or more aspects of the transmitter module 920 described with reference to FIG. 9. In some examples, the transmitter module 1320 may include at least one RF transmitter, such as at least one RF transmitter operable to transmit over the licensed radio frequency spectrum band and/or the unlicensed radio frequency spectrum band. The transmitter module 1320 may in some cases include separate transmitters for the licensed radio frequency spectrum band and the unlicensed radio frequency spectrum band. The separate transmitters may, in some examples, take the form of a licensed RF spectrum band LTE/LTE-A transmitter module 1322 for communicating over the licensed radio frequency spectrum band, and an unlicensed RF spectrum band LTE/LTE-A transmitter module 1324 for communicating over the unlicensed radio frequency spectrum band. The transmitter module 1320, including the licensed RF spectrum band LTE/LTE-A transmitter module 1322 and/or the unlicensed RF spectrum band LTE/LTE-A transmitter module 1324 may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the bandwidth scaling module 1330 may be an example of one or more aspects of the bandwidth scaling module 930 described with reference to FIG. 9. The bandwidth scaling module 1330 may include a PDCCH module 1335. In some examples, the PDCCH module 1335 may determine an enhanced physical downlink control channel (ePDCCH). The ePDCCH may address the available sub-channels identified by the bandwidth scaling module 1330. In some examples, the ePDCCH may include at least two transport blocks (TBs). Each TB may span the available sub-channels. The size of each TB of the at least two TBs is based at least in part on a number of sub-channels in the first subset of the plurality of sub-channels. In some examples, the PDCCH module 1335 may determine the payload size of the ePDCCH based at least in part on the bandwidth of the carrier. In some examples, a modulation and coding scheme (MCS) may be the same for each of the available sub-channels identified by the bandwidth scaling module 1330. In some examples, an acknowledgement/negative-acknowledgement (ACK/NACK) for the ePDCCH may include two bits.

In some examples, the PDCCH module 1335 may determine multiple enhanced physical downlink control channels (ePDCCHs). The multiple ePDCCHs may address the available sub-channels identified by the bandwidth scaling module 1330. In some examples, the PDCCH module 1335 may determine a maximum number of ePDCCHs based at least in part on a bandwidth of the carrier. In some examples, the maximum number of ePDCCHs may be based at least in part on the bandwidth of the carrier divided by a bandwidth of a sub-channel. In some examples, the PDCCH module 1335 may determine the maximum number of ePDCCHs based on a radio resource control (RRC) signal. In some examples, the PDCCH module 1335 may adjust the number of ePDCCHs based at least in part on an ePDCCH load and a cell load. In some examples, the PDCCH module 1335 may adjust the maximum number of ePDCCHs using at least one of Medium Access Control (MAC) signaling, an enhanced system information block (eSIB), or a combination thereof. In some examples, each of the multiple ePDCCHs may include data corresponding to a hybrid automatic repeat request (HARQ) process. 37. In some examples, each of the multiple ePDCCHs may include a grant identification (ID) and a carrier indicator field (CIF). In some examples the multiple ePDCCHs may be located in a search space of a carrier indicator field (CIF). In some examples, the search space may be based at least in part on a grant identification (ID) and the CIF. In some examples, the PDCCH module 1335 may scramble the multiple ePDCCHs using multiple cell radio network temporary identifiers (C-RNTIs).

Figure 14:
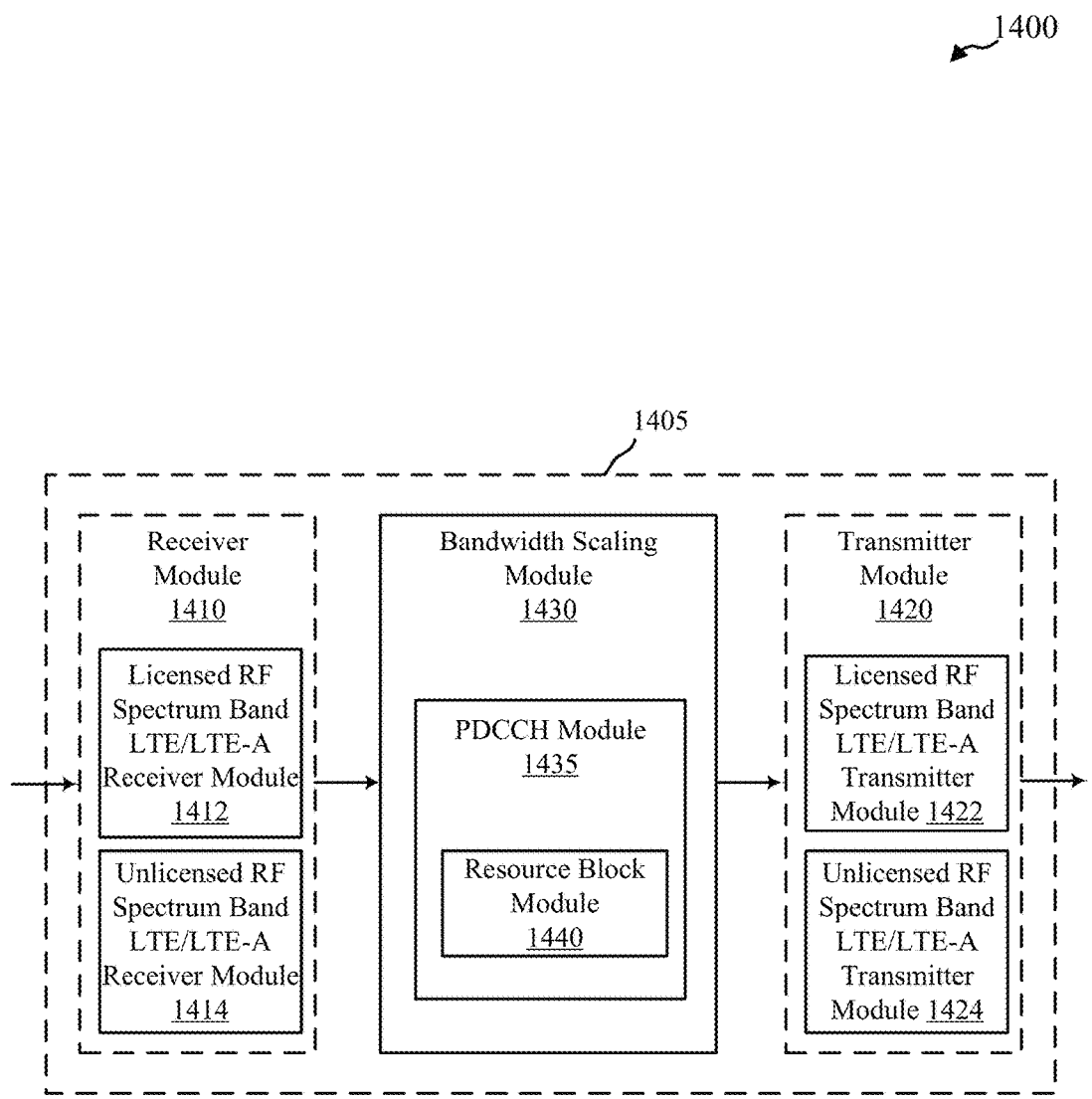
FIG. 14 shows a block diagram of an apparatus for use in wireless communication, in accordance with various aspects of the present disclosure.

FIG. 14 shows a block diagram 1400 of an apparatus 1405 for use in wireless communication, in accordance with various aspects of the present disclosure. In some examples, the apparatus 1405 may be an example of aspects of one or more of the base station 105, base station 205, base station 205-a, UE 115, UE 215, UE 215-a, UE 215-b, and/or UE 215-c described with reference to FIGS. 1 and/or 2, and/or an example of aspects of the apparatus 905 described with reference to FIG. 9. In some examples, the apparatus 1405 may be part of or include a UE, a LTE/LTE-A eNB and/or a LTE/LTE-A base station. The apparatus 1405 may also be a processor. In some examples, the apparatus 1405 may be referred to as a transmitter or transmitter apparatus. The apparatus 1405 may include a receiver module 1410, a bandwidth scaling module 1430, and/or a transmitter module 1420. Each of these components may be in communication with each other.

The components of the apparatus 1405 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1410 may be an example of one or more aspects of the receiver module 910 described with reference to FIG. 9. In some examples, the receiver module 1410 may include at least one RF receiver, such as at least one RF receiver operable to receive transmissions over a licensed radio frequency spectrum band (e.g., a radio frequency spectrum band for which apparatuses do not contend for access because the radio frequency spectrum band is licensed to users (e.g., LTE/LTE-A users)) and/or an unlicensed radio frequency spectrum band (e.g., a radio frequency spectrum band for which apparatuses may need to contend for access because the radio frequency spectrum band is available, at least in part, for unlicensed use (e.g., Wi-Fi use and/or LTE/LTE-A use in an unlicensed radio frequency spectrum band)). In some examples, the licensed radio frequency spectrum band and/or the unlicensed radio frequency spectrum band may be used for LTE/LTE-A communications, as described, for example, with reference to FIG. 1-8. The receiver module 1410 may in some cases include separate receivers for the licensed radio frequency spectrum band and the unlicensed radio frequency spectrum band. The separate receivers may, in some examples, take the form of a licensed RF spectrum band LTE/LTE-A receiver module 1412 for communicating over the licensed radio frequency spectrum band, and an unlicensed RF spectrum band LTE/LTE-A receiver module 1414 for communicating over the unlicensed radio frequency spectrum band. The receiver module 1410 may also include receiver modules for communicating over other radio frequency spectrum bands and/or for communicating via other radio access technologies (e.g., Wi-Fi). The receiver module 1410, including the licensed RF spectrum band LTE/LTE-A receiver module 1412 and/or the unlicensed RF spectrum band LTE/LTE-A receiver module 1414 may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter module 1420 may be an example of one or more aspects of the transmitter module 920 described with reference to FIG. 9. In some examples, the transmitter module 1420 may include at least one RF transmitter, such as at least one RF transmitter operable to transmit over the licensed radio frequency spectrum band and/or the unlicensed radio frequency spectrum band. The transmitter module 1420 may in some cases include separate transmitters for the licensed radio frequency spectrum band and the unlicensed radio frequency spectrum band. The separate transmitters may, in some examples, take the form of a licensed RF spectrum band LTE/LTE-A transmitter module 1422 for communicating over the licensed radio frequency spectrum band, and an unlicensed RF spectrum band LTE/LTE-A transmitter module 1424 for communicating over the unlicensed radio frequency spectrum band. The transmitter module 1420, including the licensed RF spectrum band LTE/LTE-A transmitter module 1422 and/or the unlicensed RF spectrum band LTE/LTE-A transmitter module 1424 may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the bandwidth scaling module 1430 may be an example of one or more aspects of the bandwidth scaling module 930 described with reference to FIG. 9, and/or the bandwidth scaling module 1330 described with reference to FIG. 13. The bandwidth scaling module 1430 may include a PDCCH module 1435. In some examples, the PDCCH module 1435 may be an example of one or more aspects of the PDCCH module 1335 described with reference to FIG. 13. The PDCCH module 1435 may include a resource block module 1440. In some examples, the resource block module 1440 may allocate a number of bits of an ePDCCH for RBs based at least in part on the bandwidth of the carrier and a RB group (RBG) size. The resource block module 1440 may determine the RBG size based at least in part on a clear channel assessment (CCA).

In some examples, the resource block module 1440 may include a PDCCH identification (ID) addressing a segment of resource blocks (RBs) in each ePDCCH of the multiple ePDCCHs determined by the PDCCH module 1435. In some examples, a first segment of RBs may be addressed by a first PDCCH ID and a second segment of RBs may be addressed by a second PDCCH ID. In some examples, each ePDCCH of multiple ePDCCHs may include a downlink control information (DCI), and the DCI may include the PDCCH ID. In some examples, the resource block module 1440 may adjust the size of the group of RBs based at least in part on an ePDCCH load and a cell load. In some examples, the size of the DCI may be based at least in part on the bandwidth of the carrier and the RBG size. In some examples, the RBG size may be based at least in part on a clear channel assessment (CCA).

Figure 15:
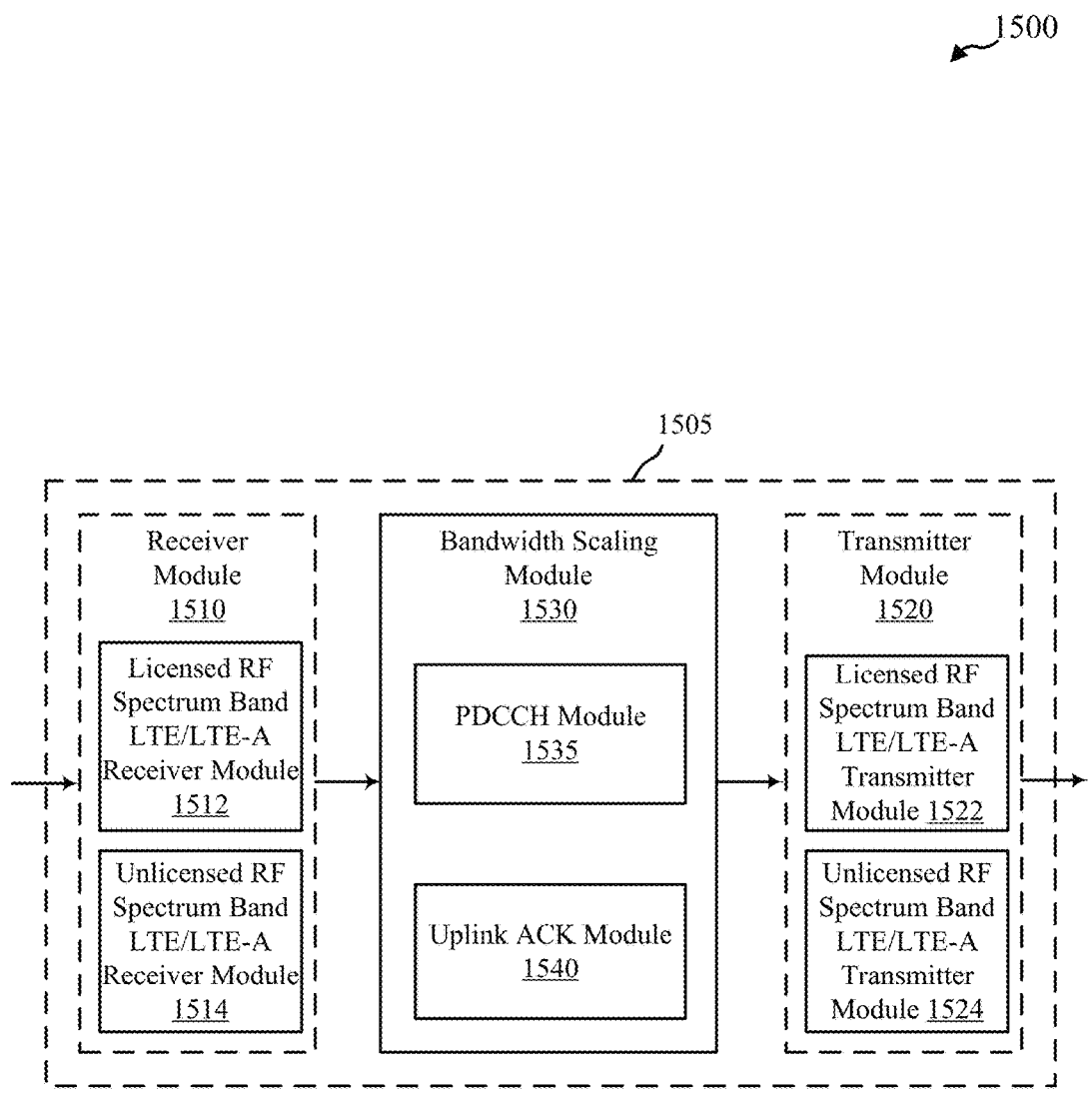
FIG. 15 shows a block diagram of an apparatus for use in wireless communication, in accordance with various aspects of the present disclosure.

FIG. 15 shows a block diagram 1500 of an apparatus 1505 for use in wireless communication, in accordance with various aspects of the present disclosure. In some examples, the apparatus 1505 may be an example of aspects of one or more of the base station 105, base station 205, base station 205-a, UE 115, UE 215, UE 215-a, UE 215-b, and/or UE 215-c described with reference to FIGS. 1 and/or 2, and/or an example of aspects of the apparatus 905 described with reference to FIG. 9. In some examples, the apparatus 1505 may be part of or include a UE, a LTE/LTE-A eNB and/or a LTE/LTE-A base station. The apparatus 1505 may also be a processor. In some examples, the apparatus 1505 may be referred to as a transmitter or transmitter apparatus. The apparatus 1505 may include a receiver module 1510, a bandwidth scaling module 1530, and/or a transmitter module 1520. Each of these components may be in communication with each other.

The components of the apparatus 1505 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1510 may be an example of one or more aspects of the receiver module 910 described with reference to FIG. 9. In some examples, the receiver module 1510 may include at least one radio frequency (RF) receiver, such as at least one RF receiver operable to receive transmissions over a licensed radio frequency spectrum band (e.g., a radio frequency spectrum band for which apparatuses do not contend for access because the radio frequency spectrum band is licensed to users (e.g., LTE/LTE-A users)) and/or an unlicensed radio frequency spectrum band (e.g., a radio frequency spectrum band for which apparatuses may need to contend for access because the radio frequency spectrum band is available, at least in part, for unlicensed use (e.g., Wi-Fi use and/or LTE/LTE-A use in an unlicensed radio frequency spectrum band)). In some examples, the licensed radio frequency spectrum band and/or the unlicensed radio frequency spectrum band may be used for LTE/LTE-A communications, as described, for example, with reference to FIG. 1-8. The receiver module 1510 may in some cases include separate receivers for the licensed radio frequency spectrum band and the unlicensed radio frequency spectrum band. The separate receivers may, in some examples, take the form of a licensed RF spectrum band LTE/LTE-A receiver module 1512 for communicating over the licensed radio frequency spectrum band, and an unlicensed RF spectrum band LTE/LTE-A receiver module 1514 for communicating over the unlicensed radio frequency spectrum band. The receiver module 1510 may also include receiver modules for communicating over other radio frequency spectrum bands and/or for communicating via other radio access technologies (e.g., Wi-Fi).

The receiver module 1510, including the licensed RF spectrum band LTE/LTE-A receiver module 1512 and/or the unlicensed RF spectrum band LTE/LTE-A receiver module 1514 may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter module 1520 may be an example of one or more aspects of the transmitter module 920 described with reference to FIG. 9. In some examples, the transmitter module 1520 may include at least one RF transmitter, such as at least one RF transmitter operable to transmit over the licensed radio frequency spectrum band and/or the unlicensed radio frequency spectrum band. The transmitter module 1520 may in some cases include separate transmitters for the licensed radio frequency spectrum band and the unlicensed radio frequency spectrum band. The separate transmitters may, in some examples, take the form of a licensed RF spectrum band LTE/LTE-A transmitter module 1522 for communicating over the licensed radio frequency spectrum band, and an unlicensed RF spectrum band LTE/LTE-A transmitter module 1524 for communicating over the unlicensed radio frequency spectrum band. The transmitter module 1520, including the licensed RF spectrum band LTE/LTE-A transmitter module 1522 and/or the unlicensed RF spectrum band LTE/LTE-A transmitter module 1524 may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the bandwidth scaling module 1530 may be an example of one or more aspects of the bandwidth scaling module 930 described with reference to FIG. 9, and/or the bandwidth scaling module 1330 described with reference to FIG. 13. The bandwidth scaling module 1530 may include a PDCCH module 1535. In some examples, the PDCCH module 1535 may be an example of one or more aspects of the PDCCH module 1335 described with reference to FIG. 13. The PDCCH module 1535 may include an uplink ACK module 1540. In some examples, the uplink ACK module 1540 may determine uplink ACKs based at least in part on a number ePDCCH grants and a number of transport blocks (TBs) in each of the multiple ePDCCHs. In some examples, the uplink ACK module 1540 may multiplex the uplink ACKs based at least in part on a grant identification (ID) and a carrier indicator field (CIF). In some examples, the uplink ACK module 1540 may multiplex the uplink ACKs based at least in part on a TB identification (ID), a grant identification (ID) and a carrier indicator field (CIF).

Figure 16:
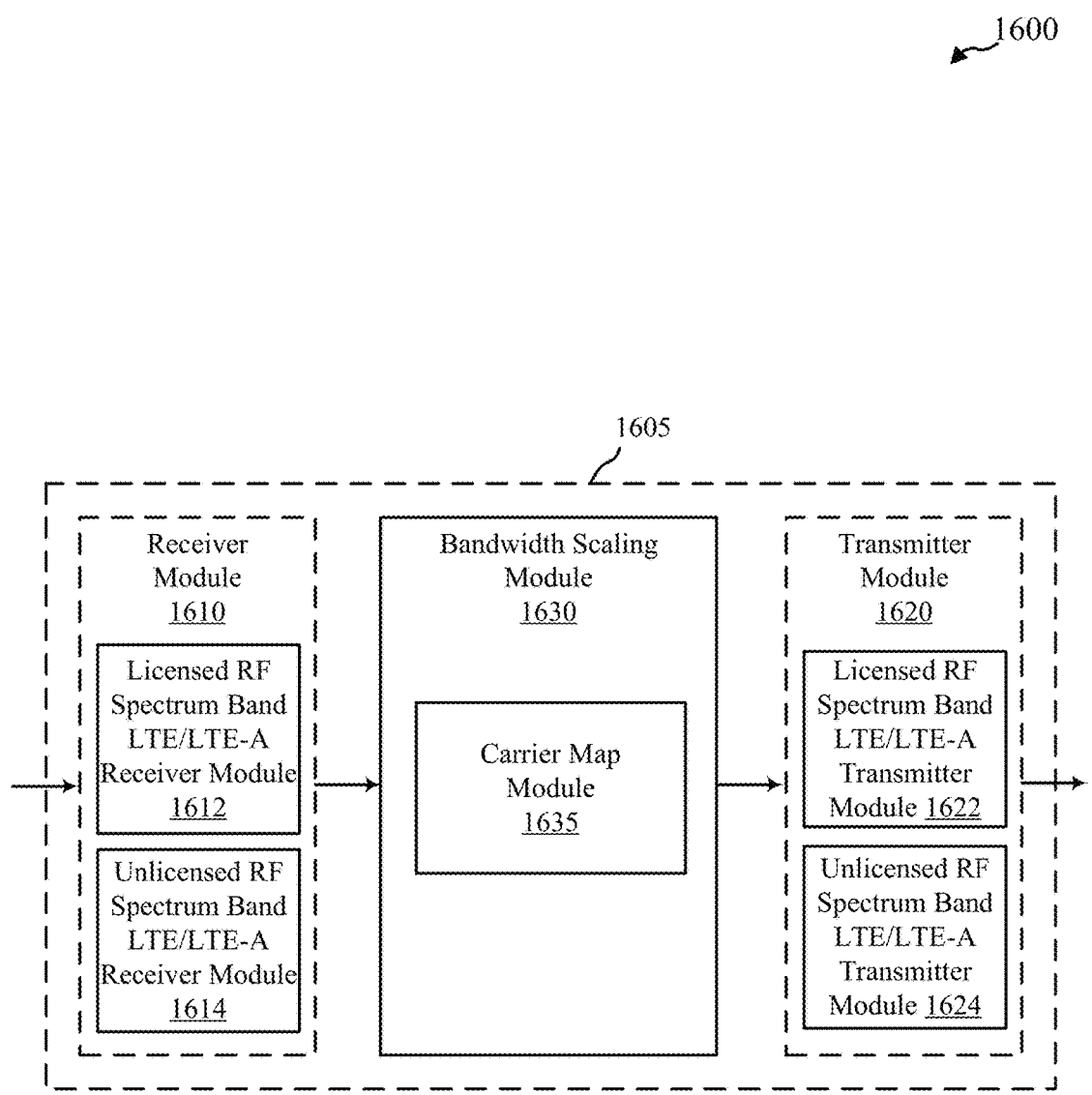
FIG. 16 shows a block diagram of an apparatus for use in wireless communication, in accordance with various aspects of the present disclosure.

FIG. 16 shows a block diagram 1600 of an apparatus 1605 for use in wireless communication, in accordance with various aspects of the present disclosure. In some examples, the apparatus 1605 may be an example of aspects of one or more of the base station 105, base station 205, base station 205-a, UE 115, UE 215, UE 215-a, UE 215-b, and/or UE 215-c described with reference to FIGS. 1 and/or 2, and/or an example of aspects of the apparatus 905 described with reference to FIG. 9. In some examples, the apparatus 1605 may be part of or include a UE, a LTE/LTE-A eNB and/or a LTE/LTE-A base station. The apparatus 1605 may also be a processor. In some examples, the apparatus 1605 may be referred to as a transmitter or transmitter apparatus. The apparatus 1605 may include a receiver module 1610, a bandwidth scaling module 1630, and/or a transmitter module 1620. Each of these components may be in communication with each other.

The components of the apparatus 1605 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1610 may be an example of one or more aspects of the receiver module 910 described with reference to FIG. 9. In some examples, the receiver module 1610 may include at least one radio frequency (RF) receiver, such as at least one RF receiver operable to receive transmissions over a licensed radio frequency spectrum band (e.g., a radio frequency spectrum band for which apparatuses do not contend for access because the radio frequency spectrum band is licensed to users (e.g., LTE/LTE-A users)) and/or an unlicensed radio frequency spectrum band (e.g., a radio frequency spectrum band for which apparatuses may need to contend for access because the radio frequency spectrum band is available, at least in part, for unlicensed use (e.g., Wi-Fi use and/or LTE/LTE-A use in an unlicensed radio frequency spectrum band)). In some examples, the licensed radio frequency spectrum band and/or the unlicensed radio frequency spectrum band may be used for LTE/LTE-A communications, as described, for example, with reference to FIG. 1-8. The receiver module 1610 may in some cases include separate receivers for the licensed radio frequency spectrum band and the unlicensed radio frequency spectrum band. The separate receivers may, in some examples, take the form of a licensed RF spectrum band LTE/LTE-A receiver module 1612 for communicating over the licensed radio frequency spectrum band, and an unlicensed RF spectrum band LTE/LTE-A receiver module 1614 for communicating over the unlicensed radio frequency spectrum band. The receiver module 1610 may also include receiver modules for communicating over other radio frequency spectrum bands and/or for communicating via other radio access technologies (e.g., Wi-Fi). The receiver module 1610, including the licensed RF spectrum band LTE/LTE-A receiver module 1612 and/or the unlicensed RF spectrum band LTE/LTE-A receiver module 1614 may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter module 1620 may be an example of one or more aspects of the transmitter module 920 described with reference to FIG. 9. In some examples, the transmitter module 1620 may include at least one RF transmitter, such as at least one RF transmitter operable to transmit over the licensed radio frequency spectrum band and/or the unlicensed radio frequency spectrum band. The transmitter module 1620 may in some cases include separate transmitters for the licensed radio frequency spectrum band and the unlicensed radio frequency spectrum band. The separate transmitters may, in some examples, take the form of a licensed RF spectrum band LTE/LTE-A transmitter module 1622 for communicating over the licensed radio frequency spectrum band, and an unlicensed RF spectrum band LTE/LTE-A transmitter module 1624 for communicating over the unlicensed radio frequency spectrum band. The transmitter module 1620, including the licensed RF spectrum band LTE/LTE-A transmitter module 1622 and/or the unlicensed RF spectrum band LTE/LTE-A transmitter module 1624 may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the bandwidth scaling module 1630 may be an example of one or more aspects of the bandwidth scaling module 930 described with reference to FIG. 9. The bandwidth scaling module 1630 may include a carrier map module 1635. In some examples, the carrier map module 1635 may determine a carrier map. The carrier map may identify the carrier and the sub-channels included in the carrier. The carrier map module 1635 may also communicate the carrier map to a UE. The carrier map module 1635 may communicate the carrier map to the UE using a radio resource control (RRC) signal. In some examples, the carrier map may identify multiple carriers and their respective sub-channels.

Figure 17:
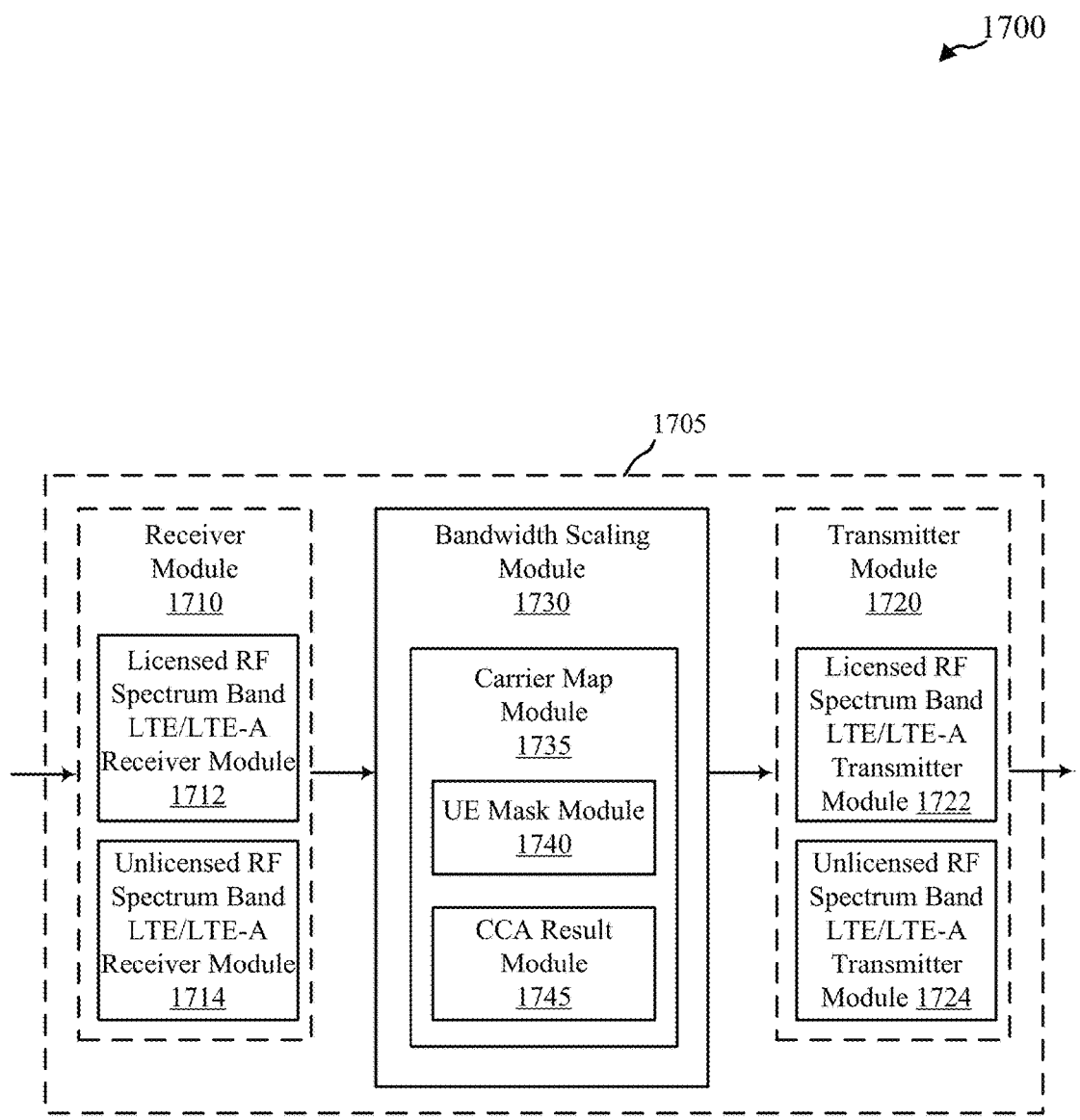
FIG. 17 shows a block diagram of an apparatus for use in wireless communication, in accordance with various aspects of the present disclosure.

FIG. 17 shows a block diagram 1700 of an apparatus 1705 for use in wireless communication, in accordance with various aspects of the present disclosure. In some examples, the apparatus 1705 may be an example of aspects of one or more of the base station 105, base station 205, base station 205-*a*, UE 115, UE 215, UE 215-*a*, UE 215-*b*, and/or UE 215-*c* described with reference to FIGS. 1 and/or 2, and/or an example of aspects of the apparatus 905 described with reference to FIG. 9. In some examples, the apparatus 1705 may be part of or include a UE, a LTE/LTE-A eNB and/or a LTE/LTE-A base station. The apparatus 1705 may also be a processor. In some examples, the apparatus 1705 may be referred to as a transmitter or transmitter apparatus. The apparatus 1705 may include a receiver module 1710, a bandwidth scaling module 1730, and/or a transmitter module 1720. Each of these components may be in communication with each other.

The components of the apparatus 1705 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1710 may be an example of one or more aspects of the receiver module 910 described with reference to FIG. 9. In some examples, the receiver module 1710 may include at least one RF receiver, such as at least one RF receiver operable to receive transmissions over a licensed radio frequency spectrum band (e.g., a radio frequency spectrum band for which apparatuses do not contend for access because the radio frequency spectrum band is licensed to users (e.g., LTE/LTE-A users)) and/or an unlicensed radio frequency spectrum band (e.g., a radio frequency spectrum band for which apparatuses may need to contend for access because the radio frequency spectrum band is available, at least in part, for unlicensed use (e.g., Wi-Fi use and/or LTE/LTE-A use in an unlicensed radio frequency spectrum band)). In some examples, the licensed radio frequency spectrum band and/or the unlicensed radio frequency spectrum band may be used for LTE/LTE-A communications, as described, for example, with reference to FIG. 1-8. The receiver module 1710 may in some cases include separate receivers for the licensed radio frequency spectrum band and the unlicensed radio frequency spectrum band. The separate receivers may, in some examples, take the form of a licensed RF spectrum band LTE/LTE-A receiver module 1712 for communicating over the licensed radio frequency spectrum band, and an unlicensed RF spectrum band LTE/LTE-A receiver module 1714 for communicating over the unlicensed radio frequency spectrum band. The receiver module 1710 may also include receiver modules for communicating over other radio frequency spectrum bands and/or for communicating via other radio access technologies (e.g., Wi-Fi). The receiver module 1710, including the licensed RF spectrum band LTE/LTE-A receiver module 1712 and/or the unlicensed RF spectrum band LTE/LTE-A receiver module 1714 may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter module 1720 may be an example of one or more aspects of the transmitter module 920 described with reference to FIG. 9. In some examples, the transmitter module 1720 may include at least one RF transmitter, such as at least one RF transmitter operable to transmit over the licensed radio frequency spectrum band and/or the unlicensed radio frequency spectrum band. The transmitter module 1720 may in some cases include separate transmitters for the licensed radio frequency spectrum band and the unlicensed radio frequency spectrum band. The separate transmitters may, in some examples, take the form of a licensed RF spectrum band LTE/LTE-A transmitter module 1722 for communicating over the licensed radio frequency spectrum band, and an unlicensed RF spectrum band LTE/LTE-A transmitter module 1724 for communicating over the unlicensed radio frequency spectrum band. The transmitter module 1720, including the licensed RF spectrum band LTE/LTE-A transmitter module 1722 and/or the unlicensed RF spectrum band LTE/LTE-A transmitter module 1724 may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the bandwidth scaling module 1730 may be an example of one or more aspects of the bandwidth scaling module 930 described with reference to FIG. 9, and/or the bandwidth scaling module 1630 described with reference to FIG. 16. The bandwidth scaling module 1730 may include a carrier map module 1735. In some examples, the carrier map module 1735 may be an example of one or more aspects of the carrier map module 1635 described with reference to FIG. 16. The carrier map module 1735 may include a UE mask module 1740 and/or a CCA result module 1745. In some examples, the UE mask module 1740 may determine at least one UE mask, and communicate the at least one UE mask to a UE. The at least one UE mask may identify at least one sub-channel the UE should monitor for downlink (DL) data. In some examples, the CCA result module 1745 may determine a clear channel assessment (CCA) result, and communicate the CCA result to the UE. In some examples, the CCA result may be communicated to the UE by broadcasting the CCA result over a carrier using a licensed or an unlicensed radio frequency spectrum band. In some examples, the CCA result may be communicated to the UE in DCI that includes a modified RNTI. In some examples, the CCA result may be communicated to the UE with a channel usage beacon signal (CUBS).

In some examples, the CCA result may identify at least one sub-channel that is available for communication. In some examples, the available sub-channel may be determined based at least in part on the at least one UE mask and the CCA result. In some examples, the available sub-channel may be determined by combining the at least one UE mask and the CCA result.

In some examples, the UE mask module may dynamically vary which sub-channel(s) are identified by the UE mask. In some examples, the dynamic variation of the UE mask may be based at least in part on medium access control (MAC) signaling. In some examples, the dynamic variation of the UE mask may be based at least in part on system frame number (SFN) signaling.

Figure 18:
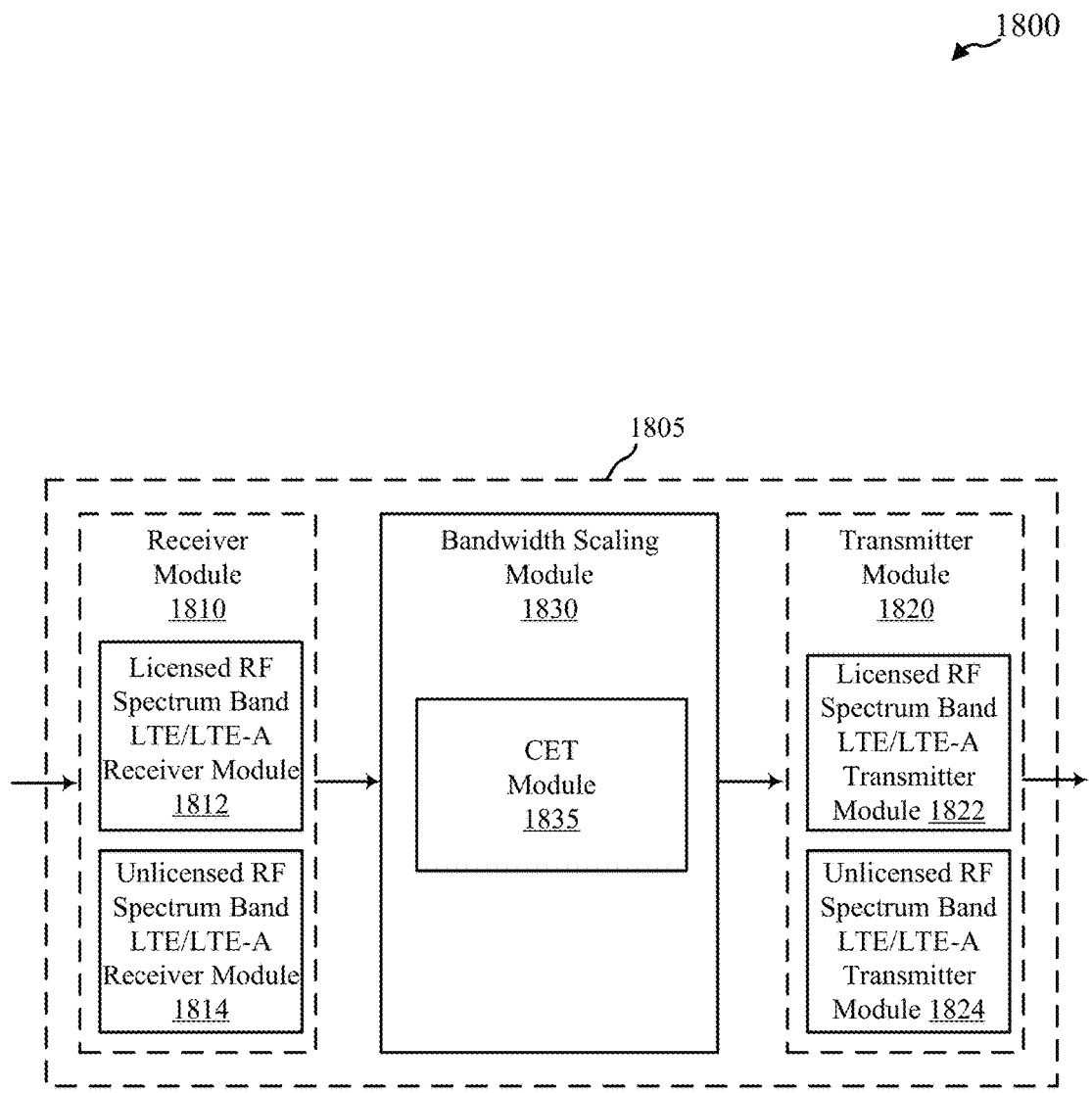
FIG. 18 shows a block diagram of an apparatus for use in wireless communication, in accordance with various aspects of the present disclosure.

FIG. 18 shows a block diagram 1800 of an apparatus 1805 for use in wireless communication, in accordance with various aspects of the present disclosure. In some examples, the apparatus 1805 may be an example of aspects of one or more of the base station 105, base station 205, base station 205-*a*, UE 115, UE 215, UE 215-*a*, UE 215-*b*, and/or UE 215-*c* described with reference to FIGS. 1 and/or 2, and/or an example of aspects of the apparatus 905 described with reference to FIG. 9. In some examples, the apparatus 1805 may be part of or include a UE, a LTE/LTE-A eNB and/or a LTE/LTE-A base station. The apparatus 1805 may also be a processor. In some examples, the apparatus 1805 may be referred to as a transmitter or transmitter apparatus. The apparatus 1805 may include a receiver module 1810, a bandwidth scaling module 1830, and/or a transmitter module 1820. Each of these components may be in communication with each other.

The components of the apparatus 1805 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1810 may be an example of one or more aspects of the receiver module 910 described with reference to FIG. 9. In some examples, the receiver module 1810 may include at least one RF receiver, such as at least one RF receiver operable to receive transmissions over a licensed radio frequency spectrum band (e.g., a radio frequency spectrum band for which apparatuses do not contend for access because the radio frequency spectrum band is licensed to users (e.g., LTE/LTE-A users)) and/or an unlicensed radio frequency spectrum band (e.g., a radio frequency spectrum band for which apparatuses may need to contend for access because the radio frequency spectrum band is available, at least in part, for unlicensed use (e.g., Wi-Fi use and/or LTE/LTE-A use in an unlicensed radio frequency spectrum band)). In some examples, the licensed radio frequency spectrum band and/or the unlicensed radio frequency spectrum band may be used for LTE/LTE-A communications, as described, for example, with reference to FIG. 1-8. The receiver module 1810 may in some cases include separate receivers for the licensed radio frequency spectrum band and the unlicensed radio frequency spectrum band. The separate receivers may, in some examples, take the form of a licensed RF spectrum band LTE/LTE-A receiver module 1812 for communicating over the licensed radio frequency spectrum band, and an unlicensed RF spectrum band LTE/LTE-A receiver module 1814 for communicating over the unlicensed radio frequency spectrum band. The receiver module 1810 may also include receiver modules for communicating over other radio frequency spectrum bands and/or for communicating via other radio access technologies (e.g., Wi-Fi). The receiver module 1810, including the licensed RF spectrum band LTE/LTE-A receiver module 1812 and/or the unlicensed RF spectrum band LTE/LTE-A receiver module 1814 may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter module 1820 may be an example of one or more aspects of the transmitter module 920 described with reference to FIG. 9. In some examples, the transmitter module 1820 may include at least one RF transmitter, such as at least one RF transmitter operable to transmit over the licensed radio frequency spectrum band and/or the unlicensed radio frequency spectrum band. The transmitter module 1820 may in some cases include separate transmitters for the licensed radio frequency spectrum band and the unlicensed radio frequency spectrum band. The separate transmitters may, in some examples, take the form of a licensed RF spectrum band LTE/LTE-A transmitter module 1822 for communicating over the licensed radio frequency spectrum band, and an unlicensed RF spectrum band LTE/LTE-A transmitter module 1824 for communicating over the unlicensed radio frequency spectrum band. The transmitter module 1820, including the licensed RF spectrum band LTE/LTE-A transmitter module 1822 and/or the unlicensed RF spectrum band LTE/LTE-A transmitter module 1824 may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the bandwidth scaling module 1830 may be an example of one or more aspects of the bandwidth scaling module 930 described with reference to FIG. 9. The bandwidth scaling module 1830 may include a CET module 1835. In some examples, the CET module 1835 may communicate a CET over the carrier. In some examples, the CET module 1835 may repeat the CET on each available sub-channel identified by the bandwidth scaling module 1830. In some examples, the CET may span the bandwidth of the carrier. In some examples, the CET module 1835 may repeat the CET at the same time on each available sub-channel identified by the bandwidth scaling module 1830. In some examples, the CET module 1835 may repeat the CET at different times on each available sub-channel identified by the bandwidth scaling module 1830.

Figure 19:
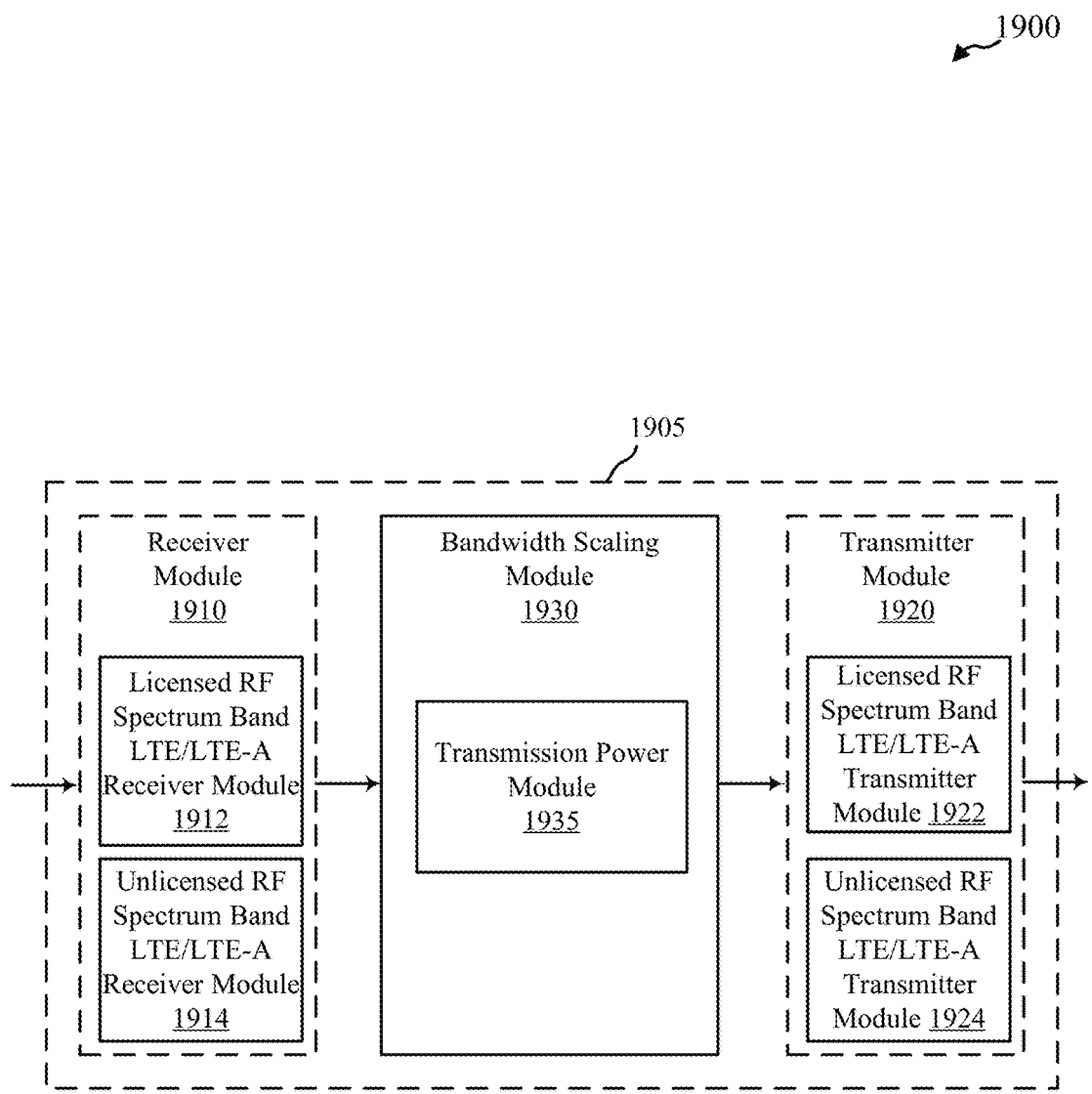
FIG. 19 shows a block diagram of an apparatus for use in wireless communication, in accordance with various aspects of the present disclosure.

FIG. 19 shows a block diagram 1900 of an apparatus 1905 for use in wireless communication, in accordance with various aspects of the present disclosure. In some examples, the apparatus 1905 may be an example of aspects of one or more of the base station 105, base station 205, base station 205-*a*, UE 115, UE 215, UE 215-*a*, UE 215-*b*, and/or UE 215-*c* described with reference to FIGS. 1 and/or 2, and/or an example of aspects of the apparatus 905 described with reference to FIG. 9. In some examples, the apparatus 1905 may be part of or include a UE, a LTE/LTE-A eNB and/or a LTE/LTE-A base station. The apparatus 1905 may also be a processor. In some examples, the apparatus 1905 may be referred to as a transmitter or transmitter apparatus. The apparatus 1905 may include a receiver module 1910, a bandwidth scaling module 1930, and/or a transmitter module 1920. Each of these components may be in communication with each other.

The components of the apparatus 1905 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1910 may be an example of one or more aspects of the receiver module 910 described with reference to FIG. 9. In some examples, the receiver module 1910 may include at least one RF receiver, such as at least one RF receiver operable to receive transmissions over a licensed radio frequency spectrum band (e.g., a radio frequency spectrum band for which apparatuses do not contend for access because the radio frequency spectrum band is licensed to users (e.g., LTE/LTE-A users)) and/or an unlicensed radio frequency spectrum band (e.g., a radio frequency spectrum band for which apparatuses may need to contend for access because the radio frequency spectrum band is available, at least in part, for unlicensed use (e.g., Wi-Fi use and/or LTE/LTE-A use in an unlicensed radio frequency spectrum band)). In some examples, the licensed radio frequency spectrum band and/or the unlicensed radio frequency spectrum band may be used for LTE/LTE-A communications, as described, for example, with reference to FIG. 1-8. The receiver module 1910 may in some cases include separate receivers for the licensed radio frequency spectrum band and the unlicensed radio frequency spectrum band. The separate receivers may, in some examples, take the form of a licensed RF spectrum band LTE/LTE-A receiver module 1912 for communicating over the licensed radio frequency spectrum band, and an unlicensed RF spectrum band LTE/LTE-A receiver module 1914 for communicating over the unlicensed radio frequency spectrum band. The receiver module 1910 may also include receiver modules for communicating over other radio frequency spectrum bands and/or for communicating via other radio access technologies (e.g., Wi-Fi). The receiver module 1910, including the licensed RF spectrum band LTE/LTE-A receiver module 1912 and/or the unlicensed RF spectrum band LTE/LTE-A receiver module 1914 may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter module 1920 may be an example of one or more aspects of the transmitter module 920 described with reference to FIG. 9. In some examples, the transmitter module 1920 may include at least one RF transmitter, such as at least one RF transmitter operable to transmit over the licensed radio frequency spectrum band and/or the unlicensed radio frequency spectrum band. The transmitter module 1920 may in some cases include separate transmitters for the licensed radio frequency spectrum band and the unlicensed radio frequency spectrum band. The separate transmitters may, in some examples, take the form of a licensed RF spectrum band LTE/LTE-A transmitter module 1922 for communicating over the licensed radio frequency spectrum band, and an unlicensed RF spectrum band LTE/LTE-A transmitter module 1924 for communicating over the unlicensed radio frequency spectrum band. The transmitter module 1920, including the licensed RF spectrum band LTE/LTE-A transmitter module 1922 and/or the unlicensed RF spectrum band LTE/LTE-A transmitter module 1924 may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the bandwidth scaling module 1930 may be an example of one or more aspects of the bandwidth scaling module 930 described with reference to FIG. 9. The bandwidth scaling module 1930 may include a transmission power module 1935. In some examples, the bandwidth scaling module 1930 may identify additional available sub-channels to include in an additional carrier for communicating over the unlicensed radio frequency spectrum band. In some examples, the transmission power module 1935 may determine transmission powers to use for each of the available sub-channels included in the first carrier, and each of the available sub-channels included in the additional carrier. The transmission power for each sub-channel may be based at least in part on a power constraint for the unlicensed radio frequency spectrum band. In some examples, the transmission power for each sub-channel may be based at least in part on the number of available sub-channels included in the first carrier, and the number of available sub-channels included in the additional carrier.

In some examples, the transmission power module 1935 may allocate a first sub-channel of the available sub-channels a first transmission power, and at least one second sub-channel of the available sub-channels a second transmission power. In some examples, the first transmission power and the second transmission power may be different. In some examples, the first transmission power and the second transmission power may be pre-defined values. In some examples, a Clear channel assessment Exempt Transmission (CET) may include the pre-defined values. In some examples, the first transmission power and the second transmission power may be based at least in part on a desired coverage area for the first sub-channel and the at least one second sub-channel. In some examples, the first transmission power and the second transmission power may be based at least in part on a desired capacity for the first sub-channel and the at least one second sub-channel. In some examples, the first transmission power and the second transmission power may be based at least in part on a number of available sub-channels identified by the bandwidth scaling module 1930.

Figure 20:
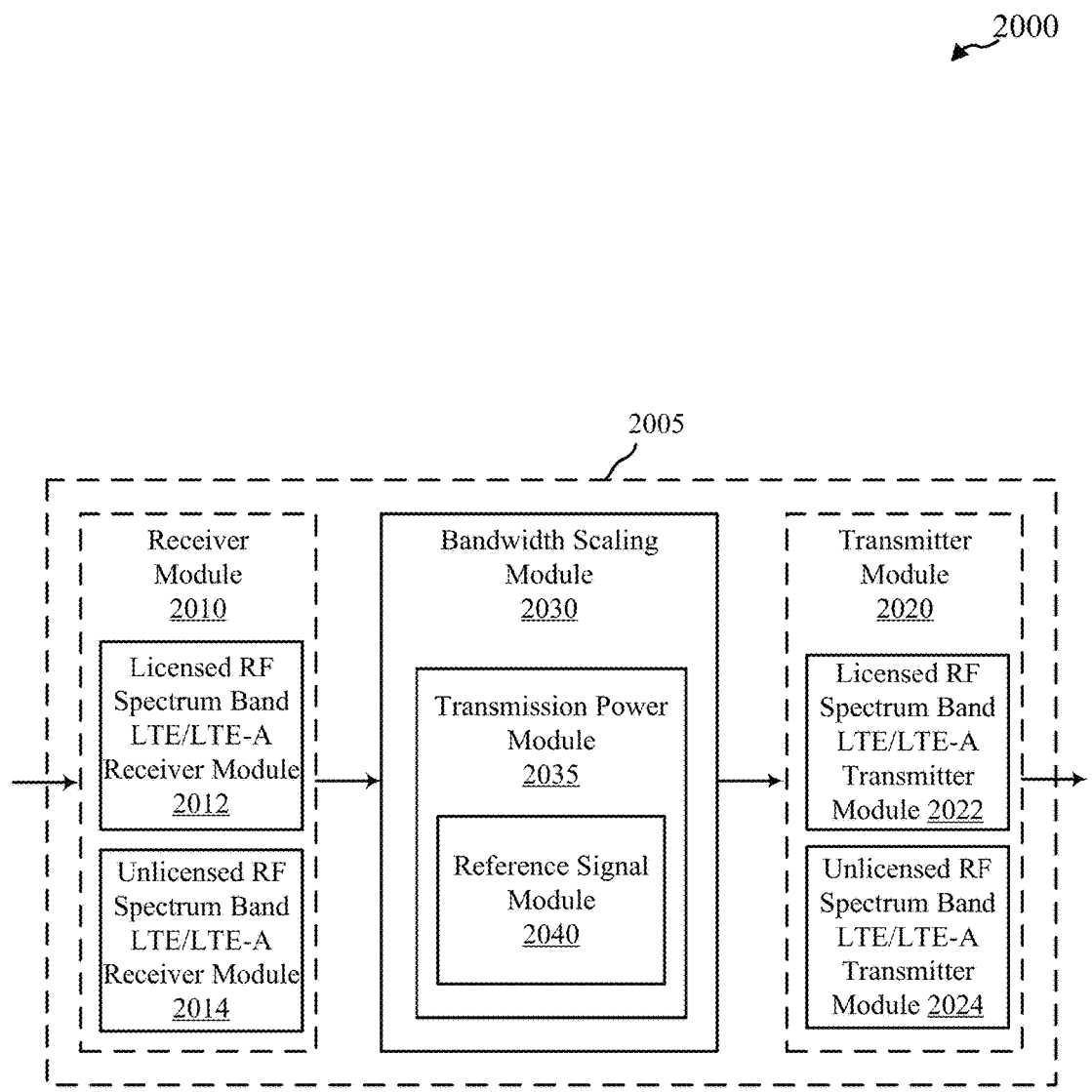
FIG. 20 shows a block diagram of an apparatus for use in wireless communication, in accordance with various aspects of the present disclosure.

FIG. 20 shows a block diagram 2000 of an apparatus 2005 for use in wireless communication, in accordance with various aspects of the present disclosure. In some examples, the apparatus 2005 may be an example of aspects of one or more of the base station 105, base station 205, base station 205-a, UE 115, UE 215, UE 215-a, UE 215-b, and/or UE 215-c described with reference to FIGS. 1 and/or 2, and/or an example of aspects of the apparatus 905 described with reference to FIG. 9. In some examples, the apparatus 2005 may be part of or include a UE, a LTE/LTE-A eNB and/or a LTE/LTE-A base station. The apparatus 2005 may also be a processor. In some examples, the apparatus 2005 may be referred to as a transmitter or transmitter apparatus. The apparatus 2005 may include a receiver module 2010, a bandwidth scaling module 2030, and/or a transmitter module 2020. Each of these components may be in communication with each other.

The components of the apparatus 2005 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 2010 may be an example of one or more aspects of the receiver module 910 described with reference to FIG. 9. In some examples, the receiver module 2010 may include at least one RF receiver, such as at least one RF receiver operable to receive transmissions over a licensed radio frequency spectrum band (e.g., a radio frequency spectrum band for which apparatuses do not contend for access because the radio frequency spectrum band is licensed to users (e.g., LTE/LTE-A users)) and/or an unlicensed radio frequency spectrum band (e.g., a radio frequency spectrum band for which apparatuses may need to contend for access because the radio frequency spectrum band is available, at least in part, for unlicensed use (e.g., Wi-Fi use and/or LTE/LTE-A use in an unlicensed radio frequency spectrum band)). In some examples, the licensed radio frequency spectrum band and/or the unlicensed radio frequency spectrum band may be used for LTE/LTE-A communications, as described, for example, with reference to FIG. 1-8. The receiver module 2010 may in some cases include separate receivers for the licensed radio frequency spectrum band and the unlicensed radio frequency spectrum band. The separate receivers may, in some examples, take the form of a licensed RF spectrum band LTE/LTE-A receiver module 2012 for communicating over the licensed radio frequency spectrum band, and an unlicensed RF spectrum band LTE/LTE-A receiver module 2014 for communicating over the unlicensed radio frequency spectrum band. The receiver module 2010 may also include receiver modules for communicating over other radio frequency spectrum bands and/or for communicating via other radio access technologies (e.g., Wi-Fi). The receiver module 2010, including the licensed RF spectrum band LTE/LTE-A receiver module 2012 and/or the unlicensed RF spectrum band LTE/LTE-A receiver module 2014 may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter module 2020 may be an example of one or more aspects of the transmitter module 920 described with reference to FIG. 9. In some examples, the transmitter module 2020 may include at least one RF transmitter, such as at least one RF transmitter operable to transmit over the licensed radio frequency spectrum band and/or the unlicensed radio frequency spectrum band. The transmitter module 2020 may in some cases include separate transmitters for the licensed radio frequency spectrum band and the unlicensed radio frequency spectrum band. The separate transmitters may, in some examples, take the form of a licensed RF spectrum band LTE/LTE-A transmitter module 2022 for communicating over the licensed radio frequency spectrum band, and an unlicensed RF spectrum band LTE/LTE-A transmitter module 2024 for communicating over the unlicensed radio frequency spectrum band. The transmitter module 2020, including the licensed RF spectrum band LTE/LTE-A transmitter module 2022 and/or the unlicensed RF spectrum band LTE/LTE-A transmitter module 2024 may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the bandwidth scaling module 2030 may be an example of one or more aspects of the bandwidth scaling module 930 described with reference to FIG. 9, and/or the bandwidth scaling module 1930 described with reference to FIG. 19. The bandwidth scaling module 2030 may include a transmission power module 2035. In some examples, the transmission power module 2035 may be an example of one or more aspects of the transmission power module 1935 described with reference to FIG. 19. The transmission power module 2035 may include a reference signal module 2040. In some examples, the reference signal module 2040 may transmit a first reference signal on the first sub-channel of the available sub-channels, and transmit a second reference signal on the at least one second sub-channel of the available sub-channels. In some examples, the reference signal module 2040 may transmit the first reference signal and the second reference signal at the same transmission power. In some examples, the first reference signal and the second reference signal may be extended Common Reference Signals (eCRS's). In some examples, the first reference signal and the second reference signal may be Channel State Information Reference Signals (CSI-RS's). In some examples, the transmission powers for the first reference signal and the second reference signal may be fixed values.

Figure 21:
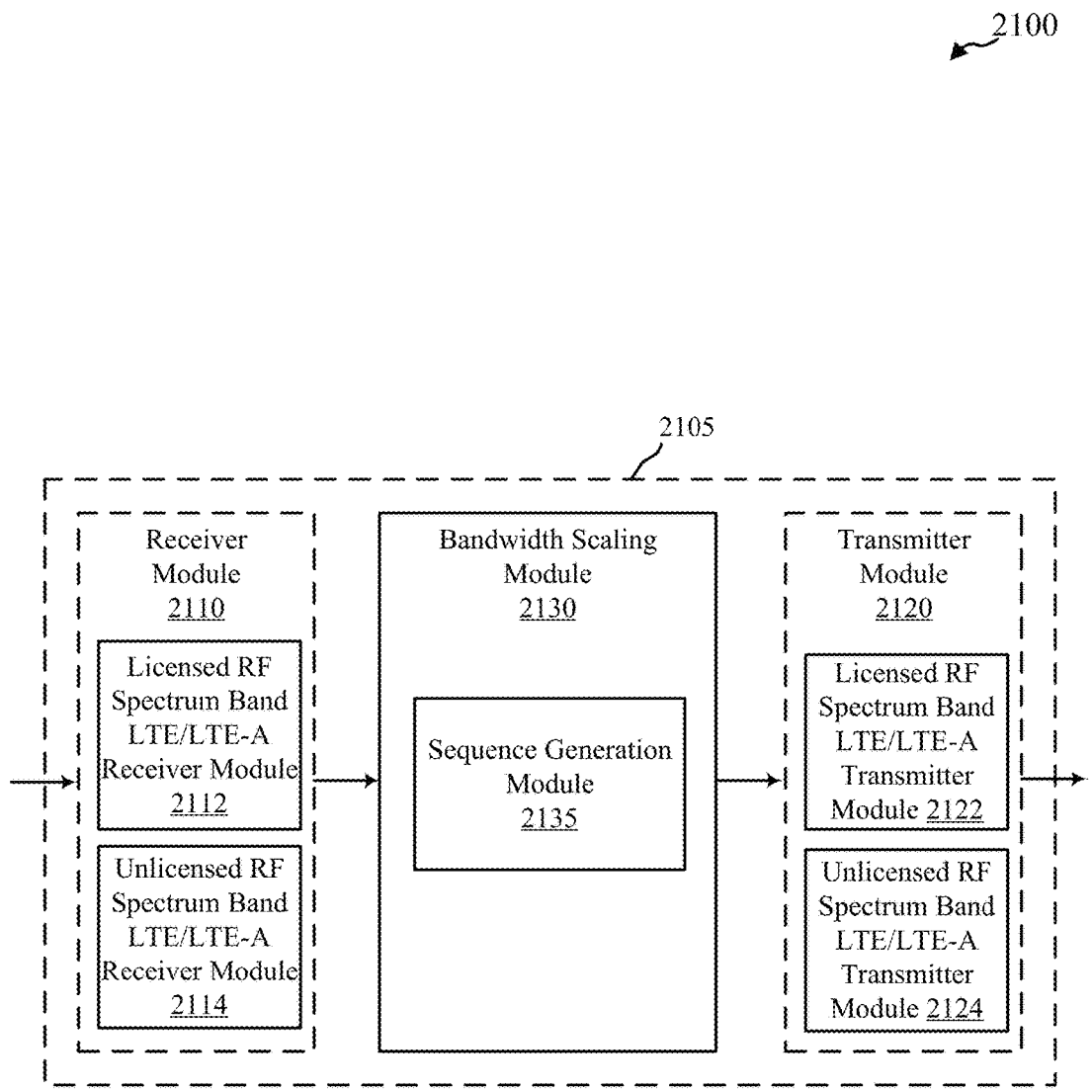
FIG. 21 shows a block diagram of an apparatus for use in wireless communication, in accordance with various aspects of the present disclosure.

FIG. 21 shows a block diagram 2100 of an apparatus 2105 for use in wireless communication, in accordance with various aspects of the present disclosure. In some examples, the apparatus 2105 may be an example of aspects of one or more of the base station 105, base station 205, base station 205-a, UE 115, UE 215, UE 215-a, UE 215-b, and/or UE 215-c described with reference to FIGS. 1 and/or 2, and/or an example of aspects of the apparatus 905 described with reference to FIG. 9. In some examples, the apparatus 2105 may be part of or include a UE, a LTE/LTE-A eNB and/or a LTE/LTE-A base station. The apparatus 2105 may also be a processor. In some examples, the apparatus 2105 may be referred to as a transmitter or transmitter apparatus. The apparatus 2105 may include a receiver module 2110, a bandwidth scaling module 2130, and/or a transmitter module 2120. Each of these components may be in communication with each other.

The components of the apparatus 2105 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 2110 may be an example of one or more aspects of the receiver module 910 described with reference to FIG. 9. In some examples, the receiver module 2110 may include at least one RF receiver, such as at least one RF receiver operable to receive transmissions over a licensed radio frequency spectrum band (e.g., a radio frequency spectrum band for which apparatuses do not contend for access because the radio frequency spectrum band is licensed to users (e.g., LTE/LTE-A users)) and/or an unlicensed radio frequency spectrum band (e.g., a radio frequency spectrum band for which apparatuses may need to contend for access because the radio frequency spectrum band is available, at least in part, for unlicensed use (e.g., Wi-Fi use and/or LTE/LTE-A use in an unlicensed radio frequency spectrum band)). In some examples, the licensed radio frequency spectrum band and/or the unlicensed radio frequency spectrum band may be used for LTE/LTE-A communications, as described, for example, with reference to FIG. 1-8. The receiver module 2110 may in some cases include separate receivers for the licensed radio frequency spectrum band and the unlicensed radio frequency spectrum band. The separate receivers may, in some examples, take the form of a licensed RF spectrum band LTE/LTE-A receiver module 2112 for communicating over the licensed radio frequency spectrum band, and an unlicensed RF spectrum band LTE/LTE-A receiver module 2114 for communicating over the unlicensed radio frequency spectrum band. The receiver module 2110 may also include receiver modules for communicating over other radio frequency spectrum bands and/or for communicating via other radio access technologies (e.g., Wi-Fi). The receiver module 2110, including the licensed RF spectrum band LTE/LTE-A receiver module 2112 and/or the unlicensed RF spectrum band LTE/LTE-A receiver module 2114 may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter module 2120 may be an example of one or more aspects of the transmitter module 920 described with reference to FIG. 9. In some examples, the transmitter module 2120 may include at least one RF transmitter, such as at least one RF transmitter operable to transmit over the licensed radio frequency spectrum band and/or the unlicensed radio frequency spectrum band. The transmitter module 2120 may in some cases include separate transmitters for the licensed radio frequency spectrum band and the unlicensed radio frequency spectrum band. The separate transmitters may, in some examples, take the form of a licensed RF spectrum band LTE/LTE-A transmitter module 2122 for communicating over the licensed radio frequency spectrum band, and an unlicensed RF spectrum band LTE/LTE-A transmitter module 2124 for communicating over the unlicensed radio frequency spectrum band. The transmitter module 2120, including the licensed RF spectrum band LTE/LTE-A transmitter module 2122 and/or the unlicensed RF spectrum band LTE/LTE-A transmitter module 2124 may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the bandwidth scaling module 2130 may be an example of one or more aspects of the bandwidth scaling module 930 described with reference to FIG. 9. The bandwidth scaling module 2130 may include a sequence generation module 2135. In some examples, the sequence generation module 2135 may generate a sequence. In some examples, the sequence generation module 2135 may use a number of resource blocks (RBs) in the sequence generation. The number of RBs may be based at least in part on the bandwidth of the carrier. In some examples, the sequence generation module 2135 may repeat the sequence on each available sub-channel identified by the bandwidth scaling module 2130. In some examples, the sequence generation module 2135 may generate the sequence for all of the sub-channels of the unlicensed radio frequency spectrum band or sub-band, and then puncture the sequence based at least in part on the available sub-channels identified by the bandwidth scaling module 2130. In some examples, the available sub-channels may be determined at least in part by a CCA result. In some examples, the sequence may include at least one of a demodulation reference signal (DM-RS), an extended common reference signal (eCRS), a channel usage beacon signal (CUBS), or a channel state information reference signal (CSI-RS).

Figure 22:
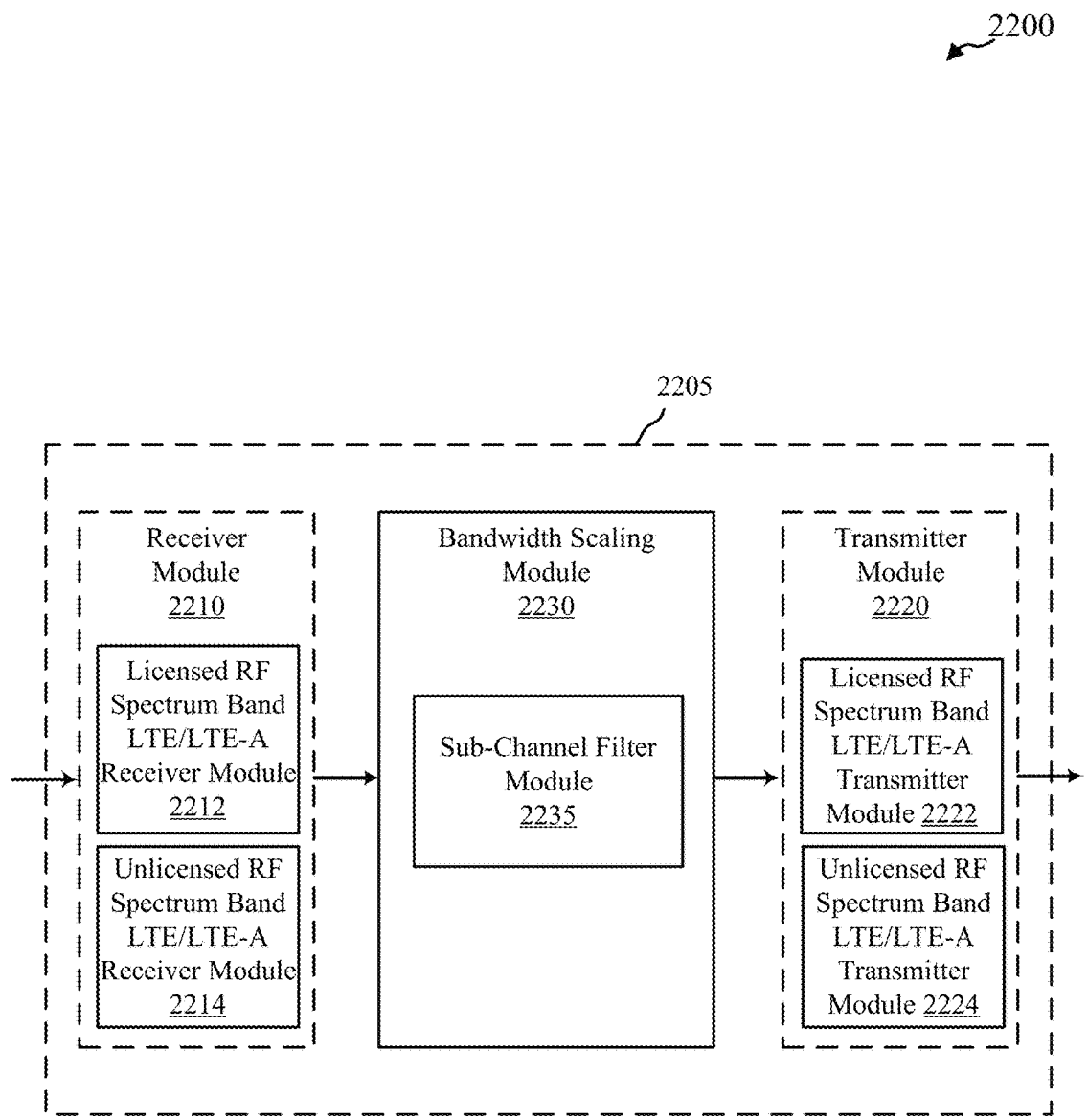
FIG. 22 shows a block diagram of an apparatus for use in wireless communication, in accordance with various aspects of the present disclosure.

FIG. 22 shows a block diagram 2200 of an apparatus 2205 for use in wireless communication, in accordance with various aspects of the present disclosure. In some examples, the apparatus 2205 may be an example of aspects of one or more of the base station 105, base station 205, base station 205-a, UE 115, UE 215, UE 215-a, UE 215-b, and/or UE 215-c described with reference to FIGS. 1 and/or 2, and/or an example of aspects of the apparatus 905 described with reference to FIG. 9. In some examples, the apparatus 2205 may be part of or include a UE, a LTE/LTE-A eNB and/or a LTE/LTE-A base station. The apparatus 2205 may also be a processor. In some examples, the apparatus 2205 may be referred to as a transmitter or transmitter apparatus. The apparatus 2205 may include a receiver module 2210, a bandwidth scaling module 2230, and/or a transmitter module 2220. Each of these components may be in communication with each other.

The components of the apparatus 2205 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 2210 may be an example of one or more aspects of the receiver module 910 described with reference to FIG. 9. In some examples, the receiver module 2210 may include at least one RF receiver, such as at least one RF receiver operable to receive transmissions over a licensed radio frequency spectrum band (e.g., a radio frequency spectrum band for which apparatuses do not contend for access because the radio frequency spectrum band is licensed to users (e.g., LTE/LTE-A users)) and/or an unlicensed radio frequency spectrum band (e.g., a radio frequency spectrum band for which apparatuses may need to contend for access because the radio frequency spectrum band is available, at least in part, for unlicensed use (e.g., Wi-Fi use and/or LTE/LTE-A use in an unlicensed radio frequency spectrum band)). In some examples, the licensed radio frequency spectrum band and/or the unlicensed radio frequency spectrum band may be used for LTE/LTE-A communications, as described, for example, with reference to FIG. 1-8. The receiver module 2210 may in some cases include separate receivers for the licensed radio frequency spectrum band and the unlicensed radio frequency spectrum band. The separate receivers may, in some examples, take the form of a licensed RF spectrum band LTE/LTE-A receiver module 2212 for communicating over the licensed radio frequency spectrum band, and an unlicensed RF spectrum band LTE/LTE-A receiver module 2214 for communicating over the unlicensed radio frequency spectrum band. The receiver module 2210 may also include receiver modules for communicating over other radio frequency spectrum bands and/or for communicating via other radio access technologies (e.g., Wi-Fi). The receiver module 2210, including the licensed RF spectrum band LTE/LTE-A receiver module 2212 and/or the unlicensed RF spectrum band LTE/LTE-A receiver module 2214 may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter module 2220 may be an example of one or more aspects of the transmitter module 920 described with reference to FIG. 9. In some examples, the transmitter module 2220 may include at least one RF transmitter, such as at least one RF transmitter operable to transmit over the licensed radio frequency spectrum band and/or the unlicensed radio frequency spectrum band. The transmitter module 2120 may in some cases include separate transmitters for the licensed radio frequency spectrum band and the unlicensed radio frequency spectrum band. The separate transmitters may, in some examples, take the form of a licensed RF spectrum band LTE/LTE-A transmitter module 2222 for communicating over the licensed radio frequency spectrum band, and an unlicensed RF spectrum band LTE/LTE-A transmitter module 2224 for communicating over the unlicensed radio frequency spectrum band. The transmitter module 2220, including the licensed RF spectrum band LTE/LTE-A transmitter module 2222 and/or the unlicensed RF spectrum band LTE/LTE-A transmitter module 2224 may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the bandwidth scaling module 2230 may be an example of one or more aspects of the bandwidth scaling module 930 described with reference to FIG. 9. The bandwidth scaling module 2230 may include a sub-channel filter module 2235. In some examples, the sub-channel filter module 2235 may select a subset of a plurality of filters that correspond to the available sub-channels identified by the bandwidth scaling module 2230. In some examples, the selected subset of the plurality of filters may span the bandwidth of the carrier. In some examples, the available sub-channels identified by the bandwidth scaling module 2230 may be non-adjacent. In some examples, at least one of the filters in the subset of filters selected by the sub-channel filter module 2235 may span at least one guard band between two adjacent sub-channels.

Figure 23:
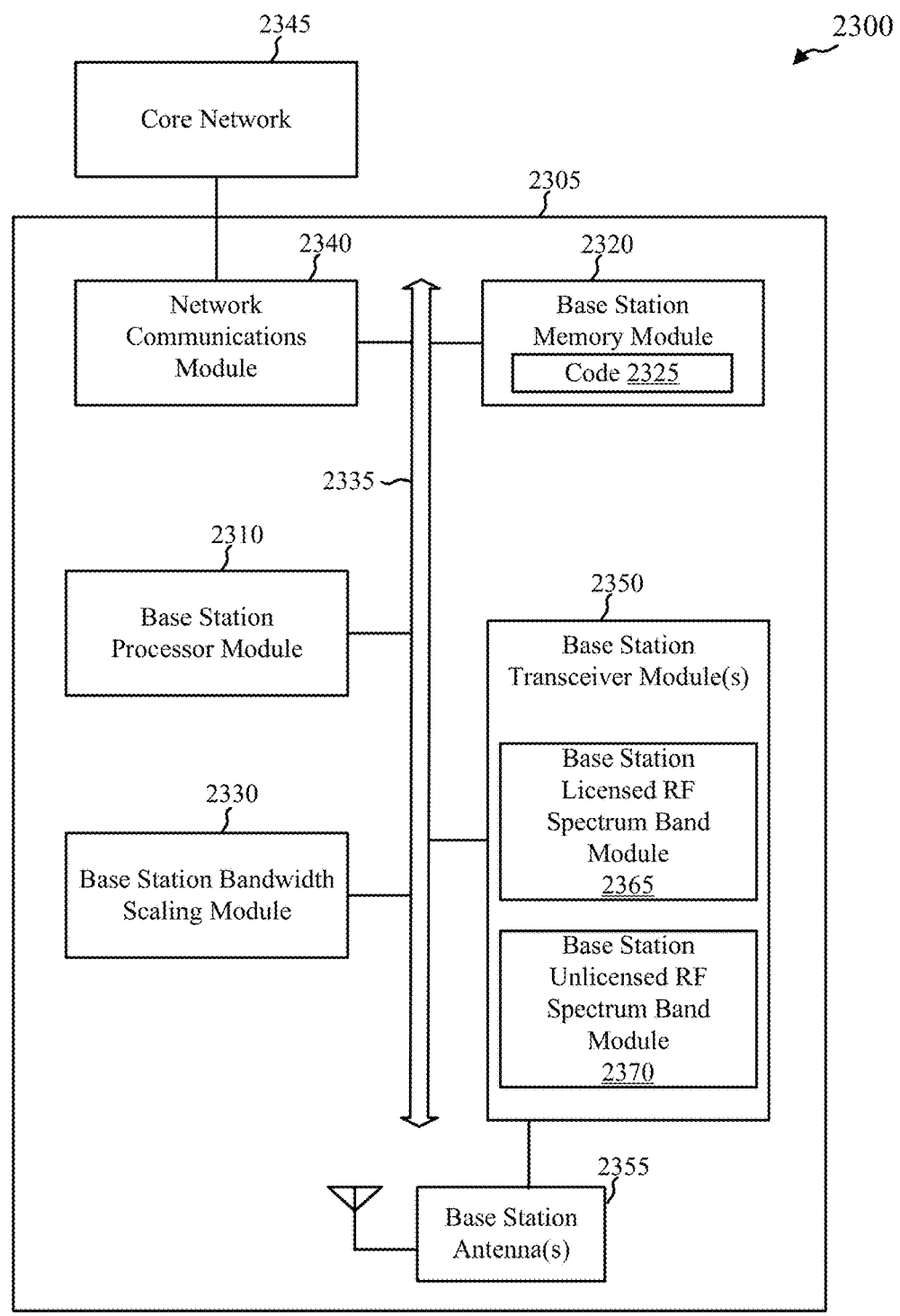
FIG. 23 shows a block diagram of a base station (e.g., a base station forming part or all of an eNB) for use in wireless communication, in accordance with various aspects of the present disclosure.

FIG. 23 shows a block diagram 2300 of a base station 2305 (e.g., a base station forming part or all of an eNB) for use in wireless communication, in accordance with various aspects of the present disclosure. In some examples, the base station 2305 may be an example of aspects of one or more of the base stations 105, 205, and/or 205-*a* described with reference to FIGS. 1 and/or 2, and/or aspects of one or more of the apparatuses 905, 1005, 1105, 1205, 1305, 1405, 1505, 1605, 1705, 1805, 1905, 2005, 2105, and/or 2205 when configured as a base station, as described with reference to FIGS. 9, 10, 11, 12, 13, 14, 15, 16, 17, 18, 19, 20, 21, and/or 22. The base station 2305 may be configured to implement or facilitate at least some of the base station and/or apparatus features and functions described with reference to FIGS. 1-22.

The base station 2305 may include a base station processor module 2310, a base station memory module 2320, at least one base station transceiver module (represented by base station transceiver module(s) 2350), at least one base station antenna (represented by base station antenna(s) 2355), and/or a base station bandwidth scaling module 2330. The base station 2305 may also include a network communications module 2340. Each of these components may be in communication with each other, directly or indirectly, over one or more buses 2335.

The base station memory module 2320 may include random access memory (RAM) and/or read-only memory (ROM). The base station memory module 2320 may store computer-readable, computer-executable code 2325 containing instructions that are configured to, when executed, cause the base station processor module 2310 to perform various functions described herein related to wireless communication (e.g., functions relating to scaling the bandwidth of a carrier by including multiple sub-channels in the carrier, etc.). Alternatively, the computer-executable code 2325 may not be directly executable by the base station processor module 2310 but be configured to cause the base station 2305 (e.g., when compiled and executed) to perform various functions described herein.

The base station processor module 2310 may include an intelligent hardware device, e.g., a central processing unit (CPU), a microcontroller, an ASIC, etc. The base station processor module 2310 may process information received through the base station transceiver module(s) 2350 and/or the network communications module 2340. The base station processor module 2310 may also process information to be sent to the transceiver module(s) 2350 for transmission through the antenna(s) 2355, and/or to the network communications module 2340 for transmission to a core network 2345, which may be an example of one or more aspects of the core network 130 described with reference to FIG. 1. The base station processor module 2310 may handle, alone or in connection with the base station bandwidth scaling module 2330 and the base station transceiver module(s) 2350, various aspects of communicating over (or managing communications over) a wireless communication medium including a licensed radio frequency spectrum band (e.g., a radio frequency spectrum band for which apparatuses do not contend for access because the radio frequency spectrum band is licensed to users for uses, such as a licensed radio frequency spectrum band usable for LTE/LTE-A communications) and/or an unlicensed radio frequency spectrum band (e.g., a radio frequency spectrum band for which apparatuses may need to contend for access because the radio frequency spectrum band is available, at least in part, for unlicensed use, such as Wi-Fi use and/or LTE/LTE-A use in an unlicensed radio frequency spectrum band).

The base station transceiver module(s) 2350 may include a modem configured to modulate packets and provide the modulated packets to the base station antenna(s) 2355 for transmission, and to demodulate packets received from the base station antenna(s) 2355. The base station transceiver module(s) 2350 may, in some examples, be implemented as one or more base station transmitter modules and one or more separate base station receiver modules. The base station transceiver module(s) 2350 may support communications in the licensed radio frequency spectrum band and/or the unlicensed radio frequency spectrum band. The base station transceiver module(s) 2350 may be configured to communicate bi-directionally, via the antenna(s) 2355, with one or more UEs or apparatuses, such as one or more of the UEs 115, 215, 215-*a*, 215-*b*, and/or 215-*c* described with reference to FIGS. 1 and/or 2. The base station 2305 may, for example, include multiple base station antennas 2355 (e.g., an antenna array). The base station 2305 may communicate with the core network 2345 through the network communications module 2340. The base station 2305 may also communicate with other base stations using network communications module 2340 and/or the base station antennas 2355.

The base station bandwidth scaling module 2330 may be configured to perform and/or control some or all of the features and/or functions described with reference to FIGS. 1-22 related to wireless communication (e.g., functions relating to scaling the bandwidth of a carrier by including multiple sub-channels in the carrier, etc.). In some examples, the base station bandwidth scaling module 2330 may be configured to support scalable bandwidth, as well as a supplemental downlink mode, a carrier aggregation mode, and/or a standalone mode using the licensed radio frequency spectrum band and/or the unlicensed radio frequency spectrum band. The base station transceiver module(s) 2350 and/or the base station bandwidth scaling module 2330 may include a base station licensed RF spectrum band module 2365 configured to handle LTE/LTE-A communications in the licensed radio frequency spectrum band, and a base station unlicensed RF spectrum band module 2370 configured to handle LTE/LTE-A communications in the unlicensed radio frequency spectrum band. The base station bandwidth scaling module 2330, or portions of it, may include a processor, and/or some or all of the functions of the base station bandwidth scaling module 2330 may be performed by the base station processor module 2310 and/or in connection with the base station processor module 2310. In some examples, the base station bandwidth scaling module 2330 may be an example of the bandwidth scaling module 930, 1030, 1130, 1230, 1330, 1430, 1530, 1630, 1730, 1830, 1930, 2030, 2130, and/or 2230 described with reference to FIGS. 9, 10, 11, 12, 13, 14, 15, 16, 17, 18, 19, 20, 21, and/or 22.

Figure 24:
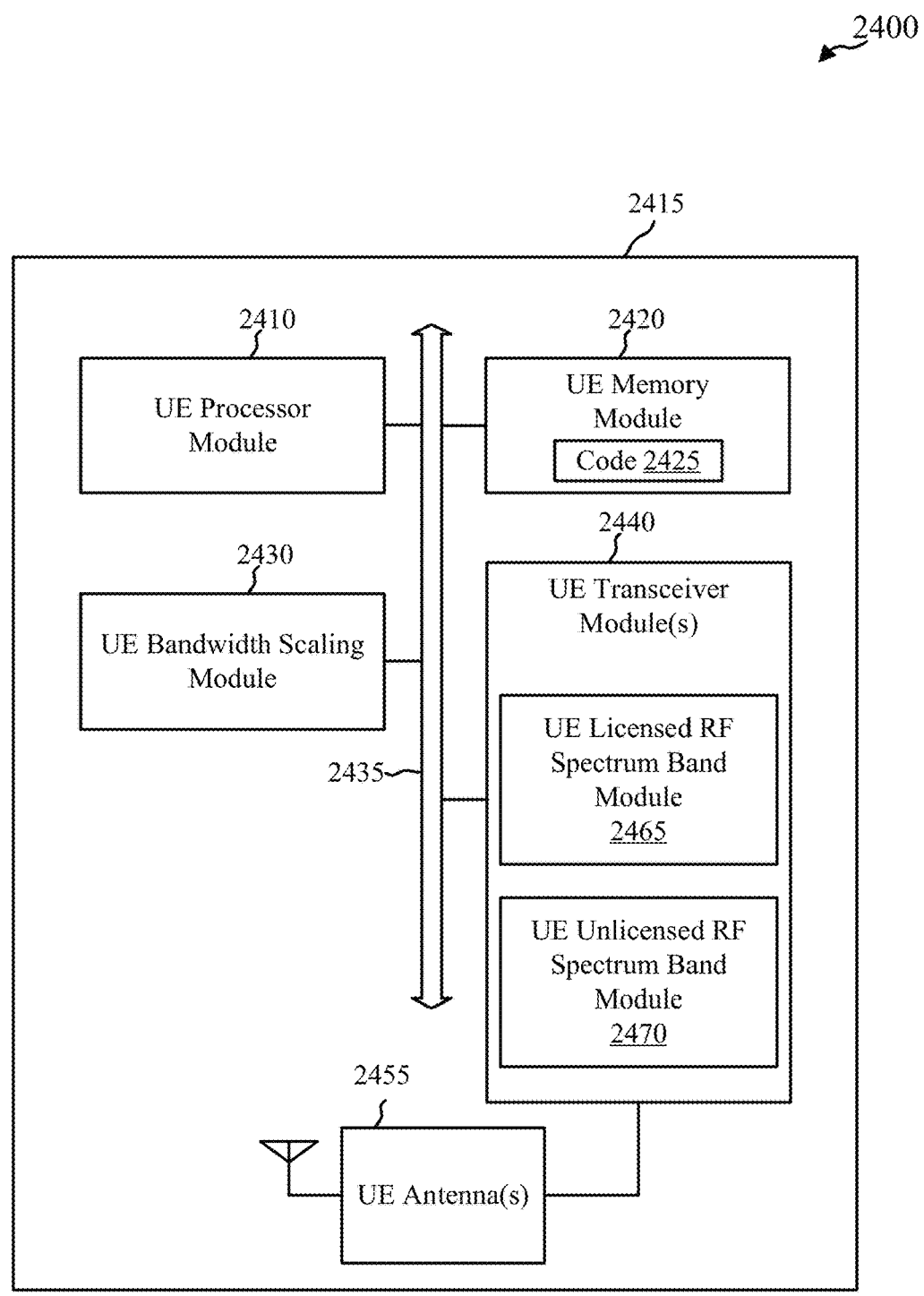
FIG. 24 shows a block diagram of a UE for use in wireless communication, in accordance with various aspects of the present disclosure.

FIG. 24 shows a block diagram 2400 of a UE 2415 for use in wireless communication, in accordance with various aspects of the present disclosure. The UE 2415 may have various configurations and may be included or be part of a personal computer (e.g., a laptop computer, a netbook computer, a tablet computer, etc.), a cellular telephone, a PDA, a digital video recorder (DVR), an internet appliance, a gaming console, an e-reader, etc. The UE 2415 may, in some examples, have an internal power supply (not shown), such as a small battery, to facilitate mobile operation. In some examples, the UE 2415 may be an example of one or more aspects of the UE 115, 215, 215-a, 215-b, and/or 215-c described with reference to FIGS. 1 and/or 2, and/or one or more aspects of the apparatus 905, 1005, 1105, 1205, 1305, 1405, 1505, 1605, 1705, 1805, 1905, 2005, 2105, and/or 2205 described with reference to FIGS. 9, 10, 11, 12, 13, 14, 15, 16, 17, 18, 19, 20, 21, and/or 22. The UE 2415 may be configured to implement at least some of the UE and/or apparatus features and functions described with reference to FIGS. 1-22.

The UE 2415 may include a UE processor module 2410, a UE memory module 2420, at least one UE transceiver module (represented by UE transceiver module(s) 2440), at least one UE antenna (represented by UE antenna(s) 2455), and/or a UE bandwidth scaling module 2430. Each of these components may be in communication with each other, directly or indirectly, over one or more buses 2435.

The UE memory module 2420 may include RAM and/or ROM. The UE memory module 2420 may store computer-readable, computer-executable code 2425 containing instructions that are configured to, when executed, cause the UE processor module 2410 to perform various functions described herein related to wireless communication. Alternatively, the computer-executable code 2425 may not be directly executable by the UE processor module 2410 but be configured to cause the UE 2415 (e.g., when compiled and executed) to perform various functions described herein.

The UE processor module 2410 may include an intelligent hardware device, e.g., a CPU, a microcontroller, an ASIC, etc. The UE processor module 2410 may process information received through the UE transceiver module(s) 2440 and/or information to be sent to the UE transceiver module(s) 2440 for transmission through the UE antenna(s) 2455. The UE processor module 2410 may handle, alone or in connection with the UE bandwidth scaling module 2430 and the UE transceiver module(s) 2440, various aspects of communicating over (or managing communications over) a licensed radio frequency spectrum band (e.g., a radio frequency spectrum band for which apparatuses do not contend for access because the radio frequency spectrum band is licensed to users for uses, such as a licensed radio frequency spectrum band usable for LTE/LTE-A communications) and/or an unlicensed radio frequency spectrum band (e.g., a shared radio frequency spectrum band such as an unlicensed radio frequency spectrum band for which apparatuses may need to contend for access because the radio frequency spectrum band is available for unlicensed use, such as Wi-Fi use, or a licensed radio frequency spectrum band for which apparatuses may need to contend for access because the radio frequency spectrum band is available for use by two or more operators on a contention basis).

The UE transceiver module(s) 2440 may include a modem configured to modulate packets and provide the modulated packets to the UE antenna(s) 2455 for transmission, and to demodulate packets received from the UE antenna(s) 2455. The UE transceiver module(s) 2440 may, in some examples, be implemented as one or more UE transmitter modules and one or more separate UE receiver modules. The UE transceiver module(s) 2440 may support communications in the licensed radio frequency spectrum band and/or the unlicensed radio frequency spectrum band. The UE transceiver module(s) 2440 may be configured to communicate bi-directionally, via the UE antenna(s) 2455, with one or more of the base stations 105, 205, and/or 205-a described with reference to FIGS. 1 and/or 2, and/or one or more of the apparatus 905, 1005, 1105, 1205, 1305, 1405, 1505, 1605, 1705, 1805, 1905, 2005, 2105, and/or 2205 described with reference to FIGS. 9, 10, 11, 12, 13, 14, 15, 16, 17, 18, 19, 20, 21, and/or 22. While the UE 2415 may include a single UE antenna, there may be examples in which the UE 2415 may include multiple UE antennas 2455.

The UE bandwidth scaling module 2430 may be configured to perform and/or control some or all of the features and/or functions described with reference to FIG. 1-22 related to wireless communication (e.g., functions relating to scaling the bandwidth of a carrier by including multiple sub-channels in the carrier, etc.). For example, the UE bandwidth scaling module 2430 may be configured to support scalable bandwidth, as well as a supplemental downlink mode, carrier aggregation mode, and/or standalone mode using the licensed radio frequency spectrum band and/or the unlicensed radio frequency spectrum band. The UE transceiver module(s) 2440 and/or the UE bandwidth scaling module 2430 may include a UE licensed RF spectrum band module 2465 configured to handle LTE/LTE-A communications in the licensed radio frequency spectrum band, and a UE unlicensed RF spectrum band module 2470 configured to handle LTE/LTE-A communications in the unlicensed radio frequency spectrum band. The UE bandwidth scaling module 2430, or portions of it, may include a processor, and/or some or all of the functions of the UE bandwidth scaling module 2430 may be performed by the UE processor module 2410 and/or in connection with the UE processor module 2410. In some examples, the UE bandwidth scaling module 2430 may be an example of the bandwidth scaling module 930, 1030, 1130, 1230, 1330, 1430, 1530, 1630, 1730, 1830, 1930, 2030, 2130, and/or 2230 described with reference to FIGS. 9, 10, 11, 12, 13, 14, 15, 16, 17, 18, 19, 20, 21, and/or 22.

Figure 25:
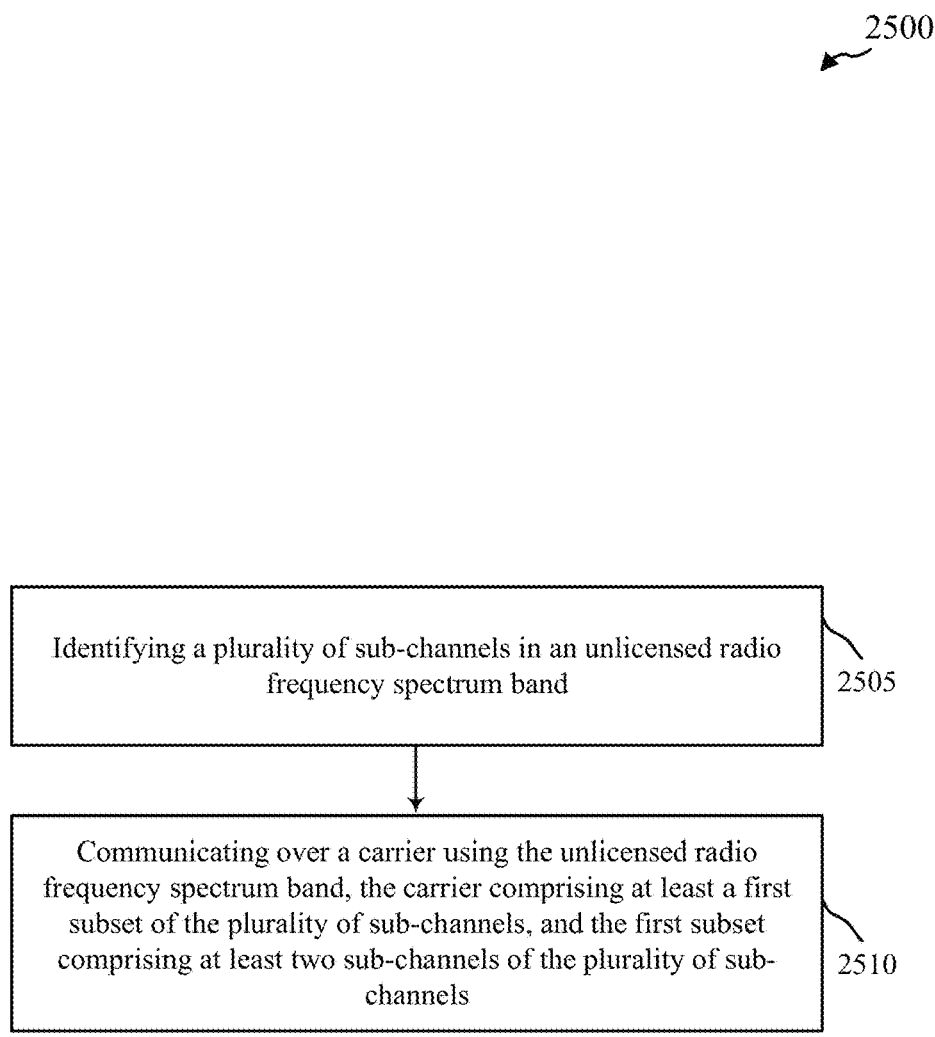
FIG. 25 is a flow chart illustrating an example of a method for wireless communication, in accordance with various aspects of the present disclosure.

FIG. 25 is a flow chart illustrating an example of a method 2500 for wireless communication, in accordance with various aspects of the present disclosure. For clarity, the method 2500 is described below with reference to aspects of one or more of the base station 105, base station 205, base station 205-a, UE 115, UE 215, UE 215-a, UE 215-b, and/or UE 215-c described with reference to FIGS. 1 and/or 2, and/or aspects of one or more of the apparatuses 905, 1005, 1105, 1205, 1305, 1405, 1505, 1605, 1705, 1805, 1905, 2005, 2105, and/or 2205 described with reference to FIGS. 9, 10, 11, 12, 13, 14, 15, 16, 17, 18, 19, 20, 21, and/or 22. In some examples, a base station, UE, and/or apparatus may execute one or more sets of codes to control the functional elements of the base station, UE, and/or apparatus to perform the functions described below.

At block 2505, the method 2500 may include identifying a plurality of sub-channels in an unlicensed radio frequency spectrum band. At block 2510, the method 2500 may include communicating over a carrier using the unlicensed radio frequency spectrum band, the carrier comprising at least a first subset of the plurality of sub-channels, and the first subset comprising at least two sub-channels of the plurality of sub-channels. It should be noted that the method 2500 is just one implementation and that the operations of the method 2500 may be rearranged or otherwise modified such that other implementations are possible.

Figure 26:
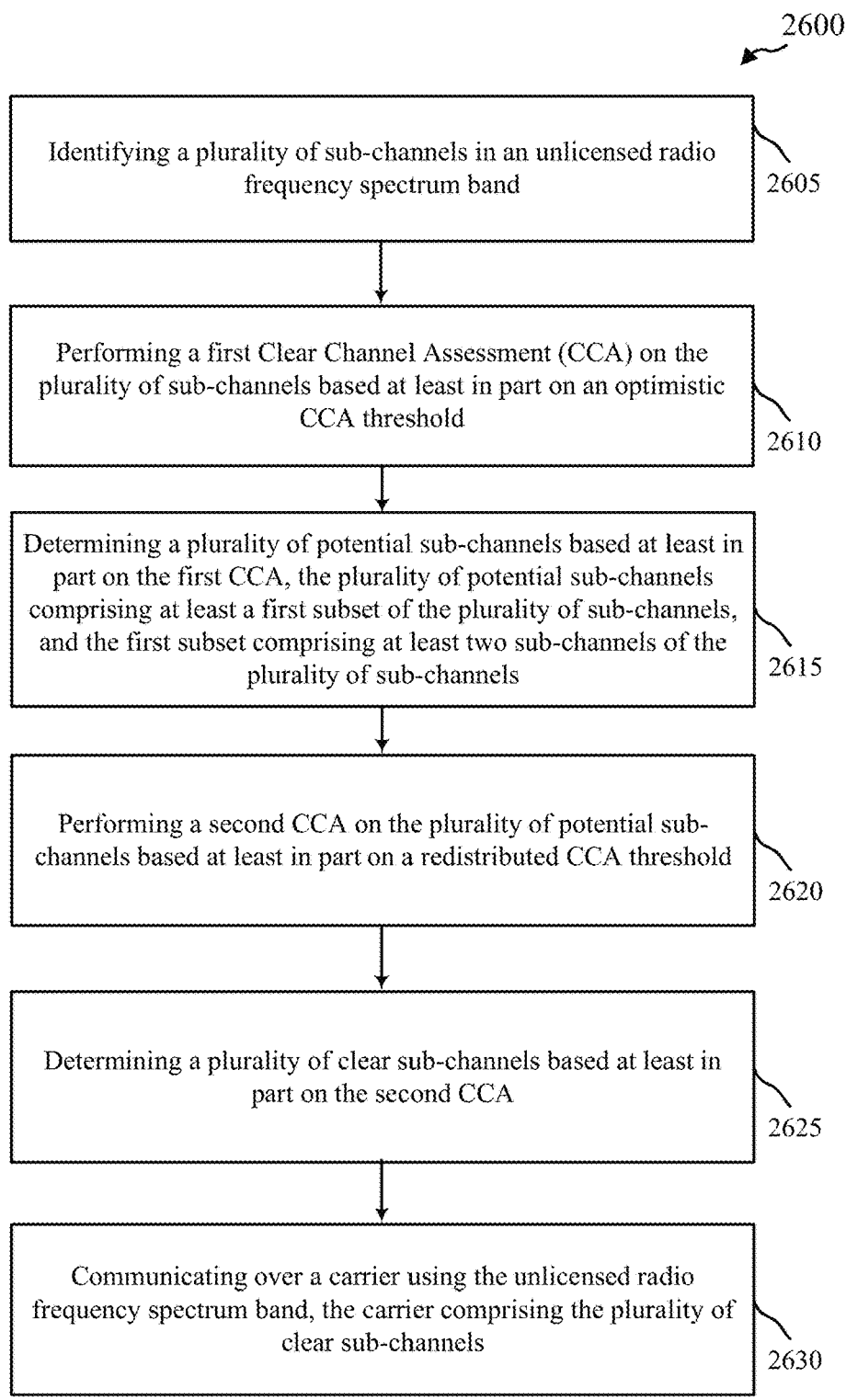
FIG. 26 is a flow chart illustrating an example of a method for wireless communication, in accordance with various aspects of the present disclosure.

FIG. 26 is a flow chart illustrating an example of a method 2600 for wireless communication, in accordance with various aspects of the present disclosure. For clarity, the method 2600 is described below with reference to aspects of one or more of the base station 105, base station 205, base station 205-a, UE 115, UE 215, UE 215-a, UE 215-b, and/or UE 215-c described with reference to FIGS. 1 and/or 2, and/or aspects of one or more of the apparatuses 905, 1005, 1105, 1205, 1305, 1405, 1505, 1605, 1705, 1805, 1905, 2005, 2105, and/or 2205 described with reference to FIGS. 9, 10, 11, 12, 13, 14, 15, 16, 17, 18, 19, 20, 21, and/or 22. In some examples, a base station, UE, and/or apparatus may execute one or more sets of codes to control the functional elements of the base station, UE, and/or apparatus to perform the functions described below.

At block 2605, the method 2600 may include identifying a plurality of sub-channels in an unlicensed radio frequency spectrum band. At block 2610, the method 2600 may include performing a first Clear Channel Assessment (CCA) on the plurality of sub-channels based at least in part on an optimistic CCA threshold. At block 2615, the method 2600 may include determining a plurality of potential sub-channels based at least in part on the first CCA, the plurality of potential sub-channels comprising at least a first subset of the plurality of sub-channels, and the first subset comprising at least two sub-channels of the plurality of sub-channels. At block 2620, the method 2600 may include performing a second CCA on the plurality of potential sub-channels based at least in part on a redistributed CCA threshold. At block 2625, the method 2600 may include determining a plurality of clear sub-channels based at least in part on the second CCA. At block 2630, the method 2600 may include communicating over a carrier using the unlicensed radio frequency spectrum band, the carrier comprising the plurality of clear sub-channels. It should be noted that the method 2600 is just one implementation and that the operations of the method 2600 may be rearranged or otherwise modified such that other implementations are possible.

Figure 27:
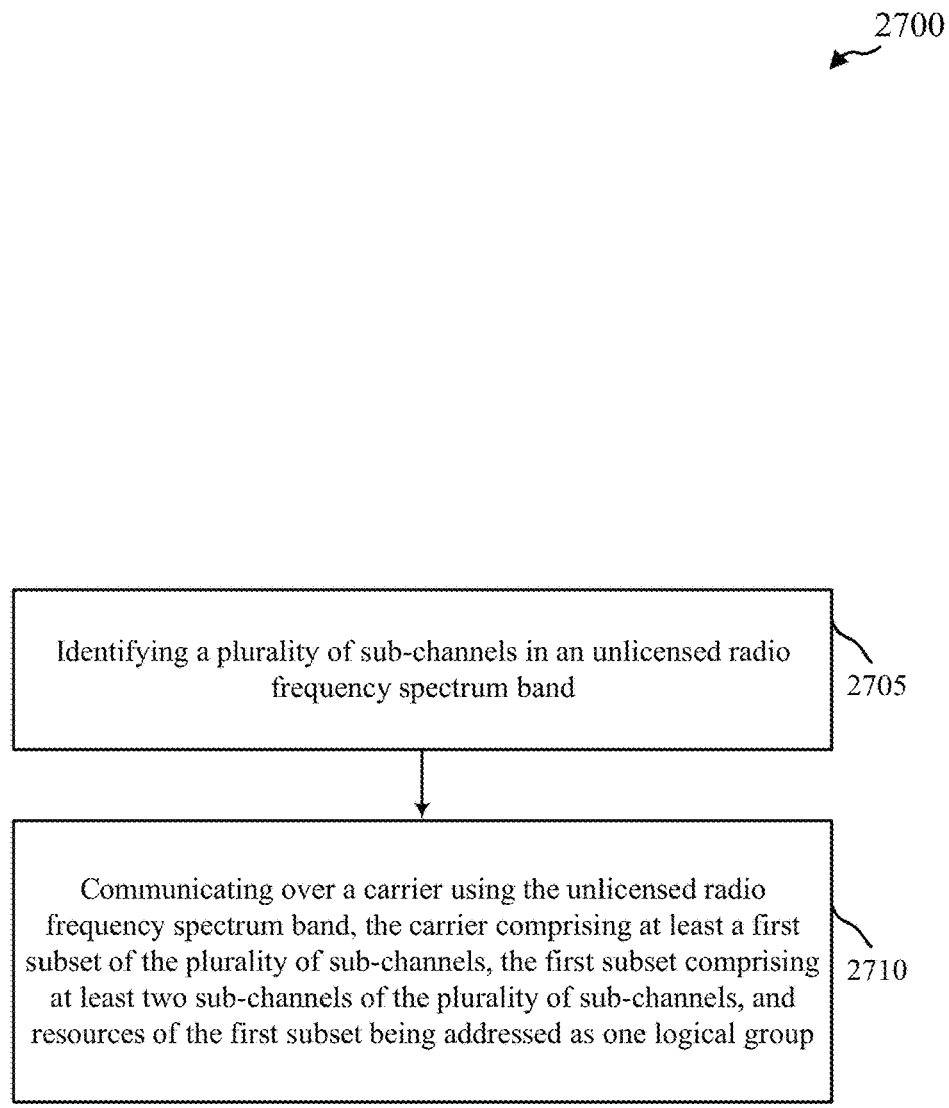
FIG. 27 is a flow chart illustrating an example of a method for wireless communication, in accordance with various aspects of the present disclosure.

FIG. 27 is a flow chart illustrating an example of a method 2700 for wireless communication, in accordance with various aspects of the present disclosure. For clarity, the method 2700 is described below with reference to aspects of one or more of the base station 105, base station 205, base station 205-a, UE 115, UE 215, UE 215-a, UE 215-b, and/or UE 215-c described with reference to FIGS. 1 and/or 2, and/or aspects of one or more of the apparatuses 905, 1005, 1105, 1205, 1305, 1405, 1505, 1605, 1705, 1805, 1905, 2005, 2105, and/or 2205 described with reference to FIGS. 9, 10, 11, 12, 13, 14, 15, 16, 17, 18, 19, 20, 21, and/or 22. In some examples, a base station, UE, and/or apparatus may execute one or more sets of codes to control the functional elements of the base station, UE, and/or apparatus to perform the functions described below.

At block 2705, the method 2700 may include identifying a plurality of sub-channels in an unlicensed radio frequency spectrum band. At block 2710, the method 2700 may include communicating over a carrier using the unlicensed radio frequency spectrum band, the carrier comprising at least a first subset of the plurality of sub-channels, the first subset comprising at least two sub-channels of the plurality of sub-channels, and resources of the first subset being addressed as one logical group. It should be noted that the method 2700 is just one implementation and that the operations of the method 2700 may be rearranged or otherwise modified such that other implementations are possible.

Figure 28:
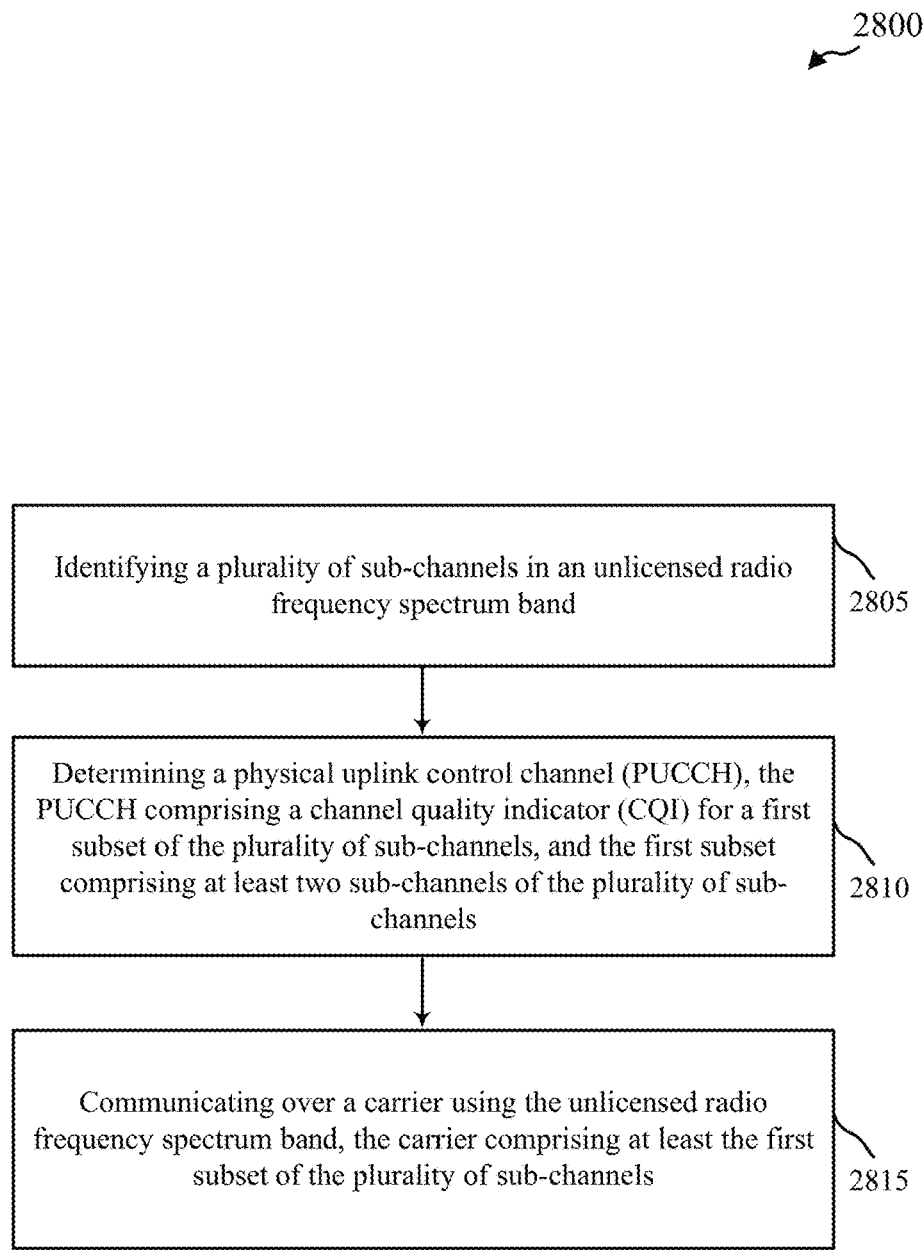
FIG. 28 is a flow chart illustrating an example of a method for wireless communication, in accordance with various aspects of the present disclosure.

FIG. 28 is a flow chart illustrating an example of a method 2800 for wireless communication, in accordance with various aspects of the present disclosure. For clarity, the method 2800 is described below with reference to aspects of one or more of the base station 105, base station 205, base station 205-a, UE 115, UE 215, UE 215-a, UE 215-b, and/or UE 215-c described with reference to FIGS. 1 and/or 2, and/or aspects of one or more of the apparatuses 905, 1005, 1105, 1205, 1305, 1405, 1505, 1605, 1705, 1805, 1905, 2005, 2105, and/or 2205 described with reference to FIGS. 9, 10, 11, 12, 13, 14, 15, 16, 17, 18, 19, 20, 21, and/or 22. In some examples, a base station, UE, and/or apparatus may execute one or more sets of codes to control the functional elements of the base station, UE, and/or apparatus to perform the functions described below.

At block 2805, the method 2800 may include identifying a plurality of sub-channels in an unlicensed radio frequency spectrum band. At block 2810, the method 2800 may include determining a physical uplink control channel (PUCCH), the PUCCH comprising a channel quality indicator (CQI) for a first subset of the plurality of sub-channels, and the first subset comprising at least two sub-channels of the plurality of sub-channels. At block 2815, the method 2800 may include communicating over a carrier using the unlicensed radio frequency spectrum band, the carrier comprising at least the first subset of the plurality of sub-channels. It should be noted that the method 2800 is just one implementation and that the operations of the method 2800 may be rearranged or otherwise modified such that other implementations are possible.

Figure 29:
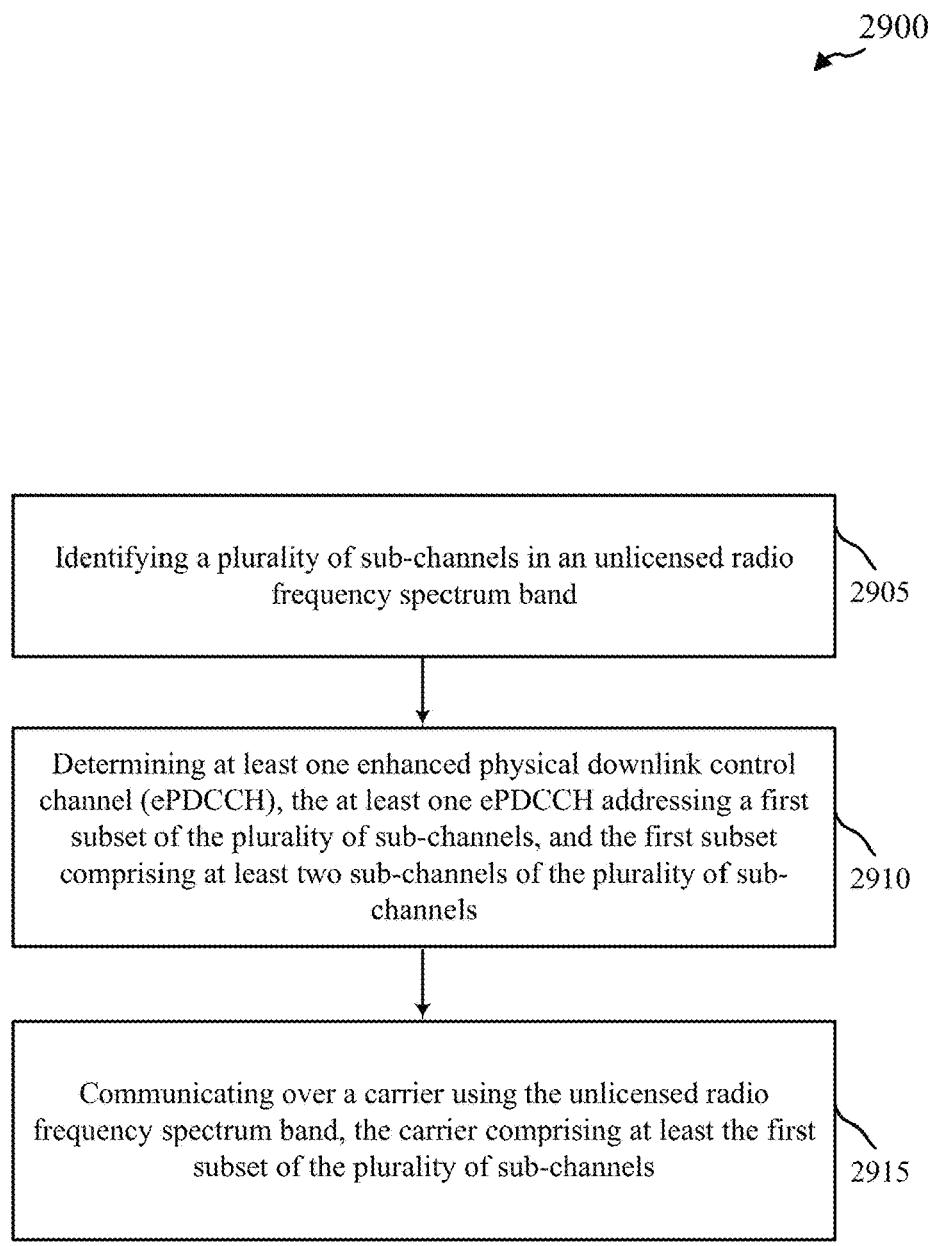
FIG. 29 is a flow chart illustrating an example of a method for wireless communication, in accordance with various aspects of the present disclosure.

FIG. 29 is a flow chart illustrating an example of a method 2900 for wireless communication, in accordance with various aspects of the present disclosure. For clarity, the method 2900 is described below with reference to aspects of one or more of the base station 105, base station 205, base station 205-a, UE 115, UE 215, UE 215-a, UE 215-b, and/or UE 215-c described with reference to FIGS. 1 and/or 2, and/or aspects of one or more of the apparatuses 905, 1005, 1105, 1205, 1305, 1405, 1505, 1605, 1705, 1805, 1905, 2005, 2105, and/or 2205 described with reference to FIGS. 9, 10, 11, 12, 13, 14, 15, 16, 17, 18, 19, 20, 21, and/or 22. In some examples, a base station, UE, and/or apparatus may execute one or more sets of codes to control the functional elements of the base station, UE, and/or apparatus to perform the functions described below.

At block 2905, the method 2900 may include identifying a plurality of sub-channels in an unlicensed radio frequency spectrum band. At block 2910, the method 2900 may include determining at least one enhanced physical downlink control channel (ePDCCH), the at least one ePDCCH addressing a first subset of the plurality of sub-channels, and the first subset comprising at least two sub-channels of the plurality of sub-channels. At block 2915, the method 2900 may include communicating over a carrier using the unlicensed radio frequency spectrum band, the carrier comprising at least the first subset of the plurality of sub-channels. It should be noted that the method 2900 is just one implementation and that the operations of the method 2900 may be rearranged or otherwise modified such that other implementations are possible.

Figure 30:
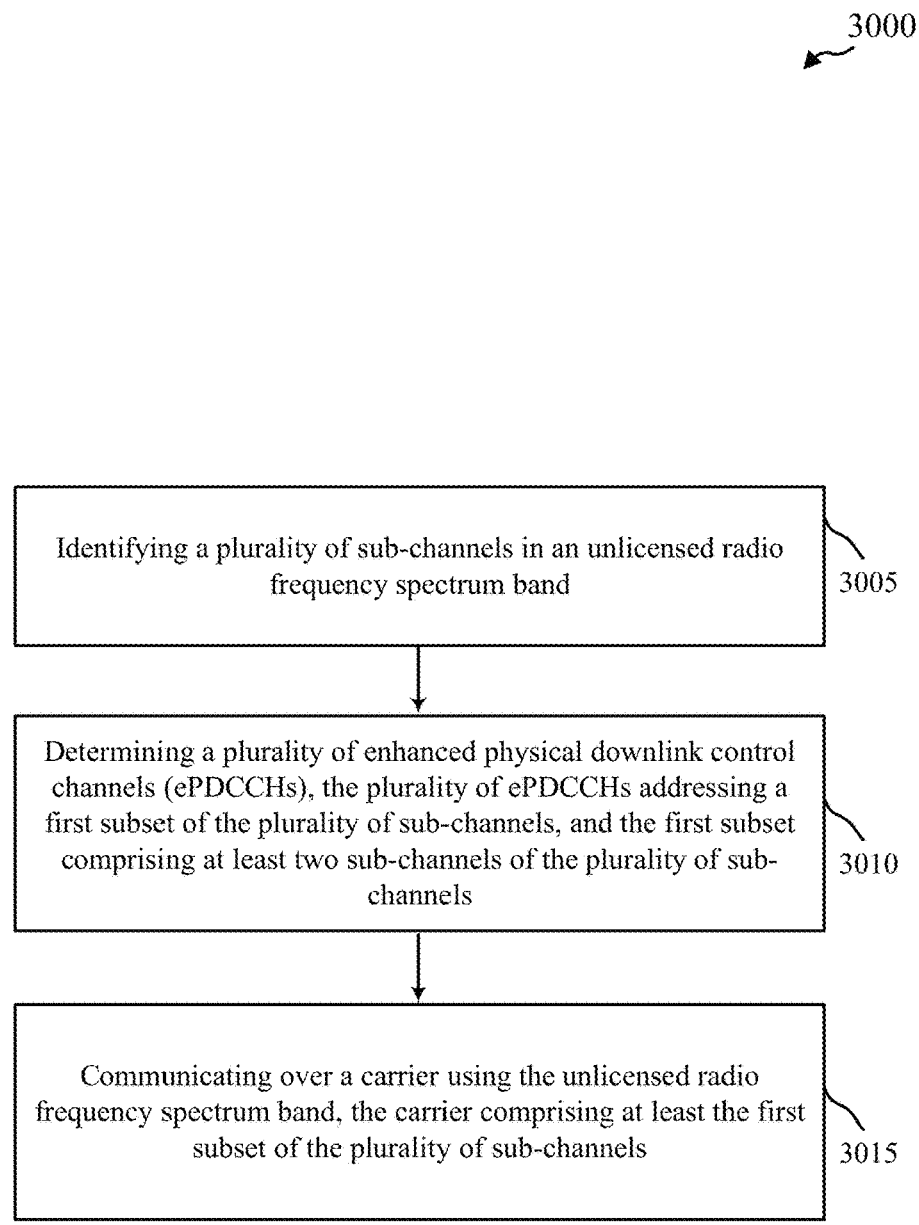
FIG. 30 is a flow chart illustrating an example of a method for wireless communication, in accordance with various aspects of the present disclosure.

FIG. 30 is a flow chart illustrating an example of a method 3000 for wireless communication, in accordance with various aspects of the present disclosure. For clarity, the method 3000 is described below with reference to aspects of one or more of the base station 105, base station 205, base station 205-a, UE 115, UE 215, UE 215-a, UE 215-b, and/or UE 215-c described with reference to FIGS. 1 and/or 2, and/or aspects of one or more of the apparatuses 905, 1005, 1105, 1205, 1305, 1405, 1505, 1605, 1705, 1805, 1905, 2005, 2105, and/or 2205 described with reference to FIGS. 9, 10, 11, 12, 13, 14, 15, 16, 17, 18, 19, 20, 21, and/or 22. In some examples, a base station, UE, and/or apparatus may execute one or more sets of codes to control the functional elements of the base station, UE, and/or apparatus to perform the functions described below.

At block 3005, the method 3000 may include identifying a plurality of sub-channels in an unlicensed radio frequency spectrum band. At block 3010, the method 3000 may include determining a plurality of enhanced physical downlink control channels (ePDCCHs), the plurality of ePDCCHs addressing a first subset of the plurality of sub-channels, and the first subset comprising at least two sub-channels of the plurality of sub-channels. At block 3015, the method 3000 may include communicating over a carrier using the unlicensed radio frequency spectrum band, the carrier comprising at least the first subset of the plurality of sub-channels. It should be noted that the method 3000 is just one implementation and that the operations of the method 3000 may be rearranged or otherwise modified such that other implementations are possible.

Figure 31:
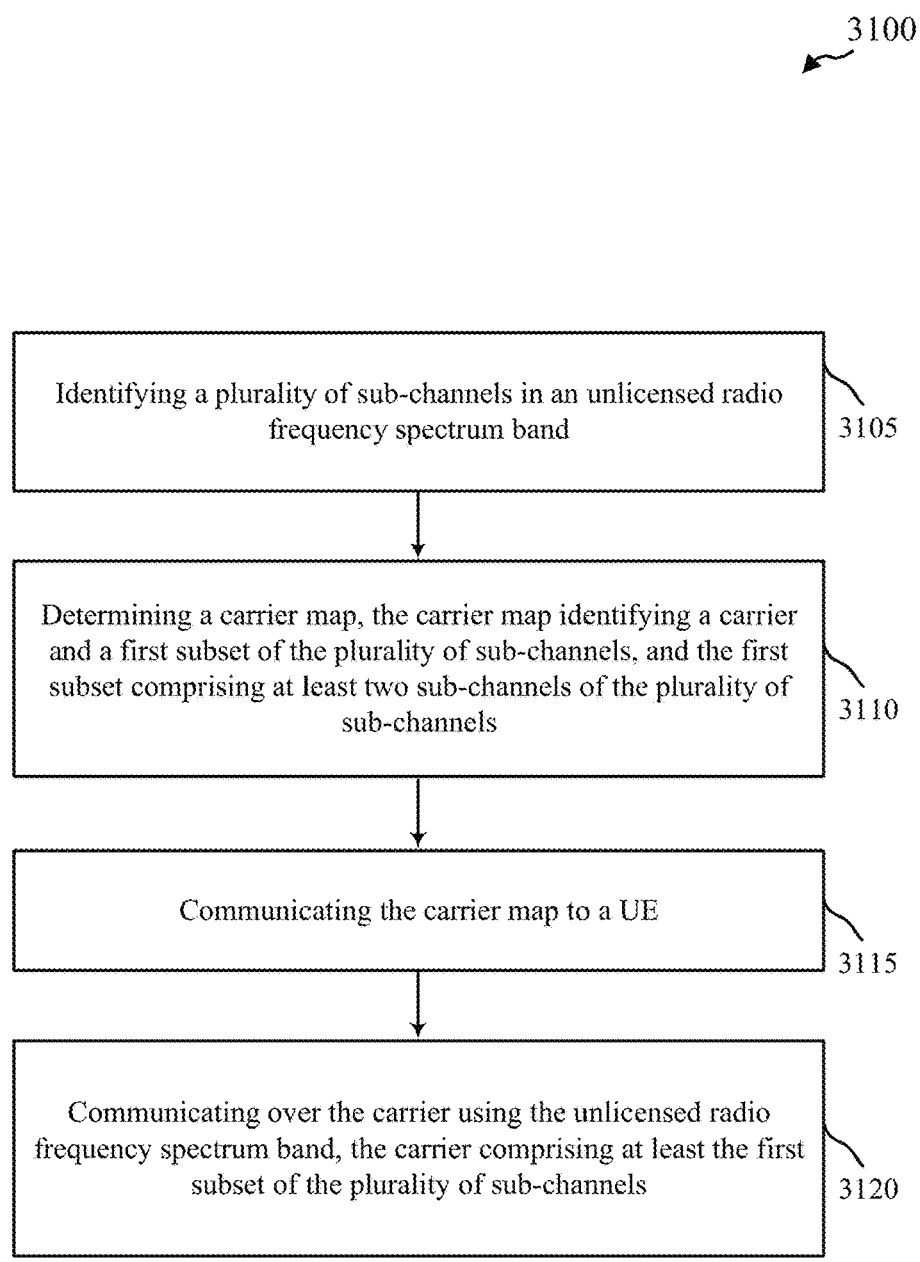
FIG. 31 is a flow chart illustrating an example of a method for wireless communication, in accordance with various aspects of the present disclosure.

FIG. 31 is a flow chart illustrating an example of a method 3100 for wireless communication, in accordance with various aspects of the present disclosure. For clarity, the method 3100 is described below with reference to aspects of one or more of the base station 105, base station 205, base station 205-a, UE 115, UE 215, UE 215-a, UE 215-b, and/or UE 215-c described with reference to FIGS. 1 and/or 2, and/or aspects of one or more of the apparatuses 905, 1005, 1105, 1205, 1305, 1405, 1505, 1605, 1705, 1805, 1905, 2005, 2105, and/or 2205 described with reference to FIGS. 9, 10, 11, 12, 13, 14, 15, 16, 17, 18, 19, 20, 21, and/or 22. In some examples, a base station, UE, and/or apparatus may execute one or more sets of codes to control the functional elements of the base station, UE, and/or apparatus to perform the functions described below.

At block 3105, the method 3100 may include identifying a plurality of sub-channels in an unlicensed radio frequency spectrum band. At block 3110, the method 3100 may include determining a carrier map, the carrier map identifying a carrier and a first subset of the plurality of sub-channels, and the first subset comprising at least two sub-channels of the plurality of sub-channels. At block 3115, the method 3100 may include communicating the carrier map to a UE. At block 3120, the method 3100 may include communicating over the carrier using the unlicensed radio frequency spectrum band, the carrier comprising at least the first subset of the plurality of sub-channels. It should be noted that the method 3100 is just one implementation and that the operations of the method 3100 may be rearranged or otherwise modified such that other implementations are possible.

Figure 32:
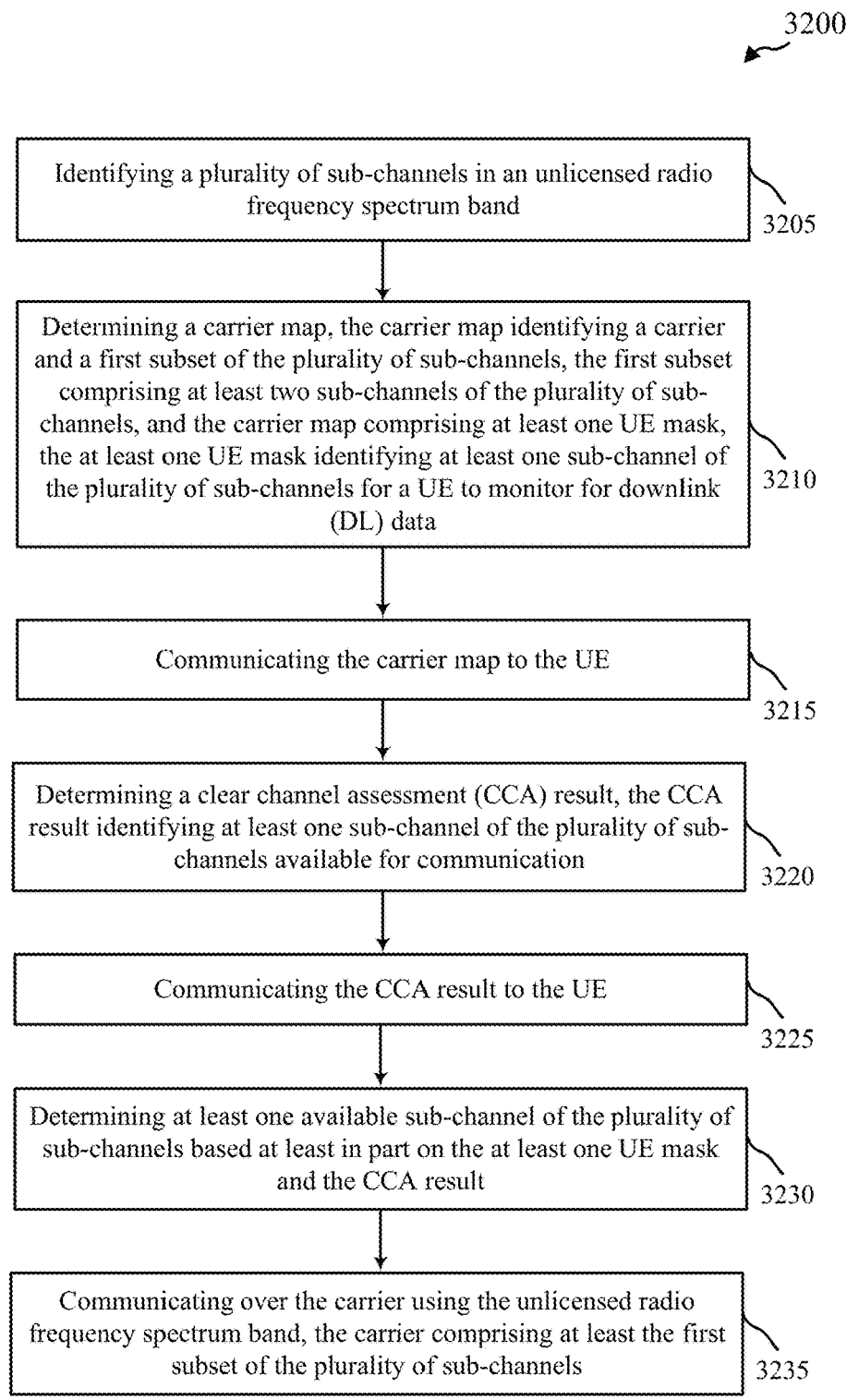
FIG. 32 is a flow chart illustrating an example of a method for wireless communication, in accordance with various aspects of the present disclosure.

FIG. 32 is a flow chart illustrating an example of a method 3200 for wireless communication, in accordance with various aspects of the present disclosure. For clarity, the method 3200 is described below with reference to aspects of one or more of the base station 105, base station 205, base station 205-a, UE 115, UE 215, UE 215-a, UE 215-b, and/or UE 215-c described with reference to FIGS. 1 and/or 2, and/or aspects of one or more of the apparatuses 905, 1005, 1105, 1205, 1305, 1405, 1505, 1605, 1705, 1805, 1905, 2005, 2105, and/or 2205 described with reference to FIGS. 9, 10, 11, 12, 13, 14, 15, 16, 17, 18, 19, 20, 21, and/or 22. In some examples, a base station, UE, and/or apparatus may execute one or more sets of codes to control the functional elements of the base station, UE, and/or apparatus to perform the functions described below.

At block 3205, the method 3200 may include identifying a plurality of sub-channels in an unlicensed radio frequency spectrum band. At block 3210, the method 3200 may include determining a carrier map, the carrier map identifying a carrier and a first subset of the plurality of sub-channels, the first subset comprising at least two sub-channels of the plurality of sub-channels, and the carrier map comprising at least one UE mask, the at least one UE mask identifying at least one sub-channel of the plurality of sub-channels for a UE to monitor for downlink (DL) data. At block 3215, the method 3200 may include communicating the carrier map to a UE. At block 3220, the method 3200 may include determining a clear channel assessment (CCA) result, the CCA result identifying at least one sub-channel of the plurality of sub-channels available for communication. At block 3225, the method 3200 may include communicating the CCA result to the UE. At block 3230, the method 3200 may include determining at least one available sub-channel of the plurality of sub-channels based at least in part on the at least one UE mask and the CCA result. At block 3235, the method 3200 may include communicating over the carrier using the unlicensed radio frequency spectrum band, the carrier comprising at least the first subset of the plurality of sub-channels. It should be noted that the method 3200 is just one implementation and that the operations of the method 3200 may be rearranged or otherwise modified such that other implementations are possible.

Figure 33:
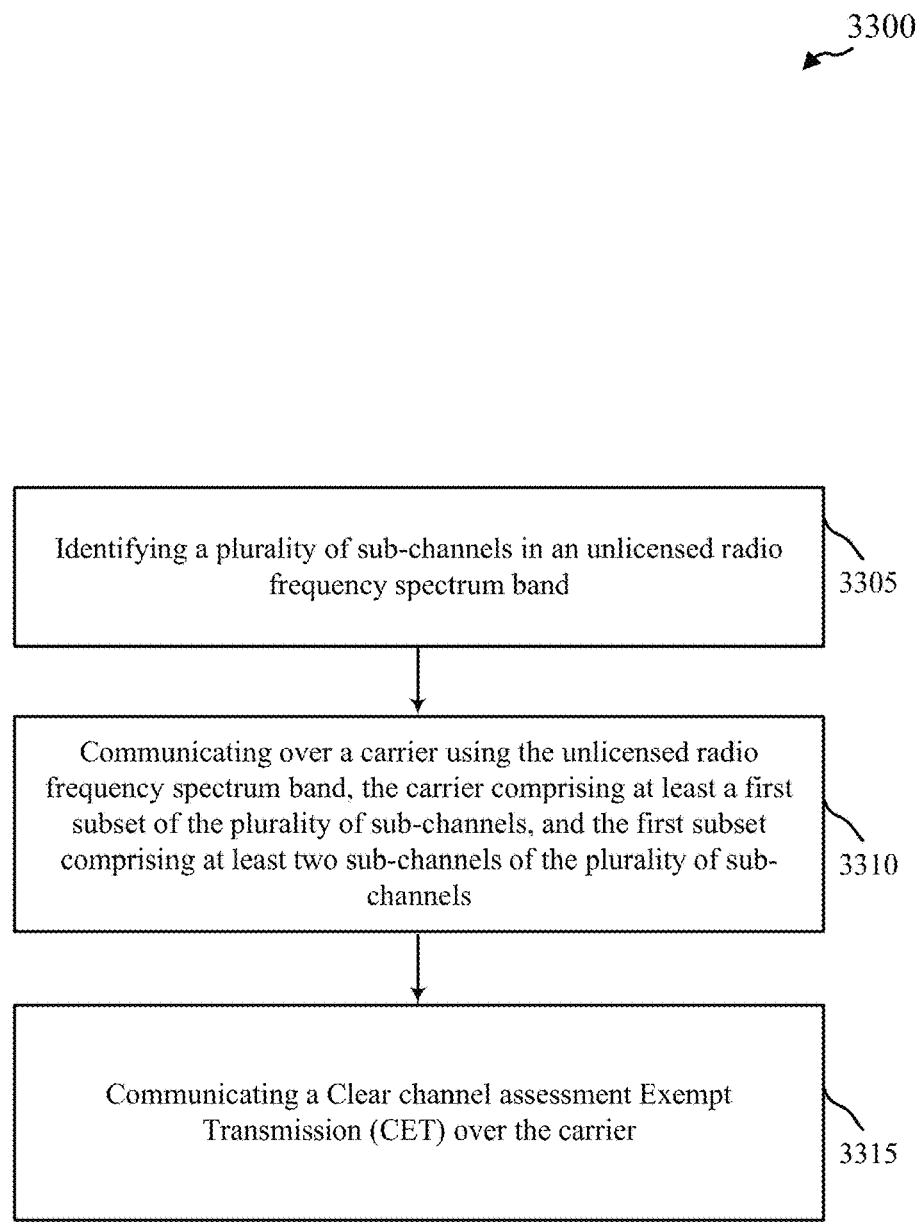
FIG. 33 is a flow chart illustrating an example of a method for wireless communication, in accordance with various aspects of the present disclosure.

FIG. 33 is a flow chart illustrating an example of a method 3300 for wireless communication, in accordance with various aspects of the present disclosure. For clarity, the method 3300 is described below with reference to aspects of one or more of the base station 105, base station 205, base station 205-a, UE 115, UE 215, UE 215-a, UE 215-b, and/or UE 215-c described with reference to FIGS. 1 and/or 2, and/or aspects of one or more of the apparatuses 905, 1005, 1105, 1205, 1305, 1405, 1505, 1605, 1705, 1805, 1905, 2005, 2105, and/or 2205 described with reference to FIGS. 9, 10, 11, 12, 13, 14, 15, 16, 17, 18, 19, 20, 21, and/or 22. In some examples, a base station, UE, and/or apparatus may execute one or more sets of codes to control the functional elements of the base station, UE, and/or apparatus to perform the functions described below.

At block 3305, the method 3300 may include identifying a plurality of sub-channels in an unlicensed radio frequency spectrum band. At block 3310, the method 3300 may include communicating over a carrier using the unlicensed radio frequency spectrum band, the carrier comprising at least a first subset of the plurality of sub-channels, and the first subset comprising at least two sub-channels of the plurality of sub-channels. At block 3315, the method 3300 may include communicating a Clear channel assessment Exempt Transmission (CET) over the carrier. It should be noted that the method 3300 is just one implementation and that the operations of the method 3300 may be rearranged or otherwise modified such that other implementations are possible.

Figure 34:
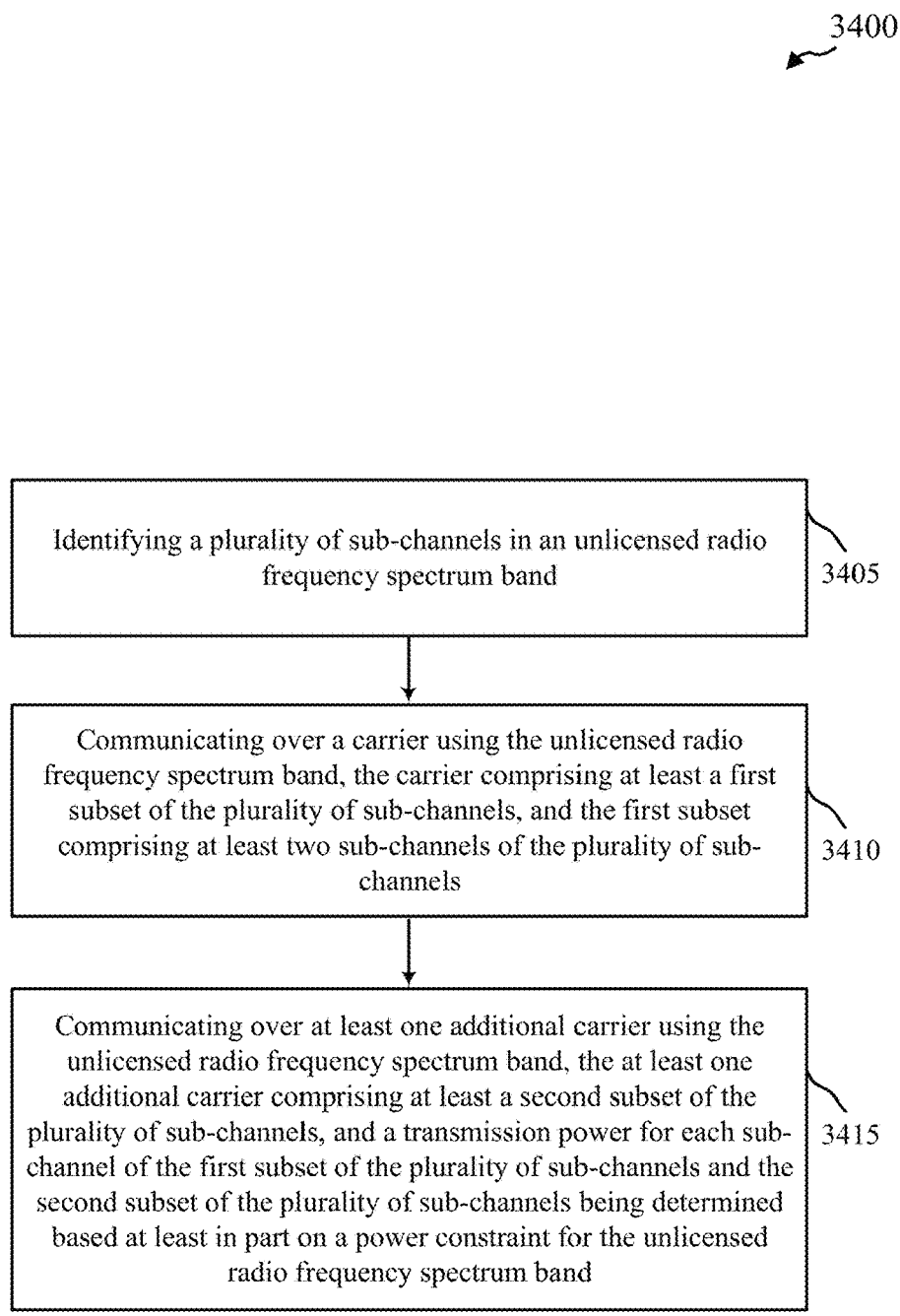
FIG. 34 is a flow chart illustrating an example of a method for wireless communication, in accordance with various aspects of the present disclosure.

FIG. 34 is a flow chart illustrating an example of a method 3400 for wireless communication, in accordance with various aspects of the present disclosure. For clarity, the method 3400 is described below with reference to aspects of one or more of the base station 105, base station 205, base station 205-a, UE 115, UE 215, UE 215-a, UE 215-b, and/or UE 215-c described with reference to FIGS. 1 and/or 2, and/or aspects of one or more of the apparatuses 905, 1005, 1105, 1205, 1305, 1405, 1505, 1605, 1705, 1805, 1905, 2005, 2105, and/or 2205 described with reference to FIGS. 9, 10, 11, 12, 13, 14, 15, 16, 17, 18, 19, 20, 21, and/or 22. In some examples, a base station, UE, and/or apparatus may execute one or more sets of codes to control the functional elements of the base station, UE, and/or apparatus to perform the functions described below.

At block 3405, the method 3400 may include identifying a plurality of sub-channels in an unlicensed radio frequency spectrum band. At block 3410, the method 3400 may include communicating over a carrier using the unlicensed radio frequency spectrum band, the carrier comprising at least a first subset of the plurality of sub-channels, and the first subset comprising at least two sub-channels of the plurality of sub-channels. At block 3415, the method 3400 may include communicating over at least one additional carrier using the unlicensed radio frequency spectrum band, the at least one additional carrier comprising at least a second subset of the plurality of sub-channels, and a transmission power for each sub-channel of the first subset of the plurality of sub-channels and the second subset of the plurality of sub-channels being determined based at least in part on a power constraint for the unlicensed radio frequency spectrum band. It should be noted that the method 3400 is just one implementation and that the operations of the method 3400 may be rearranged or otherwise modified such that other implementations are possible.

Figure 35:
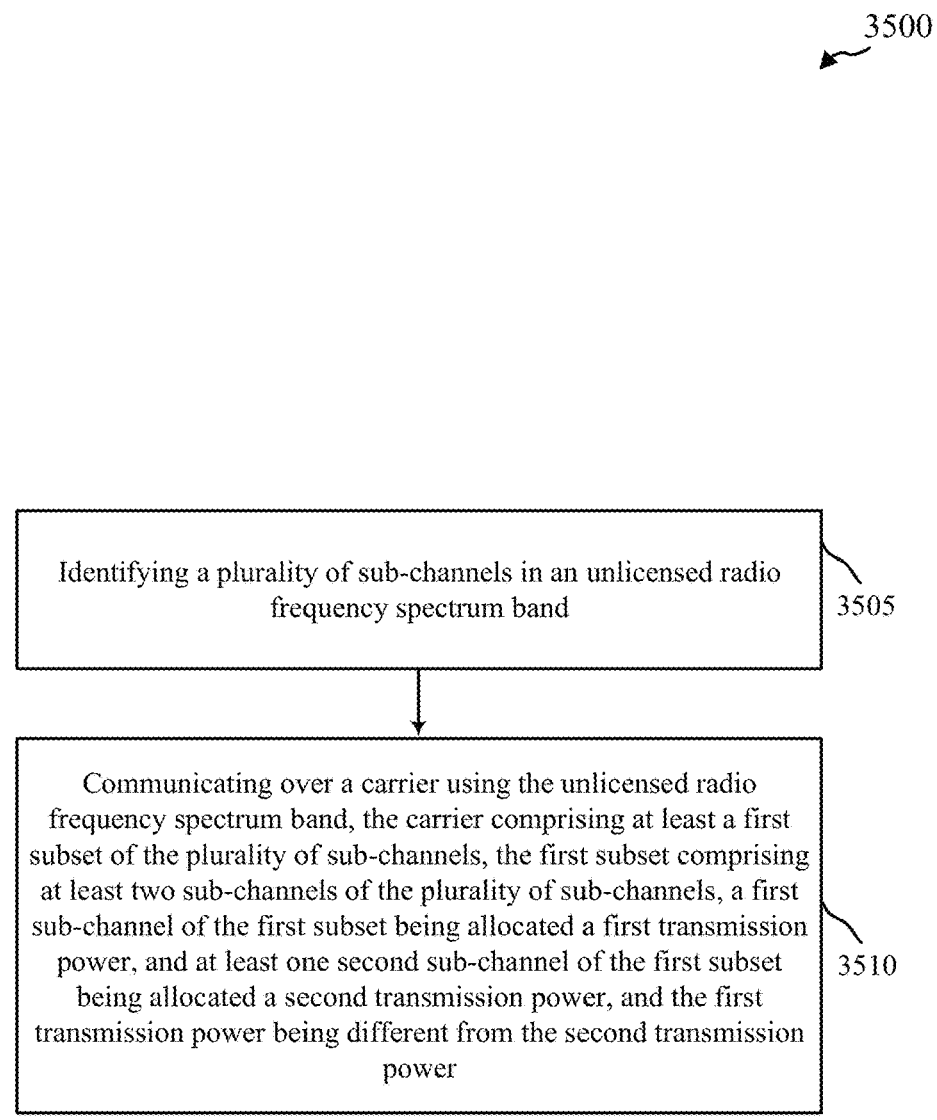
FIG. 35 is a flow chart illustrating an example of a method for wireless communication, in accordance with various aspects of the present disclosure.

FIG. 35 is a flow chart illustrating an example of a method 3500 for wireless communication, in accordance with various aspects of the present disclosure. For clarity, the method 3500 is described below with reference to aspects of one or more of the base station 105, base station 205, base station 205-a, UE 115, UE 215, UE 215-a, UE 215-b, and/or UE 215-c described with reference to FIGS. 1 and/or 2, and/or aspects of one or more of the apparatuses 905, 1005, 1105, 1205, 1305, 1405, 1505, 1605, 1705, 1805, 1905, 2005, 2105, and/or 2205 described with reference to FIGS. 9, 10, 11, 12, 13, 14, 15, 16, 17, 18, 19, 20, 21, and/or 22. In some examples, a base station, UE, and/or apparatus may execute one or more sets of codes to control the functional elements of the base station, UE, and/or apparatus to perform the functions described below.

At block 3505, the method 3500 may include identifying a plurality of sub-channels in an unlicensed radio frequency spectrum band. At block 3510, the method 3500 may include communicating over a carrier using the unlicensed radio frequency spectrum band, the carrier comprising at least a first subset of the plurality of sub-channels, the first subset comprising at least two sub-channels of the plurality of sub-channels, a first sub-channel of the first subset being allocated a first transmission power, and at least one second sub-channel of the first subset being allocated a second transmission power, and the first transmission power being different from the second transmission power. It should be noted that the method 3500 is just one implementation and that the operations of the method 3500 may be rearranged or otherwise modified such that other implementations are possible.

Figure 36:
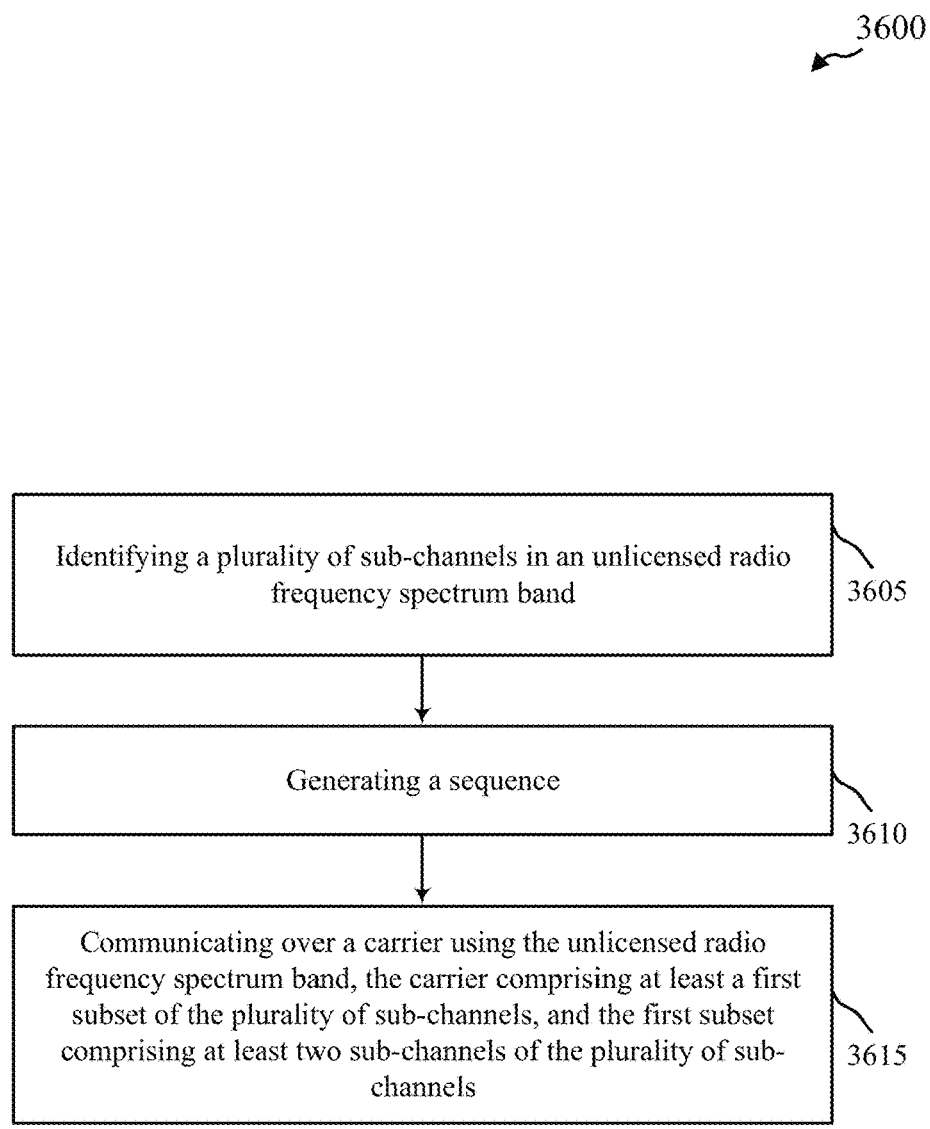
FIG. 36 is a flow chart illustrating an example of a method for wireless communication, in accordance with various aspects of the present disclosure.

FIG. 36 is a flow chart illustrating an example of a method 3600 for wireless communication, in accordance with various aspects of the present disclosure. For clarity, the method 3600 is described below with reference to aspects of one or more of the base station 105, base station 205, base station 205-a, UE 115, UE 215, UE 215-a, UE 215-b, and/or UE 215-c described with reference to FIGS. 1 and/or 2, and/or aspects of one or more of the apparatuses 905, 1005, 1105, 1205, 1305, 1405, 1505, 1605, 1705, 1805, 1905, 2005, 2105, and/or 2205 described with reference to FIGS. 9, 10, 11, 12, 13, 14, 15, 16, 17, 18, 19, 20, 21, and/or 22. In some examples, a base station, UE, and/or apparatus may execute one or more sets of codes to control the functional elements of the base station, UE, and/or apparatus to perform the functions described below.

At block 3605, the method 3600 may include identifying a plurality of sub-channels in an unlicensed radio frequency spectrum band. At block 3610, the method 3600 may include generating a sequence. At block 3615, the method 3600 may include communicating over a carrier using the unlicensed radio frequency spectrum band, the carrier comprising at least a first subset of the plurality of sub-channels, and the first subset comprising at least two sub-channels of the plurality of sub-channels. It should be noted that the method 3600 is just one implementation and that the operations of the method 3600 may be rearranged or otherwise modified such that other implementations are possible.

Figure 37:
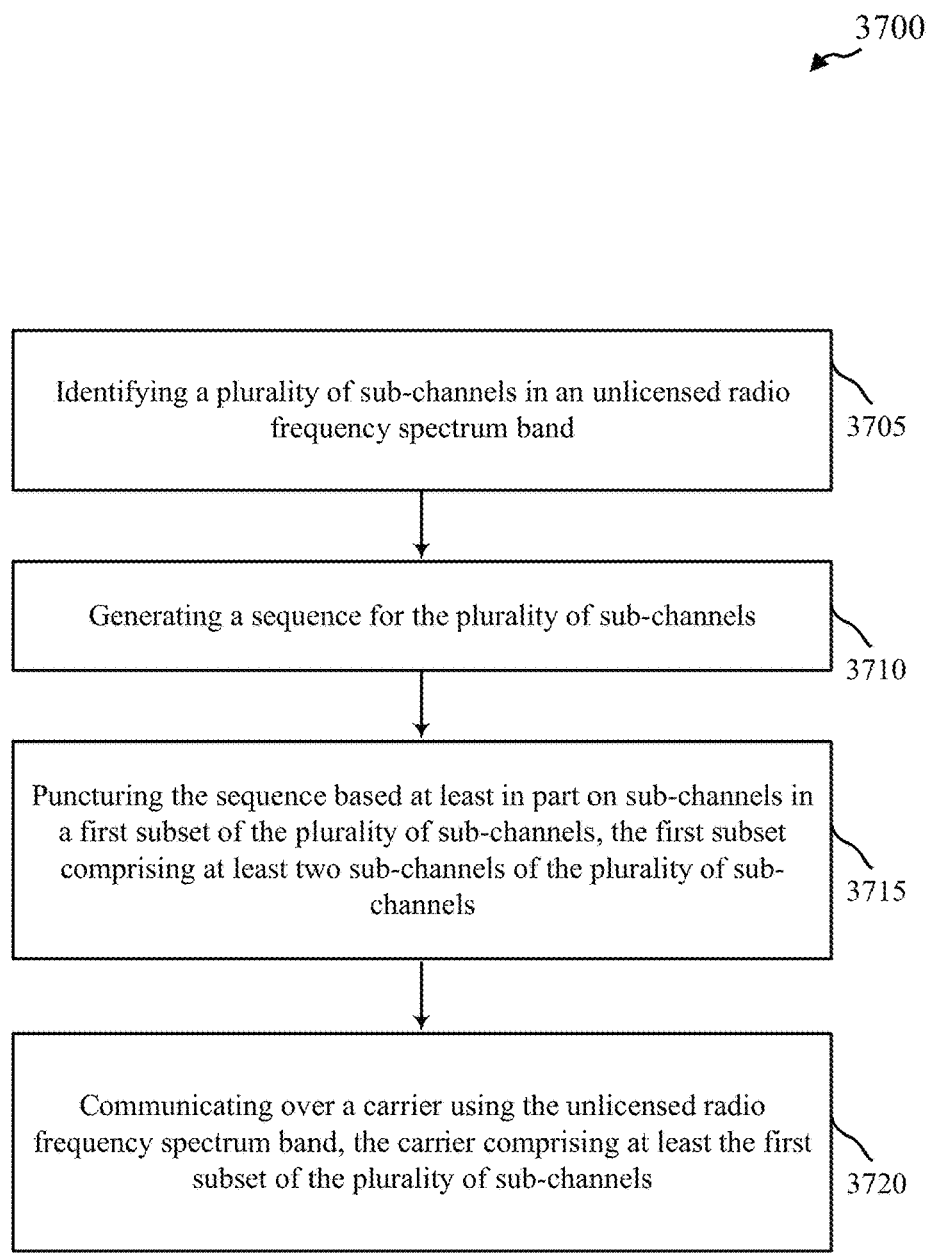
FIG. 37 is a flow chart illustrating an example of a method for wireless communication, in accordance with various aspects of the present disclosure.

FIG. 37 is a flow chart illustrating an example of a method 3700 for wireless communication, in accordance with various aspects of the present disclosure. For clarity, the method 3700 is described below with reference to aspects of one or more of the base station 105, base station 205, base station 205-a, UE 115, UE 215, UE 215-a, UE 215-b, and/or UE 215-c described with reference to FIGS. 1 and/or 2, and/or aspects of one or more of the apparatuses 905, 1005, 1105, 1205, 1305, 1405, 1505, 1605, 1705, 1805, 1905, 2005, 2105, and/or 2205 described with reference to FIGS. 9, 10, 11, 12, 13, 14, 15, 16, 17, 18, 19, 20, 21, and/or 22. In some examples, a base station, UE, and/or apparatus may execute one or more sets of codes to control the functional elements of the base station, UE, and/or apparatus to perform the functions described below.

At block 3705, the method 3700 may include identifying a plurality of sub-channels in an unlicensed radio frequency spectrum band. At block 3710, the method 3700 may include generating a sequence for the plurality of sub-channels. At block 3715, the method 3700 may include puncturing the sequence based at least in part on sub-channels in a first subset of the plurality of sub-channels, the first subset comprising at least two sub-channels of the plurality of sub-channels. At block 3720, the method 3700 may include communicating over a carrier using the unlicensed radio frequency spectrum band, the carrier comprising at least the first subset of the plurality of sub-channels. It should be noted that the method 3700 is just one implementation and that the operations of the method 3700 may be rearranged or otherwise modified such that other implementations are possible.

Figure 38:
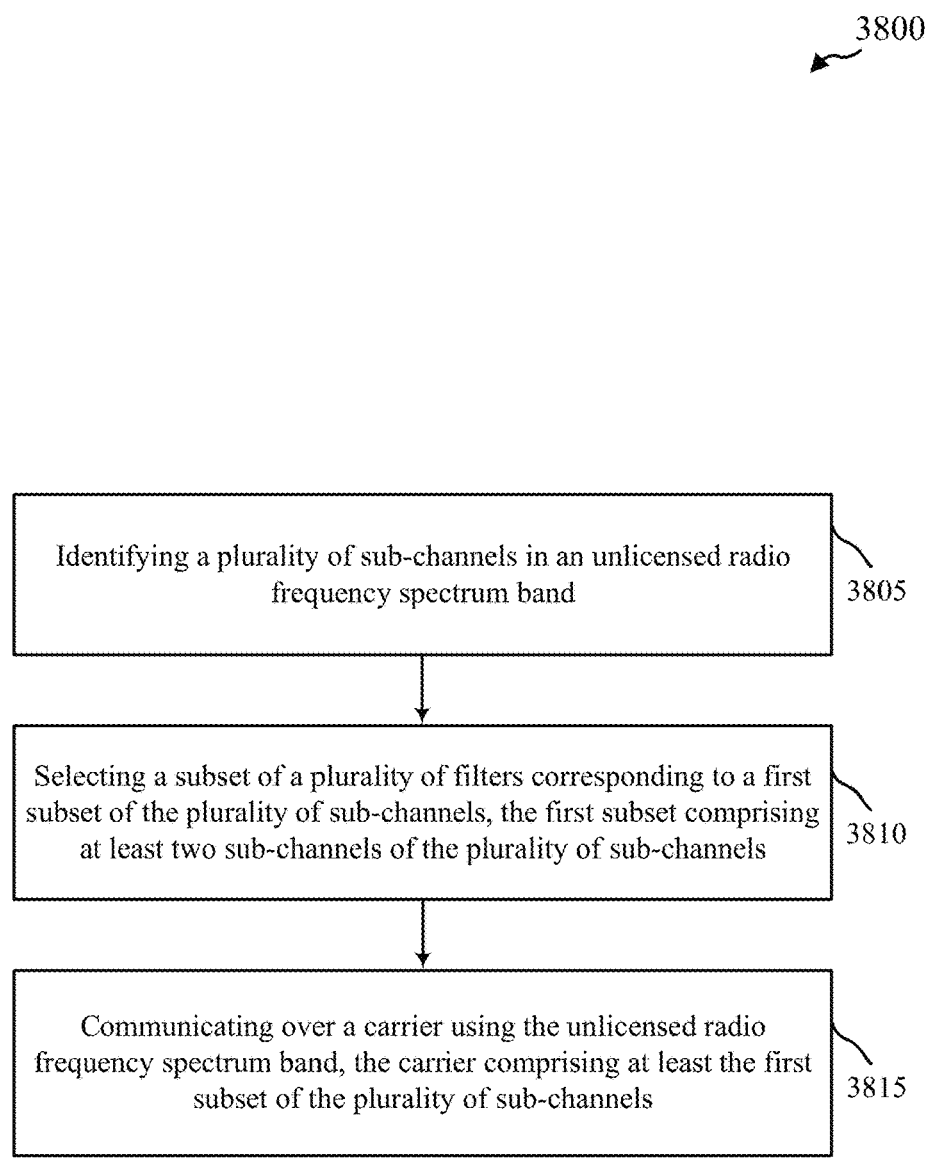
FIG. 38 is a flow chart illustrating an example of a method for wireless communication, in accordance with various aspects of the present disclosure.

FIG. 38 is a flow chart illustrating an example of a method 3800 for wireless communication, in accordance with various aspects of the present disclosure. For clarity, the method 3800 is described below with reference to aspects of one or more of the base station 105, base station 205, base station 205-a, UE 115, UE 215, UE 215-a, UE 215-b, and/or UE 215-c described with reference to FIGS. 1 and/or 2, and/or aspects of one or more of the apparatuses 905, 1005, 1105, 1205, 1305, 1405, 1505, 1605, 1705, 1805, 1905, 2005, 2105, and/or 2205 described with reference to FIGS. 9, 10, 11, 12, 13, 14, 15, 16, 17, 18, 19, 20, 21, and/or 22. In some examples, a base station, UE, and/or apparatus may execute one or more sets of codes to control the functional elements of the base station, UE, and/or apparatus to perform the functions described below.

At block 3805, the method 3800 may include identifying a plurality of sub-channels in an unlicensed radio frequency spectrum band. At block 3810, the method 3800 may include selecting a subset of a plurality of filters corresponding to a first subset of the plurality of sub-channels, the first subset comprising at least two sub-channels of the plurality of sub-channels. At block 3815, the method 3800 may include Communicating over a carrier using the unlicensed radio frequency spectrum band, the carrier comprising at least the first subset of the plurality of sub-channels. It should be noted that the method 3800 is just one implementation and that the operations of the method 3800 may be rearranged or otherwise modified such that other implementations are possible.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable ROM (EEPROM), flash memory, compact disk ROM (CD-ROM) or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
identifying a plurality of sub-channels in an unlicensed radio frequency spectrum band;
performing a first clear channel assessment (CCA) on the plurality of sub-channels based at least in part on a first CCA threshold;
determining a first subset of the plurality of sub-channels corresponding to sub-channels of the plurality of sub-channels that are clear according to the first CCA;
setting a second CCA threshold based at least in part on the first subset of the plurality of sub-channels;
performing a second CCA on the first subset of the plurality of sub-channels based at least in part on the second CCA threshold;
determining a second subset of the plurality of sub-channels corresponding to sub-channels that are clear according to the second CCA, the second CCA comprising CCA countdown slots for the first subset of the plurality of sub-channels; and
communicating over a carrier comprising at least the second subset of the plurality of sub-channels using the unlicensed radio frequency spectrum band.

2. The method of claim 1,
wherein the first CCA threshold is an optimistic CCA threshold that is set
based at least in part on the all of the plurality of sub-channels being scheduled for transmission.

3. The method of claim 2,
wherein the second CCA threshold is a redistributed CCA threshold that is set based at least in part on all the first subset of the plurality of sub-channels being scheduled for transmission.

4. The method of claim 3, wherein communicating over the second subset of the plurality of sub-channels is delayed until the CCA countdown slots are exceeded for all sub-channels of the first subset.

5. An apparatus for wireless communication, comprising:
a processor;
memory in electronic communication with the processor; and
instructions stored in the memory, the instructions being executable by the processor to:
identify a plurality of sub-channels in an unlicensed radio frequency spectrum band;
perform a first clear channel assessment (CCA) on the plurality of sub-channels based at least in part on a first CCA threshold;
determine a first subset of the plurality of sub-channels corresponding to sub-channels of the plurality of sub-channels that are clear according to the first CCA;
set a second CCA threshold based at least in part on the first subset of the plurality of sub-channels;
perform a second CCA on the first subset of the plurality of sub-channels based at least in part on the second CCA threshold;
determine a second subset of the plurality of sub-channels corresponding to sub-channels of the first subset of the plurality of sub-channels that are clear according to the second CCA, the second CCA comprising CCA countdown slots for the first subset of the plurality of sub-channels; and
communicate over a carrier comprising at least the second subset of the plurality of sub-channels using the unlicensed radio frequency spectrum band.

6. The apparatus of claim 5, wherein the first CCA threshold is an optimistic CCA threshold that is set based at least in part on all of the plurality of sub-channels being scheduled for transmission.

7. The apparatus of claim 6, wherein the second CCA threshold is a redistributed CCA threshold that is set based at least in part on all the first subset of the plurality of sub-channels being scheduled for transmission.

8. The apparatus of claim 7, wherein a communication over the second subset of the plurality of sub-channels is delayed until the CCA countdown slots are exceeded for all sub-channels of the first subset.

9. An apparatus for wireless communication, comprising:
means for identifying a plurality of sub-channels in an unlicensed radio frequency spectrum band;
means for performing a first clear channel assessment (CCA) on the plurality of sub-channels based at least in part on a first CCA threshold;
means for determining a first subset of the plurality of sub-channels corresponding to sub-channels of the plurality of sub-channels that are clear according to the first CCA;
means for setting a second CCA threshold based at least in part on the first subset of the plurality of sub-channels;
means for performing a second CCA on the first subset of the plurality of sub-channels based at least in part on the second CCA threshold;
means for determining a second subset of the plurality of sub-channels corresponding to sub-channels of the first subset of the plurality of sub-channels that are clear according to the second CCA, the second CCA comprising CCA countdown slots for the first subset of the plurality of sub-channels; and
means for communicating over a carrier comprising at least the second subset of the plurality of sub-channels using the unlicensed radio frequency spectrum band.

10. The apparatus of claim 9, wherein the first CCA threshold is an optimistic CCA threshold that is set based at least in part on all of the plurality of sub-channels being scheduled for transmission.

11. The apparatus of claim 10, wherein the second CCA threshold is a redistributed CCA threshold that is set based at least in part on all the first subset of the plurality of sub-channels being scheduled for transmission.

12. The apparatus of claim 11, wherein a communication over the second subset of the plurality of sub-channels is delayed until the CCA countdown slots are exceeded for all sub-channels of the first subset.

13. A non-transitory computer-readable medium storing computer-executable code for wireless communication, the code executable by a processor to:

identify a plurality of sub-channels in an unlicensed radio frequency spectrum band;

perform a first clear channel assessment (CCA) on the plurality of sub-channels based at least in part on a first CCA threshold;

determine a first subset of the plurality of sub-channels corresponding to sub-channels of the plurality of sub-channels that are clear according to the first CCA;

set a second CCA threshold based at least in part on the first subset of the plurality of sub-channels;

perform a second CCA on the first subset of the plurality of sub-channels based at least in part on the second CCA threshold;

determine a second subset of the plurality of sub-channels corresponding to sub-channels of the first subset of the plurality of sub-channels that are clear according to the second CCA, the second CCA comprising CCA countdown slots for the first subset of the plurality of sub-channels; and communicate over a carrier comprising at least the second subset of the plurality of sub-channels using the unlicensed radio frequency spectrum band.

14. The non-transitory computer-readable medium of claim 13, wherein the first CCA threshold is an optimistic CCA threshold that is set based at least in part on all of the plurality of sub-channels to be used for transmission.

15. The non-transitory computer-readable medium of claim 14, wherein the second CCA threshold is a redistributed CCA threshold that is set based at least in part on all the first subset of the plurality of sub-channels being scheduled for transmission.

16. The non-transitory computer-readable medium of claim 15, wherein a communication over the second subset of the plurality of sub-channels is delayed until the CCA countdown slots are exceeded for all sub-channels of the first subset.

* * * * *